US012552746B2

United States Patent
Fernández Sainz et al.

(10) Patent No.: US 12,552,746 B2
(45) Date of Patent: Feb. 17, 2026

(54) PROCESS AND INTERMEDIATES FOR THE PREPARATION OF UPADACITINIB

(71) Applicant: CURIA SPAIN, S.A.U., Boecillo (ES)

(72) Inventors: Yolanda Fernández Sainz, Valladolid (ES); Antonio Lorente Bonde-Larsen, Valladolid (ES); Alfonso Pérez Encabo, Valladolid (ES); José Ángel Turiel Hernandez, Valladolid (ES); José Enrique Gómez Pulido, Valladolid (ES); Mario Laderas Muñoz, Valladolid (ES)

(73) Assignee: CURIA SPAIN, S.A.U., Boecillo (ES)

( * ) Notice: Subject to any disclaimer, the term of this patent is extended or adjusted under 35 U.S.C. 154(b) by 613 days.

(21) Appl. No.: 17/787,000

(22) PCT Filed: Dec. 18, 2020

(86) PCT No.: PCT/EP2020/087194
§ 371 (c)(1),
(2) Date: Jun. 17, 2022

(87) PCT Pub. No.: WO2021/123288
PCT Pub. Date: Jun. 24, 2021

(65) Prior Publication Data
US 2023/0139156 A1     May 4, 2023

(30) Foreign Application Priority Data

Dec. 19, 2019  (EP) .................................. 19383150

(51) Int. Cl.
*C07D 207/08*  (2006.01)
*C07D 207/16*  (2006.01)
(Continued)

(52) U.S. Cl.
CPC ......... *C07D 207/08* (2013.01); *C07D 207/16* (2013.01); *C07D 207/20* (2013.01);
(Continued)

(58) Field of Classification Search
CPC .. C07D 207/08; C07D 207/16; C07D 207/20; C07D 207/22
See application file for complete search history.

(56) References Cited

U.S. PATENT DOCUMENTS

2018/0298016 A1* 10/2018 Pangan ................... A61K 47/12
2021/0323971 A1* 10/2021 Wang .................. C07D 487/14

FOREIGN PATENT DOCUMENTS

| CN | 109 369 659 A | 2/2019 |
| JP | 2010006722 A | 1/2010 |

(Continued)

OTHER PUBLICATIONS

Eugene C. Ashby et al., Reactions of new organocuprates. 2. Substitution reactions of alkyl, cycloalkyl, and aryl halides with lithium trimethyldicuprate, dilithium trimethylcuprate, and dilithium pentamethyltricuprate The Journal of Organic Chemistry 1977 42 (17), 2805-2808 (Year: 1977).*

(Continued)

*Primary Examiner* — Adam C Milligan
*Assistant Examiner* — Ernesto Valle, Jr.
(74) *Attorney, Agent, or Firm* — Troutman Pepper Locke LLP (Rochester)

(57) ABSTRACT

The invention relates to a process for the preparation of compounds of formula (I), which are useful intermediates in the synthesis of Upadacitinib and structurally related compounds, by using Weinreb amide (III), or an equivalent thereof, as key intermediate.

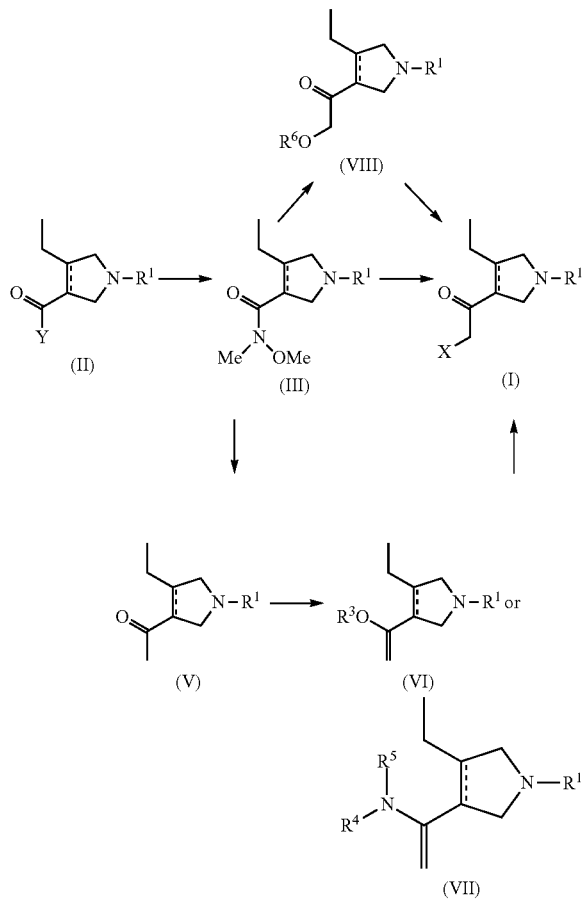

12 Claims, No Drawings

(51) Int. Cl.
  *C07D 207/20*  (2006.01)
  *C07D 207/22*  (2006.01)
  *C07D 487/14*  (2006.01)
  *C07F 7/18*  (2006.01)

(52) U.S. Cl.
  CPC ......... *C07D 207/22* (2013.01); *C07D 487/14* (2013.01); *C07F 7/1804* (2013.01); *C07F 7/188* (2013.01)

(56) References Cited

FOREIGN PATENT DOCUMENTS

| WO | 2007117381 A2 | 10/2007 |
|---|---|---|
| WO | 2008118718 A2 | 10/2008 |
| WO | 2011/068881 A1 | 6/2011 |
| WO | 2013/043826 A1 | 3/2013 |
| WO | 2017005786 A1 | 1/2017 |
| WO | 2017/066775 A1 | 4/2017 |
| WO | 2018/009424 A1 | 1/2018 |
| WO | 2019/016745 A1 | 1/2019 |
| WO | 2019/212927 A1 | 11/2019 |
| WO | 2020/043033 A2 | 3/2020 |
| WO | 2020/0202183 A1 | 10/2020 |

OTHER PUBLICATIONS

International Search Report and Written Opinion for corresponding Application No. PCT/EP2020/087194 (mailed Feb. 12, 2021).
Database Pubchem Substance (CID: 134531173): benzyl (3R, 4S)-3-acetyl-4-ethylpyrrolidine-1-carboxylate.
Gajdosik et al., "Upadacitinib Tartrate," Drugs of the Future 43(10):731-743 (2018).
Greene and Wuts, eds., Protective groups in Organic Synthesis, 3rd Ed., New York, NY: John Wiley & Sons, Inc., pp. 494-502, 531, 604-605 (1999).
Harada et al., "Synthesis of the ABC Ring System of Jiadifenin via Pd-catalyzed Cyclizations," Org. Lett. 13 (5):988-991 (2011).
Heindl et al., "Enantiospecific Synthesis and Receptor Binding of Novel Dopamine Receptor Ligands Employing Natural 4-hydroxyproline as a Practical and Flexible Building Block," Tetrahedron: Asymmetry 14(20):3153-3172 (2003).
Trost et al., "A Mechanistic Dichotomy in Ruthenium-catalyzed Propargyl Alcohol Reactivity: A Novel Hydrative Diyne Cyclization," J. Am. Chem. Soc. 125(38):11516-11517 (2003).

* cited by examiner

PROCESS AND INTERMEDIATES FOR THE PREPARATION OF UPADACITINIB

This application is a national stage application under 35 U.S.C. § 371 of International Application No. PCT/EP2020/087194, filed Dec. 18, 2020, which claims the priority benefit of Europe patent application Ser. No. 19/383,150.0, filed Dec. 19, 2019, which are hereby incorporated by reference in their entirety.

FIELD OF INVENTION

The invention relates to a process for preparing compounds that are useful intermediates in the synthesis of Upadacitinib.

BACKGROUND OF THE INVENTION (3S,4R)-3-Ethyl-4-(3H-imidazo[1,2-a]pyrrolo[2,3-e] pyrazin-8-yl)-N-(2,2,2-trifluoroethyl)pyrrolidine-1-carboxamide (Upadacitinib), is Janus Kinases (JAKs) inhibitor.

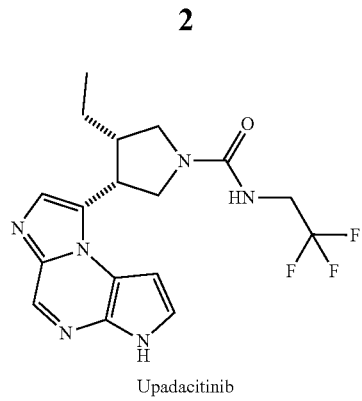
Upadacitinib

Upadacitinib (also known as ABT-494) is a potent and selective JAK1 inhibitor developed by AbbVie. It has been approved by the FDA for the treatment of rheumatoid arthritis.

Several methods have been described in the literature for the synthesis of Upadacitinib, but they all are mainly based on the same approach: preparation of what we call as Fragment A and Fragment B (the pyrrolidine derivative), which are then joined. Subsequent cyclization to provide the imidazopyrrolopyrazine skeleton and derivatization gives rise to Upadacitinib.

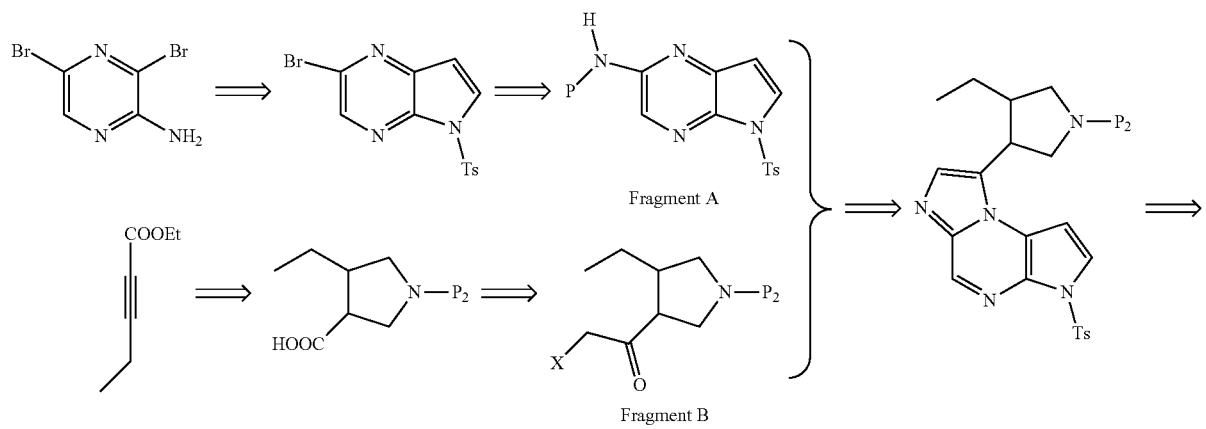

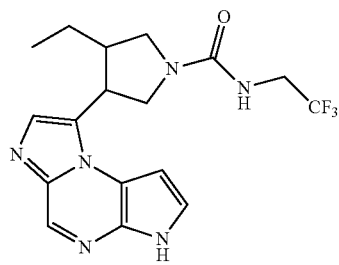

Document WO 2013/043826 discloses in Example 12 a process for the preparation of cis-(3R,4S)-benzyl-4-ethyl-3-(2-bromoacetyl)pyrrolidine-1 carboxylate.

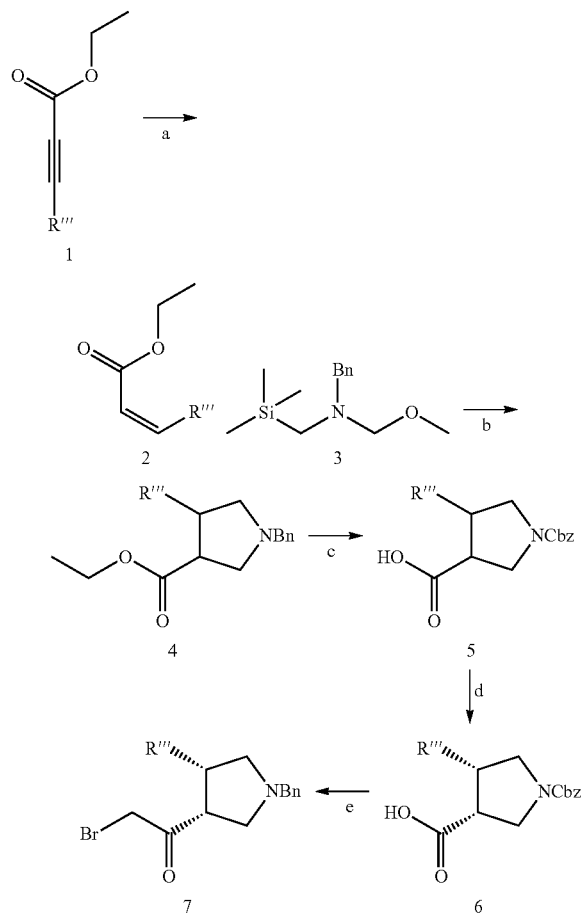

In this process, racemic cis-1-benzyloxycarbonyl-4-ethylpyrrolidine-3-carboxylic acid (5) is first prepared. Then, the (3R,4S) enantiomer is separated by formation of the diastereomeric (naphthalenyl)ethanamonioum salt. Finally, compound 7 is obtained in step E by treatment of the intermediate acid chloride with trimethylsilyldiazomethane, which is unstable and highly toxic.

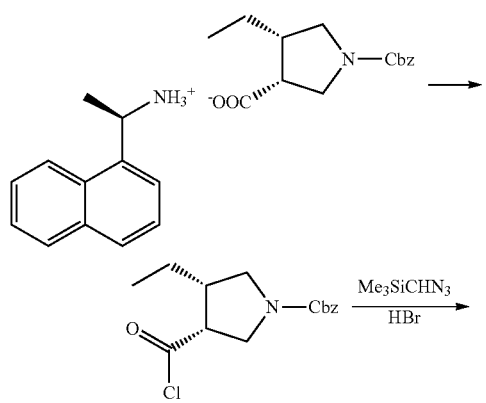

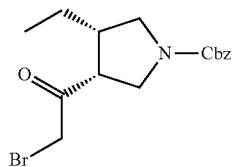

Document WO 2017/066775 discloses preparation of cis-(3R,4S)-1-benzyloxycarbonyl-4-ethylpyrrolidine-3-carboxylate through formation of the sulfoxonium salt and subsequent treatment with LiBr.

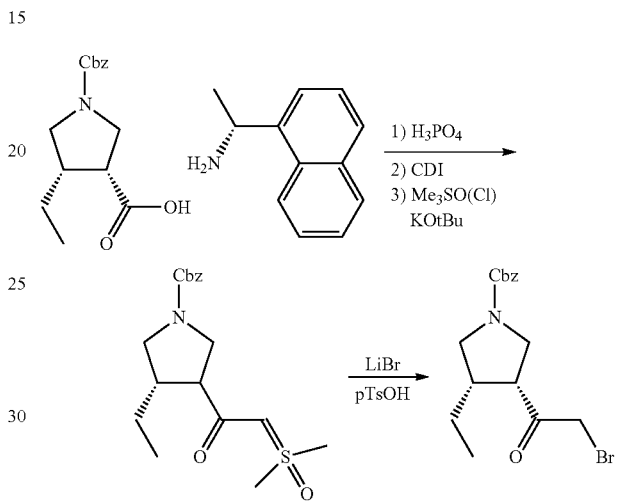

However, the inventors of the present invention have observed that the basic conditions required for the preparation of the sulfoxonium salt and also for the subsequent bromination reaction give rise to partial isomerization to the trans isomer (see comparative experiments 19 and 20 herein), making necessary a further purification to obtain the pure product, which is so obtained in lower yield.

Preparation of the starting (3R,4S)-1-benzyloxycarbonyl-4-ethylpyrrolidine-3-carboxylic acid is disclosed in WO 2017/066775 through asymmetric hydrogenation.

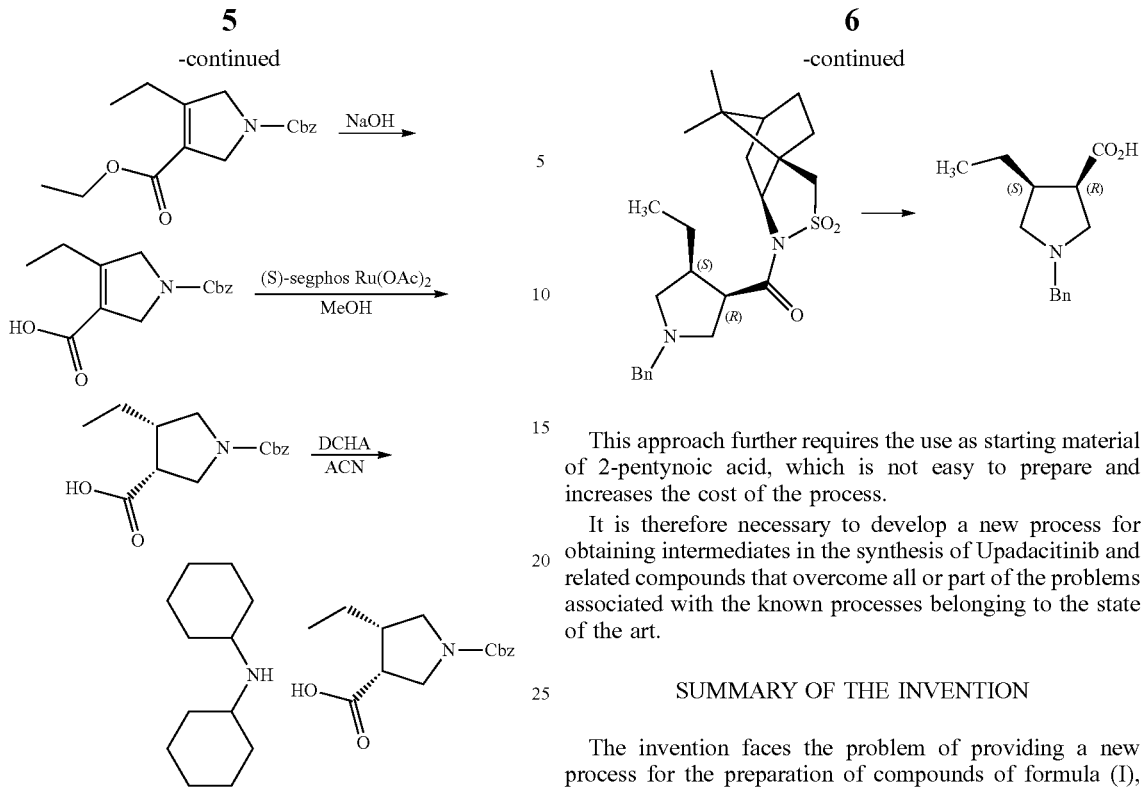

Finally, document WO 2019/016745 discloses a process for the preparation of (3R,4S)-1-benzyloxycarbonyl-4-ethylpyrrolidine-3-carboxylic acid which comprises the use of (1R)-2,10-camphorsultam as chiral auxiliary.

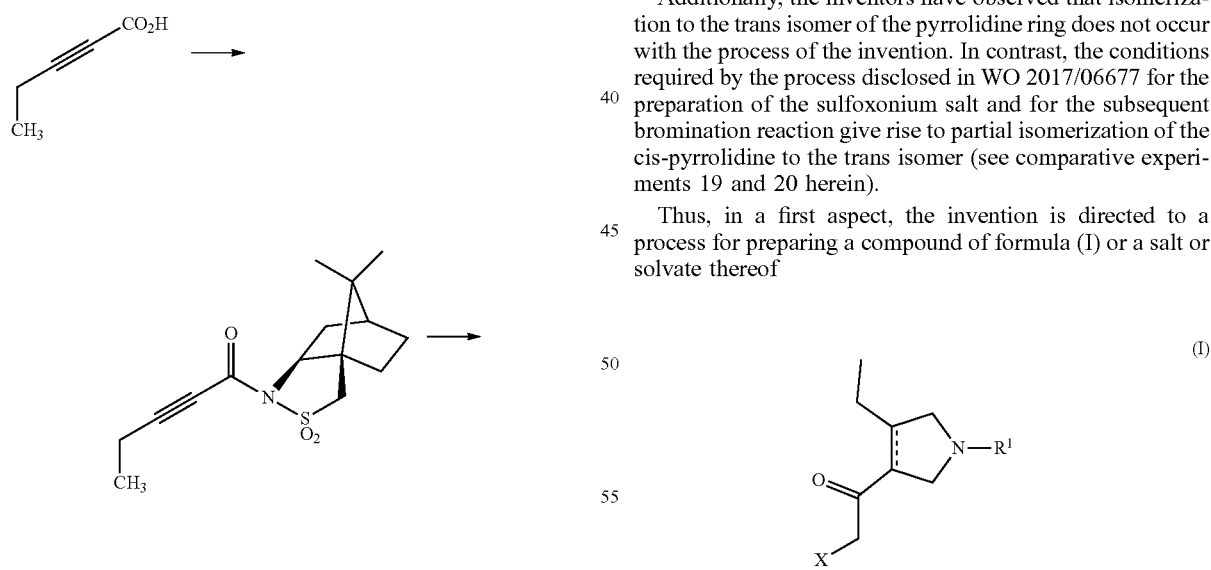

This approach further requires the use as starting material of 2-pentynoic acid, which is not easy to prepare and increases the cost of the process.

It is therefore necessary to develop a new process for obtaining intermediates in the synthesis of Upadacitinib and related compounds that overcome all or part of the problems associated with the known processes belonging to the state of the art.

SUMMARY OF THE INVENTION

The invention faces the problem of providing a new process for the preparation of compounds of formula (I), which are useful intermediates in the synthesis of Upadacitibib and structurally related compounds. In particular, the inventors have found that compounds of formula (I) can be obtained satisfactorily, in an industrial an economically way and without the need of highly toxic reagents, by the use of Weinreb amide of formula (III) or triazine ester of formula (IV) as key intermediate.

Additionally, the inventors have observed that isomerization to the trans isomer of the pyrrolidine ring does not occur with the process of the invention. In contrast, the conditions required by the process disclosed in WO 2017/06677 for the preparation of the sulfoxonium salt and for the subsequent bromination reaction give rise to partial isomerization of the cis-pyrrolidine to the trans isomer (see comparative experiments 19 and 20 herein).

Thus, in a first aspect, the invention is directed to a process for preparing a compound of formula (I) or a salt or solvate thereof

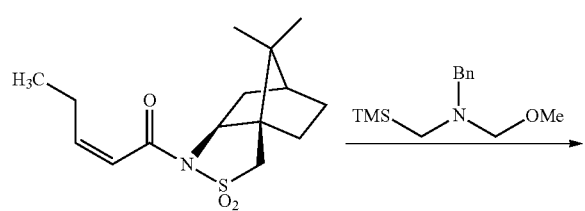

wherein
 === is a single or double bond;
 X is a leaving group and
 $R^1$ is selected from H, and amino protecting group;
which comprises:
(a) converting a compound of formula (II) or a salt or solvate thereof

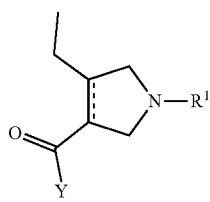

(II)

wherein
--- is a single or double bond;
Y is selected from OH, Cl, OR$^2$ and OC(O)R$^2$, wherein R$^2$ is selected from C$_1$-C$_6$ alkyl, (C$_6$-C$_{15}$)aryl(C$_1$-C$_6$) alkyl and C$_6$-C$_{15}$ aryl; and
R$^1$ is selected from H and amino protecting group;
into a compound of formula (III) or (IV) or a salt or solvate thereof

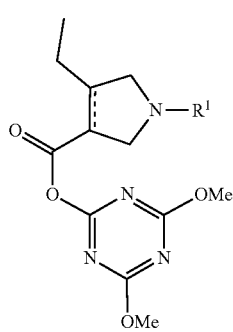

(III)

(IV)

wherein
--- is a single or double bond; and
R$^1$ is selected from H and amino protecting group; and
(b) converting a compound of formula (III) or (IV), or a salt or solvate thereof, into a compound of formula (I), or a salt or solvate thereof, by a process comprising:
(bi) reaction of the compound of formula (III) or (IV), or a salt or solvate thereof, with MeMgCl, MeMgBr or MeLi to provide a ketone of formula (V) or a salt or solvate thereof

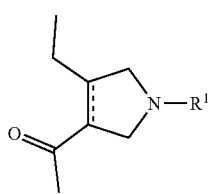

(V)

wherein
--- is a single or double bond; and
R$^1$ is selected from H and amino protecting group;
(bii) conversion of a ketone of formula (V), or a salt or solvate thereof, into an enol ether of formula (VI) or an enamine of formula (VII) or a salt or solvate thereof

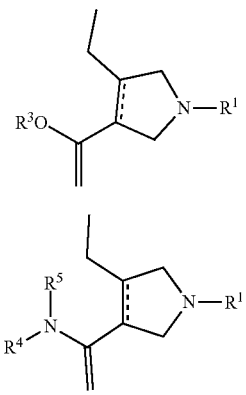

(VI)

(VII)

wherein
--- is a single or double bond; and
R$^1$ is selected from H and amino protecting group;
R$^3$ is selected from C$_1$-C$_6$ alkyl, (C$_6$-C$_{15}$)aryl(C$_1$-C$_6$) alkyl, C$_6$-C$_{15}$ aryl, COR' and SiR'$_3$, wherein each R' is independently selected from C$_1$-C$_6$ alkyl, C$_3$-C$_{10}$cycloalkyl, C$_6$-C$_{15}$ aryl and (C$_6$-C$_{15}$)aryl (C$_1$-C$_6$)alkyl; and
R$^4$ and R$^5$ are independently selected from C$_1$-C$_6$ alkyl, (C$_6$-C$_{15}$)aryl(C$_1$-C$_6$)alkyl and C$_6$-C$_{15}$ aryl or they form, together with the nitrogen atom, a 5- to 7-membered heterocyclic ring; and
(biii) conversion of an enol ether of formula (VI) or an enamine of formula (VII), or a salt or solvate thereof, into a compound of formula (I) or a salt or solvate thereof
or
(bi') reaction of the compound of formula (III) or (IV), or a salt or solvate thereof, with
X—CH$_2$—Li, X—CH$_2$—MgCl or X—CH$_2$—MgBr, to provide a compound of formula (I) or a salt or solvate thereof;
or
(bi") reaction of the compound of formula (III) or (IV), or a salt or solvate thereof, with R$^6$O—CH$_2$—Li, R$^6$O—CH$_2$—MgCl or R$^6$O—CH$_2$—MgBr, to provide a compound of formula (VIII) or a salt or solvate thereof

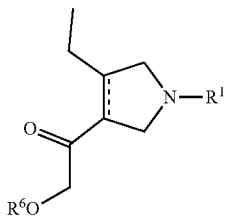

(VIII)

wherein
--- is a single or double bond;
R¹ is selected from H and amino protecting group; and
R⁶ is selected from H, —COR' and —CONR'R", wherein R' and R" are independently selected from $C_1$-$C_6$ alkyl, $C_6$-$C_{15}$ aryl and ($C_6$-$C_{15}$)aryl($C_1$-$C_6$)alkyl; and (bii") conversion of a compound of formula (VIII), or a salt or solvate thereof, into a compound of formula (I) or a salt or solvate thereof.

In another aspect, the invention is directed to a process for preparing Upadacitinib, or a salt or solvate or stereoisomer thereof, which comprises preparing a compound of formula (I) or a salt or solvate thereof though the process defined in the first aspect of the invention, and converting said compound into Upadacitinib.

In a further aspect, the invention is directed to a compound of formula

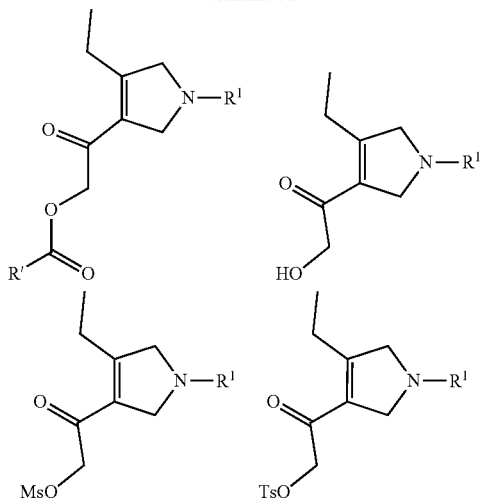

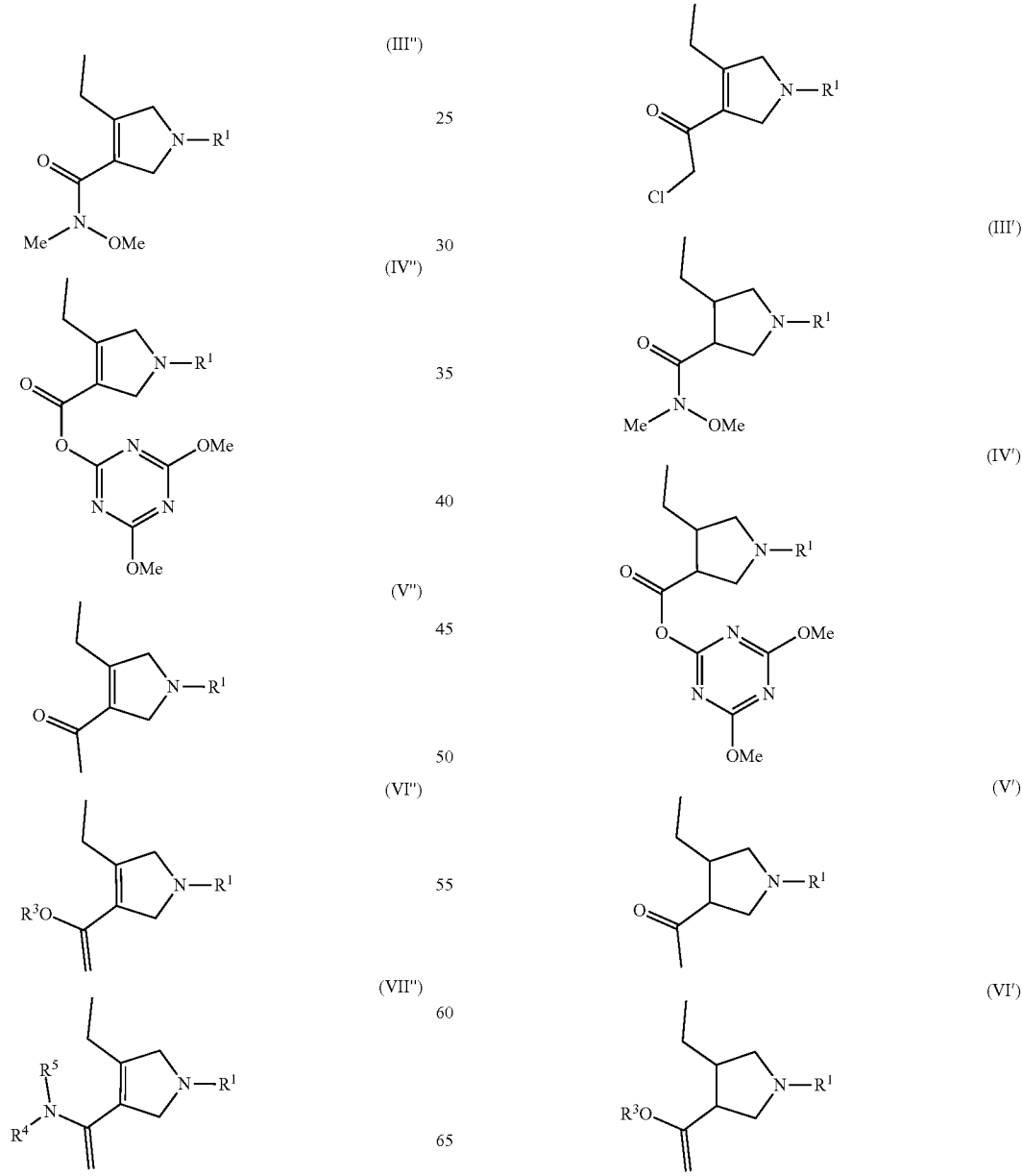

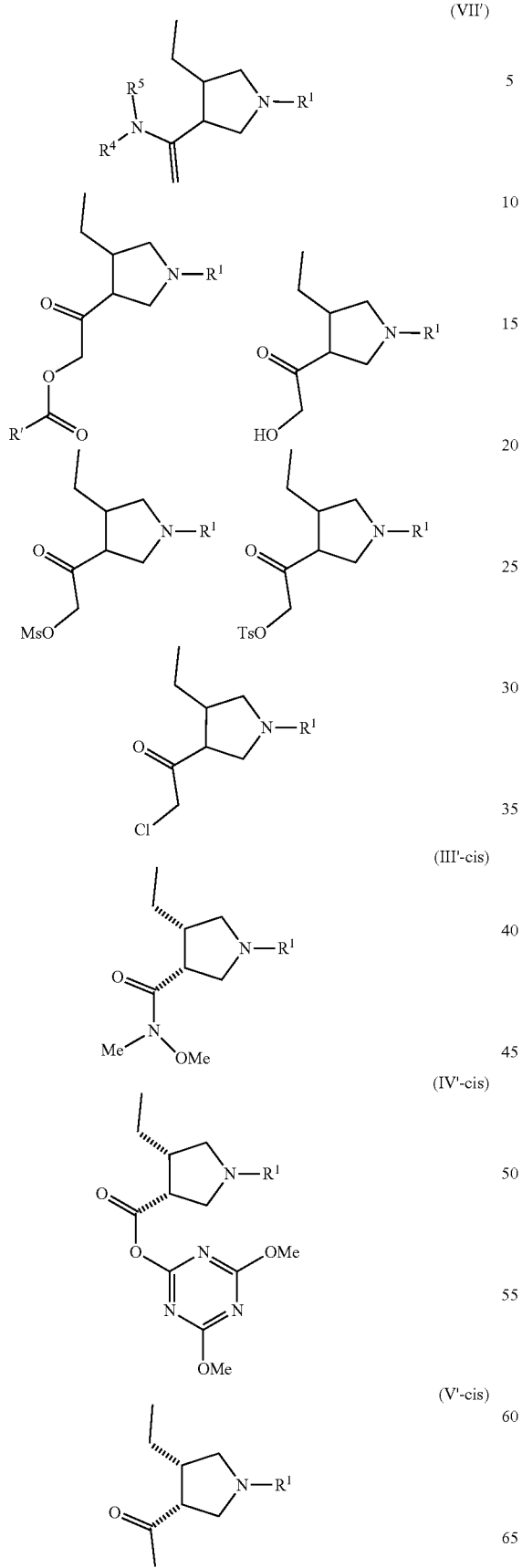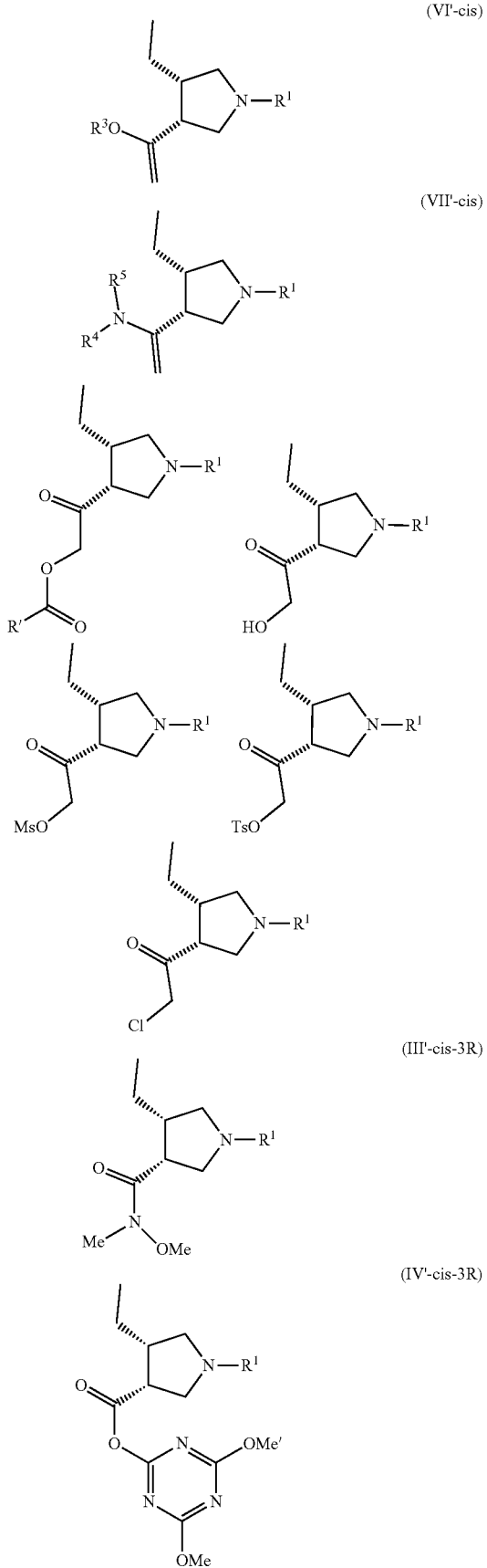

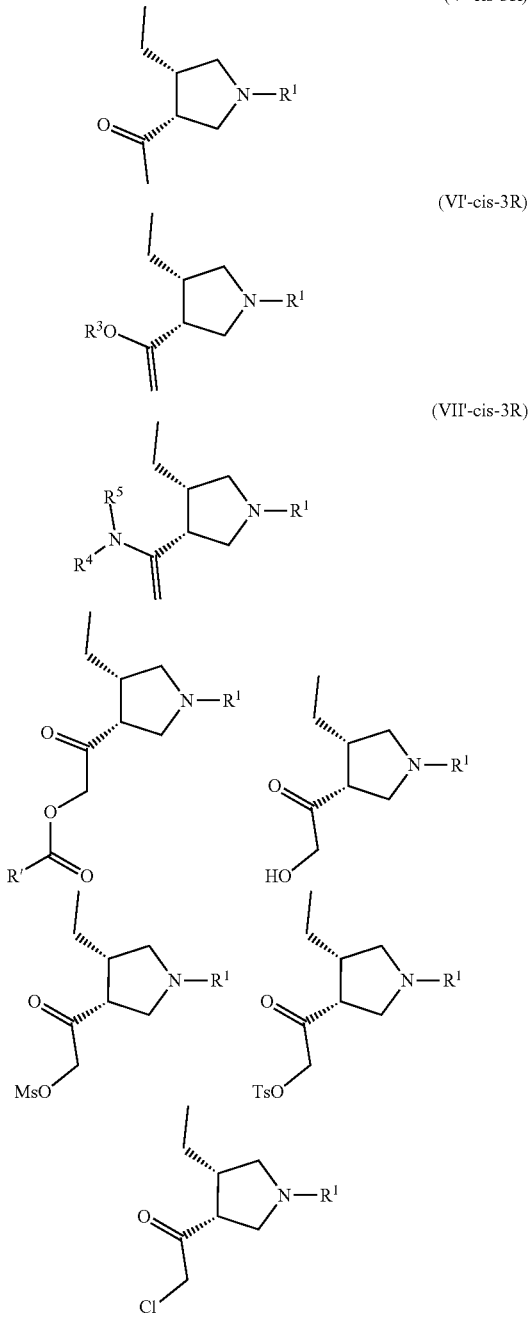

or a salt or solvate thereof, wherein:

$R^1$ is selected from H and amino protecting group;

$R^3$ is selected from $C_1$-$C_6$ alkyl, $(C_6$-$C_{15})$aryl$(C_1$-$C_6)$ alkyl, $C_6$-$C_{15}$ aryl, COR' and SiR'$_3$, wherein each R' is independently selected from $C_1$-$C_6$ alkyl, $C_3$-$C_{10}$ cycloalkyl, $C_6$-$C_{15}$ aryl and $(C_6$-$C_{15})$aryl$(C_1$-$C_6)$alkyl;

$R^4$ and $R^5$ are independently selected from $C_1$-$C_6$ alkyl, $(C_6$-$C_{15})$aryl$(C_1$-$C_6)$alkyl and $C_6$-$C_{15}$ aryl or they form, together with the nitrogen atom, a 5- to 7-membered heterocyclic ring; and R' is selected from $C_1$-$C_6$ alkyl, $(C_6$-$C_{15})$aryl$(C_1$-$C_6)$alkyl and $C_6$-$C_{15}$ aryl.

DETAILED DESCRIPTION OF THE INVENTION

The term "alkyl" refers to a linear or branched alkane derivative containing from 1 to 6 ("$C_1$-$C_6$ alkyl"), preferably from 1 to 3 ("$C_1$-$C_3$ alkyl"), carbon atoms and which is bound to the rest of the molecule through a single bond. Illustrative examples of alkyl groups include methyl, ethyl, n-propyl, i-propyl, n-butyl, i-butyl, t-butyl, pentyl, hexyl.

The term "alkenyl" refers to a linear or branched hydrocarbon chain radical comprising from 2 to 6 ("$C_1$-$C_6$ alkenyl"), preferably from 2 to 3, carbon atoms and which contains at least one double bond and is attached to the rest of the molecule by a single bond. Illustrative examples of alkenyl include ethenyl, propenyl, allyl, butenyl, 1-methyl-2-buten-yl.

The term "haloalkyl" refers to an alkyl group as defined above wherein at least one hydrogen atom has been replaced by halogen. Examples of haloalkyl groups include but are not limited to $CF_3$, $CCl_3$, $CHF_2$, $CF_2CF_3$.

The term "aryl" refers to an aromatic group having from 6 to 15, preferably 6 to 10 carbon atoms, comprising 1, 2 or 3 aromatic nuclei fused to one another. Illustrative examples of aryl groups include phenyl, naphthyl, indenyl, phenanthryl, etc. Preferably, it is phenyl.

The term "$(C_6$-$C_{15})$aryl$(C_1$-$C_6)$alkyl" refers to an alkyl group as defined above substituted with an aryl group as defined above. Examples of such groups include benzyl, phenylethyl, phenylpropyl, naphthylmethyl, etc. Preferably, it is benzyl.

The term "halogen" refers to bromine, chlorine, iodine or fluorine.

The term "$C_3$-$C_{10}$ cycloalkyl" refers to a monocyclic or bicyclic system containing from 3 to 10, preferably from 3 to 7 ("$C_3$-$C_7$ cycloalkyl") carbon atoms. Illustrative examples of cycloalkyl groups include cyclopropyl, cyclobutyl, cyclopentyl, cyclohexyl.

The term "heterocyclyl" refers to a saturated or partially unsaturated monocyclic, bicyclic or tricyclic system containing from 3 to 15, preferably 3 to 10, more preferably 5 to 7, ring atoms containing one or more, specifically one, two, three or four ring heteroatoms independently selected from N, O, and S, and the remaining ring atoms being carbon. Illustrative examples of heterocyclyl groups include tetrahydropyran, morpholine, pyrrolidine, piperazine, piperidine, azepane and [1,4]dioxane.

The term "heteroaryl" refers to an aromatic monocyclic, bicyclic or tricyclic system containing from 3 to 15, preferably 3 to 10, more preferably 5 to 7, ring atoms containing one or more, specifically one, two, three or four ring heteroatoms independently selected from O, N and S, and the remaining ring atoms being carbon.

The term "amino protecting group" (APG) refers to a group blocking the NH function for subsequent reactions that can be removed under controlled conditions. Amino protecting groups are well known in the art. Illustrative examples of amino protecting groups have been described by Green T W et al. in "Protective Groups in Organic Synthesis", 3rd Edition (1999), Ed. John Wiley & Sons. Virtually any amino protecting group can be used to put the invention into practice. Illustrative, non-limiting examples of APGs include:

carbamates [—COOR]. R can be selected from $C_1$-$C_6$ alkyl, $C_1$-$C_6$ haloalkyl, $C_2$-$C_6$ alkenyl, $C_3$-$C_{10}$ cycloalkyl, $C_6$-$C_{15}$ aryl, $(C_6$-$C_{15})$aryl$(C_1$-$C_6)$alkyl, 3- to 15-membered heterocyclyl, 3- to 15-membered heteroaryl and tri($C_1$-$C_6$ alkyl)silane. Examples of carbamates include methyl carbamate (MOC), ethyl carbamate, t-butyl carbamate (Boc), benzyl carbamate (CBz), p-methoxybenzyl carbamate, p-nitrobenzyl carbamate, halobenzyl carbamate, phenylethyl carbamate, allyl carbamate, 9-fluorenylmethyl carbamate (Fmoc), chloroethyl carbamate, trichloroethyl carbamate Troc), trimethylsilylethyl carbamate (Teoc), trimethylsilyl carbamate, triisopropylsilyl carbamate;

amides [—COR]. R can be selected from $C_1$-$C_6$ alkyl, $C_2$-$C_6$ alkenyl, $C_3$-$C_{10}$ cycloalkyl, $C_6$-$C_{15}$ aryl, ($C_6$-$C_{15}$)aryl($C_1$-$C_6$)alkyl, 3- to 15-membered heterocyclyl and 3- to 15-membered heteroaryl. Examples of amides include acetamide, phenylacetamide, haloacetamide (e.g. chloroacetamide, trichloroacetamide, trifluoroacetamide), benzamide, picolinamide;

amines [—R]. R can be selected from $C_1$-$C_6$ alkyl, $C_6$-$C_{15}$ aryl and ($C_6$-$C_{15}$)aryl($C_1$-$C_6$)alkyl. Examples of amines include methyl amine, tert-butyl amine, benzyl amine, p-methoxybenzyl amine, 3,4-dimethoxybenzyl amine, allyl amine, methoxymethyl amine, triphenylmethyl amine, benzoyl amine, dinitrophenyl amine, p-methoxyphenyl amine, o-methoxyphenyl amine, trimethylsilylethoxymethyl amine, triphenylmethylamine;

sulfonamides [—$SO_2R$]. R can be selected from $C_1$-$C_6$ alkyl, $C_1$-$C_6$ haloalkyl, $C_6$-$C_{15}$ aryl, ($C_6$-$C_{15}$)aryl($C_1$-$C_6$)alkyl, 3- to 15-membered heterocyclyl and 3- to 15-membered heteroaryl. Examples of sulfonamides include methanesulfonamide, trifluoromethanesulfonamide, t-butylsulfonamide, trimethylsilylethanesulfonamide, benzylsulfonamide, p-toluenesulfonamide, benzenesulfonamide, o- or p-nitrobenzenesulfonamide, dinitrobenzenesulfonamide, naphthalenesulfonamide, pyridine-2-sulfonamide;

and silyl amines [—Si(R)(R')(R")]. R, R' and R" can be independently selected from $C_1$-$C_6$ alkyl, $C_3$-$C_{10}$ cycloalkyl, $C_6$-$C_{15}$ aryl and ($C_6$-$C_{15}$)aryl($C_1$-$C_6$)alkyl. Examples of silyl amines include trimethylsilyl amine, triethylsilyl amine, tert-butyldimethylsilyl amine, tert-butyldiphenylsilyl amine, tri-isopropylsilyl amine, triphenylsilyl amine.

The term "leaving group" refers to a functional group or an atom that can be displaced by another functional group in a substitution reaction, such as a nucleophilic substitution reaction. Suitable leaving groups are well known in the art. In a particular embodiment, the leaving group is selected from halogen, $C_1$-$C_6$ alkylsulfonates, $C_1$-$C_6$ haloalkylsulfonates, $C_6$-$C_{10}$ arylsulfonates and ($C_1$-$C_6$)alkyl($C_6$-$C_{10}$)arylsulfonates, such as chloro, bromo, iodo, mesylate, triflate, tosylate, nosylate and the like.

As understood in this technical area, there may be a certain degree of substitution in the aforementioned radicals. Therefore, there may be substitution in any of the groups of the present invention. The previous groups can be substituted in one or more available positions with one or more substituents. Said substituents include, for example and in non-limiting sense, $C_1$-$C_6$ alkyl, $C_1$-$C_6$ haloalkyl, $C_3$-$C_{10}$ cycloalkyl, $C_6$-$C_{10}$ aryl, ($C_6$-$C_{10}$)aryl($C_1$-$C_6$)alkyl, 3- to 10-membered heterocyclyl, 3- to 10-membered heteroaryl, halogen, —CN, $NO_2$, $CF_3$, —N($R_a$)($R_b$), —$OR_c$, —$SR_d$, —C(O)$R_e$, —C(O)O$R_f$, —C(O)N($R_g$)($R_h$), —OC(O)$R_i$; wherein $R_a$, $R_b$, $R_c$, $R_d$, $R_e$, $R_f$, $R_g$, $R_h$ and $R_i$, are independently selected from hydrogen, $C_1$-$C_6$ alkyl, $C_1$-$C_6$ haloalkyl, $C_6$-$C_{10}$ aryl, ($C_6$-$C_{15}$)aryl($C_1$-$C_6$)alkyl, 3- to 10-membered heterocyclyl, 3- to 10-membered heteroaryl and trifluoromethyl.

The invention also provides "salts" of the compounds described in the present description. By way of illustration, said salts can be acid addition salts, base addition salts or metal salts, and can be synthesized from the parent compounds containing a basic or acid moiety by means of conventional chemical processes known in the art. Such salts are generally prepared, for example, by reacting the free acid or base forms of said compounds with a stoichiometric amount of the suitable base or acid in water or in an organic solvent or in a mixture of the two. Non-aqueous media such as ether, ethyl acetate, ethanol, acetone, isopropanol or acetonitrile are generally preferred. Illustrative examples of said acid addition salts include inorganic acid addition salts such as, for example, hydrochloride, hydrobromide, hydroiodide, sulfate, nitrate, phosphate, etc., organic acid addition salts such as, for example, acetate, maleate, fumarate, citrate, oxalate, succinate, tartrate, malate, mandelate, methanesulfonate, p-toluenesulfonate, trifluoroacetate, camphorsulfonate, etc. Illustrative examples of base addition salts include inorganic base salts such as, for example, ammonium salts and organic base salts such as, for example, ethylenediamine, ethanolamine, N,N-dialkylenethanolamine, triethanolamine, glutamine, amino acid basic salts, etc. Illustrative examples of metal salts include, for example, sodium, potassium, calcium, magnesium, aluminum and lithium salts. In a particular embodiment, the salt is an acid addition salt, such as hydrochloride, hydrobromide, hydroiodide, sulfate, nitrate, phosphate, acetate, maleate, fumarate, citrate, oxalate, succinate, tartrate, malate, mandelate, methanesulfonate, p-toluenesulfonate, trifluoroacetate or camphorsulfonate. Preferably, it is selected from HCl, HBr, $H_3PO_4$, $H_2SO_4$, MsOH, pTsOH, TFA, citrate and fumarate salt.

Likewise, the compounds described in the present description can be obtained both as free compounds or as solvates (e.g., hydrates, alcoholates, etc.), both forms being included within the scope of the present invention. The solvation methods are generally known in the state of the art. Preferably, the solvate is a hydrate.

The term "organic solvent" includes for example cyclic and acyclic ethers (e.g. $Et_2O$, $iPr_2O$, $tBu_2O$, MeOtBu, 1,4-dioxane, tetrahydrofuran, methyltetrahydrofuran), hydrocarbon solvents (e.g. pentane, hexane, heptane), halogenated solvents (e.g. dichloromethane, chloroform), aromatic solvents (e.g. toluene, xylene), ketones (e.g. acetone, butanone, pentanone, methyl ethyl ketone, ethyl isopropyl ketone), esters (e.g. EtOAc, iPrOAc), nitriles (e.g. acetonitrile, benzonitrile), amides (e.g. DMF, DMA, HMPA), alcohols (e.g. methanol, ethanol, propanol, isopropanol, sec-butanol, t-butanol), sulfoxides (DMSO) and mixtures thereof.

The term "aprotic organic solvent" means any organic solvent that does not yield a proton under the reaction conditions. Suitable examples include, but are not limited to, cyclic and acyclic ethers (e.g. $Et_2O$, $iPr_2O$, $tBu_2O$, MeOtBu, 1,4-dioxane, tetrahydrofuran, methyltetrahydrofuran), hydrocarbon solvents (e.g. pentane, hexane, heptane), halogenated solvents (e.g. dichloromethane, chloroform), aromatic solvents (e.g. toluene, xylene), ketones (e.g. acetone, butanone, pentanone, methyl ethyl ketone, ethyl isopropyl ketone), esters (e.g. EtOAc, iPrOAc), nitriles (e.g. acetonitrile, benzonitrile), amides (e.g. DMF, DMA, HMPA), sulfoxides (DMSO) and mixtures thereof.

In a first aspect, the present invention is directed to a process for preparing a compound of formula (I), or a salt or solvate thereof, from a compound of formula (II), or a salt or solvate thereof (process of the invention).

In an embodiment, the process of the invention is directed to the preparation of a compound of formula (I), or a salt or solvate thereof, wherein ⚌ is a double bond (compound of formula (I")) from a compound of formula (II), or a salt or solvate thereof, wherein ⚌ is a double bond (compound of formula (In). Therefore, in a particular embodiment, ⚌ represents a double bond in the compounds of the process of the invention (compounds (I"), (II"), (III"), (IV"), (V"), (VI"), (VII"), (VIII")).

In a preferred embodiment, the process of the invention is directed to the preparation of a compound of formula (I), or a salt or solvate thereof, wherein ⚌ is a single bond (compound of formula (I')).

In an embodiment, the process of the invention is directed to the preparation of a compound of formula (I), or a salt or solvate thereof, wherein ⚌ is a single bond (compound of formula (I')) from a compound of formula (II), or a salt or solvate thereof, wherein ⚌ is a single bond (compound of formula (II')). Therefore, in a particular embodiment, ⚌ represents a single bond in the compounds of the process of the invention (compounds (I'), (II'), (III'), (IV'), (V'), (VI'), (VII') (VIII')). Preferably a cis single bond, more preferably a cis-3R single bond.

In another embodiment, the process of the invention is a process for preparing a compound of formula (I), or a salt or solvate thereof, wherein ⚌ is a single bond (compound of formula (I')) from a compound of formula (II), or a salt or solvate thereof, wherein ⚌ is a double bond (compound of formula (II")). In that case, the process of the invention further comprises a step of hydrogenation of the double bond. Hydrogenation can take place at any stage of the process, that is, either before or after any of the steps of the process of the invention. For example, hydrogenation step can be performed after step (a), or after step (bi), or after step (bii), or after step (biii), or after step (bi'), or after step (bi"), or after step (bii").

In a particular embodiment, the process of the invention comprises:
hydrogenation of a compound of formula (II), or a salt or solvate thereof, wherein ⚌ is a double bond to obtain a compound of formula (II), or a salt or solvate thereof, wherein ⚌ is a single bond; and
converting a compound of (II), or a salt or solvate thereof, wherein ⚌ is a single bond into a compound of formula (I), or a salt or solvate thereof, wherein ⚌ is a single bond by the process of the invention wherein ⚌ is a single bond in all the intermediate compounds.

In another embodiment, the process of the invention comprises:
converting a compound of (II), or a salt or solvate thereof, wherein ⚌ is a double bond into a compound of formula (III) or (IV), or a salt or solvate thereof, wherein ⚌ is a double bond;
hydrogenating a compound of formula (III) or (IV), or a salt or solvate thereof, wherein ⚌ is a double bond to obtain a compound of formula (III) or (IV), or a salt or solvate thereof, wherein ⚌ is a single bond; and
converting a compound of formula (III) or (IV), or a salt or solvate thereof, wherein ⚌ is a single bond into a compound of formula (I), or a salt or solvate thereof, wherein ⚌ is a single bond by a process comprising:
(i) reacting the compound of formula (III) or (IV), or a salt or solvate thereof, wherein ⚌ is a single bond with MeMgCl, MeMgBr or MeLi to provide a ketone of formula (V), or a salt or solvate thereof, wherein ⚌ is a single bond;
(ii) converting a ketone of formula (V), or a salt or solvate thereof, wherein ⚌ is a single bond into an enol ether of formula (VI) or an enamine of formula (VII), or a salt or solvate thereof, wherein ⚌ is a single bond; and
(iii) converting an enol ether of formula (VI) or an enamine of formula (VII), or a salt or solvate thereof, wherein ⚌ is a single bond into a compound of formula (I) or a salt or solvate thereof, wherein ⚌ is a single bond;
or
(i') reacting the compound of formula (III) or (IV), or a salt or solvate thereof, wherein ⚌ is a single bond with X—CH$_2$—Li, X—CH$_2$—MgCl or X—CH$_2$—MgBr, to provide a compound of formula (I), or a salt or solvate thereof, wherein ⚌ is a single bond;
or
(i") reacting the compound of formula (III) or (IV), or a salt or solvate thereof, wherein ⚌ is a single bond with R$^6$O—CH$_2$—Li, R$^6$O—CH$_2$—MgCl or R$^6$O—CH$_2$—MgBr, to provide a compound of formula (VIII), or a salt or solvate thereof, wherein ⚌ is a single bond; and
(ii") converting a compound of formula (VIII), or a salt or solvate thereof, wherein ⚌ is a single bond into a compound of formula (I), or a salt or solvate thereof, wherein ⚌ is a single bond.

In another embodiment, the process of the invention comprises:
converting a compound of (II), or a salt or solvate thereof, wherein ⚌ is a double bond into a compound of formula (III) or (IV), or a salt or solvate thereof, wherein ⚌ is a double bond; and
converting a compound of formula (III) or (IV), or a salt or solvate thereof, wherein ⚌ is a double bond into a compound of formula (I), or a salt or solvate thereof, wherein ⚌ is a single bond by a process comprising:
(i) reacting the compound of formula (III) or (IV), or a salt or solvate thereof, wherein ⚌ is a double bond with MeMgCl, MeMgBr or MeLi to provide a ketone of formula (V), or a salt or solvate thereof, wherein ⚌ is a double bond;
(ii) hydrogenating a compound of formula (V), or a salt or solvate thereof, wherein ⚌ is a double bond to obtain a compound of formula (V), or a salt or solvate thereof, wherein ⚌ is a single bond
(iii) converting a ketone of formula (V), or a salt or solvate thereof, wherein ⚌ is a single bond into an enol ether of formula (VI) or an enamine of formula (VII), or a salt or solvate thereof, wherein ⚌ is a single bond; and
(iv) converting an enol ether of formula (VI) or an enamine of formula (VII), or a salt or solvate thereof, wherein ⚌ is a single bond into a compound of formula
(I) or a salt or solvate thereof, wherein ⚌ is a single bond.

In another embodiment, the process of the invention comprises:
converting a compound of (II), or a salt or solvate thereof, wherein ⚌ is a double bond into a compound of formula (III) or (IV), or a salt or solvate thereof, wherein ⚌ is a double bond; and
converting a compound of formula (III) or (IV), or a salt or solvate thereof, wherein ⚌ is a double bond into a compound of formula (I), or a salt or solvate thereof, wherein ⚌ is a single bond by a process comprising:

(i) reacting the compound of formula (III) or (IV), or a salt or solvate thereof, wherein $=$ is a double bond with MeMgCl, MeMgBr or MeLi to provide a ketone of formula (V), or a salt or solvate thereof, wherein $=$ is a double bond;

(ii) converting a ketone of formula (V), or a salt or solvate thereof, wherein $=$ is a double bond into an enol ether of formula (VI) or an enamine of formula (VII), or a salt or solvate thereof, wherein $=$ is a double bond;

(iii) converting an enol ether of formula (VI) or an enamine of formula (VII), or a salt or solvate thereof, wherein $=$ is a double bond into a compound of formula (I) or a salt or solvate thereof, wherein $=$ is a double bond; and (iv) hydrogenating a compound of formula (I), or a salt or solvate thereof, wherein $=$ is a double bond to obtain a compound of formula (I), or a salt or solvate thereof, wherein $=$ is a single bond;

or (i') reacting the compound of formula (III) or (IV), or a salt or solvate thereof, wherein $=$ is a double bond with X—CH$_2$—Li, X—CH$_2$—MgCl or X—CH$_2$—MgBr, to provide a compound of formula (I), or a salt or solvate thereof, wherein $=$ is a double bond; and (ii') hydrogenating a compound of formula (I), or a salt or solvate thereof, wherein $=$ is a double bond to obtain a compound of formula (I), or a salt or solvate thereof, wherein $=$ is a single bond;

or (i") reacting the compound of formula (III) or (IV), or a salt or solvate thereof, wherein $=$ is a double bond with R$^6$O—CH$_2$—Li, R$^6$O—CH$_2$—MgCl or R$^6$O—CH$_2$—MgBr, to provide a compound of formula (VIII), or a salt or solvate thereof, wherein $=$ is a double bond;

(ii") converting a compound of formula (VIII), or a salt or solvate thereof, wherein $=$ is a double bond into a compound of formula (I), or a salt or solvate thereof, wherein $=$ is a double bond; and (iii") hydrogenating a compound of formula (I), or a salt or solvate thereof, wherein $=$ is a double bond to obtain a compound of formula (I), or a salt or solvate thereof, wherein $=$ is a single bond.

In another embodiment, the process of the invention comprises:

converting a compound of (II), or a salt or solvate thereof, wherein $=$ is a double bond into a compound of formula (III) or (IV), or a salt or solvate thereof, wherein $=$ is a double bond; and converting a compound of formula (III) or (IV), or a salt or solvate thereof, wherein $=$ is a double bond into a compound of formula (I), or a salt or solvate thereof, wherein $=$ is a single bond by a process comprising:

(i") reacting the compound of formula (III) or (IV), or a salt or solvate thereof, wherein $=$ is a double bond with R$^6$O—CH$_2$—Li, R$^6$O—CH$_2$—MgCl or R$^6$O—CH$_2$—MgBr, to provide a compound of formula (VIII), or a salt or solvate thereof, wherein $=$ is a double bond;

(ii") hydrogenating a compound of formula (VIII), or a salt or solvate thereof, wherein $=$ is a double bond to provide a compound of formula (VIII), or a salt or solvate thereof, wherein $=$ is a single bond; and (iii") converting a compound of formula (VIII), or a salt or solvate thereof, wherein $=$ is a single bond into a compound of formula (I), or a salt or solvate thereof, wherein $=$ is a single bond.

The process of the invention can comprise, if necessary, one or more of the following steps in any order:

cleavage of the amino protecting group (R$^1$), and/or
protection of the amino group (R$^1$).

Any of these steps can be carried at any stage of the process of the invention. For example, protection of the amino group and/or cleavage of the amino protecting group (R$^1$) can be carried out after step (a), or after step (bi), or after step (bii), or after step (biii), or after step (bi'), or after step (bi"), or after step (bii"). Protection/cleavage of the amino protecting group can be carried out by any conventional means known in the art (e.g. T. H. Greene and P. G. M. Wuts, Protective Groups in Organic Synthesis, 4$^{th}$ edition, John Wiley & Sons, 2007) and as disclosed herein.

For instance, when the amino protecting group in R$^1$ is a carbamate (R$^1$=COOR) it can be easily deprotected by acid or basic hydrolysis according to well-stablished procedures of the state of the art. Suitable acids include formic acid, acetic acid, trifluoroacetic acid, methanesulfonic acid, trifluoromethanesulfonic acid, hydrochloric acid, hydrobromic acid, hydrofluoric acid, perchloric acid, sulfuric acid, nitric acid, phosphoric acid, formic acid, propionic acid, butyric acid, malic acid, citric acid, fumaric acid, benzoic acid, TFA, MsOH, pTsOH, oxalic acid and succinic acid, preferably HCl, HBr, H$_3$PO$_4$, H$_2$SO$_4$, MsOH, pTsOH, TFA, citric acid and fumaric acid. Suitable bases include alkali metal carbonates, alkali metal phosphates, alkali metal alkoxides, alkali metal thioalkoxides and alkali metal hydroxides. In an embodiment, the reaction is carried out in the presence of water and an organic solvent, preferably an alcohol (e.g. methanol, ethanol, n-propanol, i-propanol, n-butanol, t-butanol, 2-butanol, 2-pentanol, 2-hexanol, 2-octanol, ethylene glycol). In an embodiment, the reaction is carried out at a temperature between 10° C. and the reflux temperature of the solvent, preferably between 30° C. and 70° C., more preferably between 40° C. and 60° C. In an embodiment, the reaction is performed in the presence of an acid selected from HCl, HBr, H$_3$PO$_4$, H$_2$SO$_4$, MsOH, pTsOH, TFA, citrate and fumarate, preferably HCl; water and an alcohol, preferably methanol; at a temperature between 30° C. and 70° C., preferably between 40° C. and 60° C. When the amino protecting group in R$^1$ is an amide (R$^1$=COR) it can be deprotected by acid or basic hydrolysis, preferably under heat. Suitable acids include acetic acid, trifluoroacetic acid, methanesulfonic acid, trifluoromethanesulfonic acid, hydrochloric acid, hydrobromic acid, hydrofluoric acid, perchloric acid, sulfuric acid, nitric acid, phosphoric acid. Suitable bases include alkali metal carbonates, alkali metal phosphates, alkali metal alkoxides and alkali metal hydroxides. The reaction can be carried out at a temperature between 20° C. and 120° C., preferably between 50° C. and 110° C., more preferably between 60° C. and 110° C., and can be performed in the presence of an organic solvent, water and mixtures thereof. When the amino protecting group in R$^1$ is an alkyl, aryl or arylalkyl amine (R$^1$=R) it can be deprotected by treatment with an acid, a base, an oxidant, a reductant, by hydrogenolysis (for aryl or arylalkyl amines), etc. When the amino protecting group in R$^1$ is a silyl amine (R$^1$=Si(R)(R')(R")) it can be deprotected by the use of fluoride reagents such as fluoride salts or HF, acid media, oxidizing media, etc.

Preferably, when $=$ is a single bond in any of the compounds of the process of the invention, said single bond has cis configuration, i.e. the two hydrogen atoms on the carbons of said bond are placed on the same side of the pyrrolidine ring. More preferably, when $=$ is a single bond in any of the compounds of the process of the invention, said single bond has cis-3R configuration as shown below, i.e. the two hydrogen atoms on the carbons of said bond are placed on the same side of the pyrrolidine ring and the carbon atom at position 3 of the pyrrolidine ring has the configuration required for the compound Upadacitinib, i.e. R configuration, at the carbon atom to which the imidazopyrrolopyrazinyl ring is bonded in Upadacitinib. Therefore, when ⚌ is a single bond in the compound of formula (I), or (II), or (III), or (IV), or (V), or (VI), or (VII), or (VIII), it is preferably a compound of formula (I'-cis), or (II'-cis), or (III'-cis), or (IV'-cis), or (V'-cis), or (VI'-cis), or (VII'-cis), or (VIII'-cis); more preferably a compound of formula (I'-cis-3R), or (II'-cis-3R), or (III'-cis-3R), or (IV'-cis-3R), or (V'-cis-3R), or (VI'-cis-3R), or (VII'-cis-3R), or (VIII'-cis-3R) as defined herein:

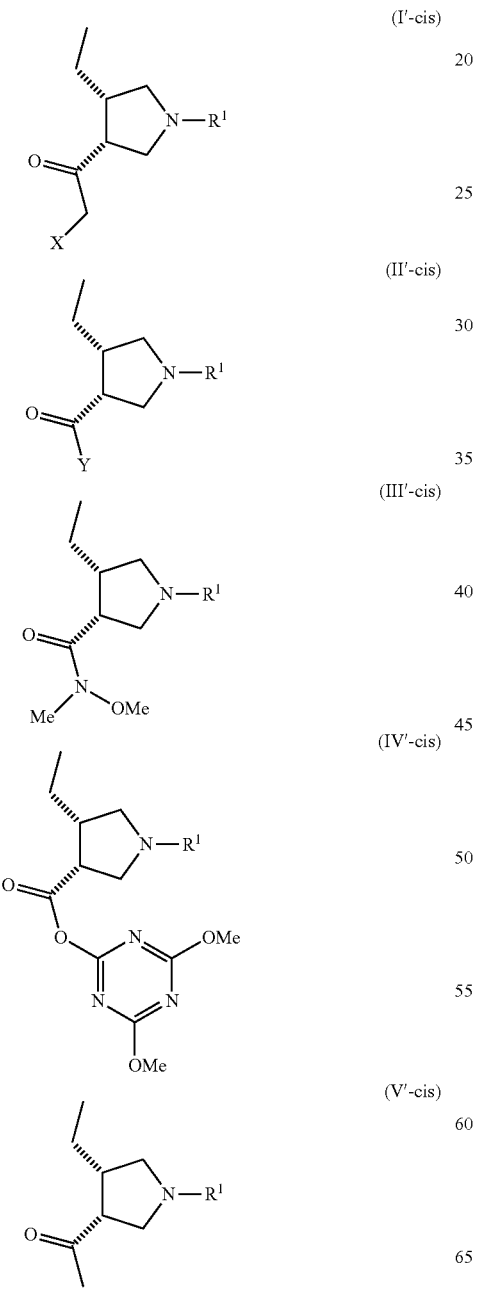
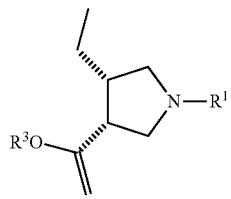
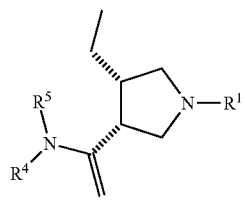
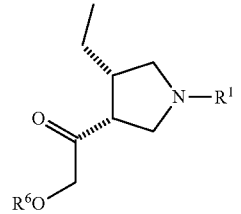
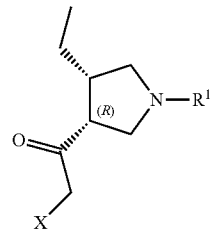
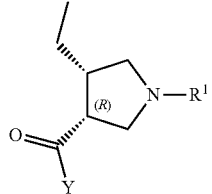
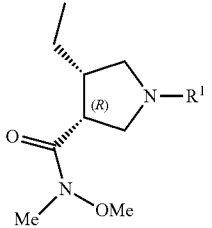

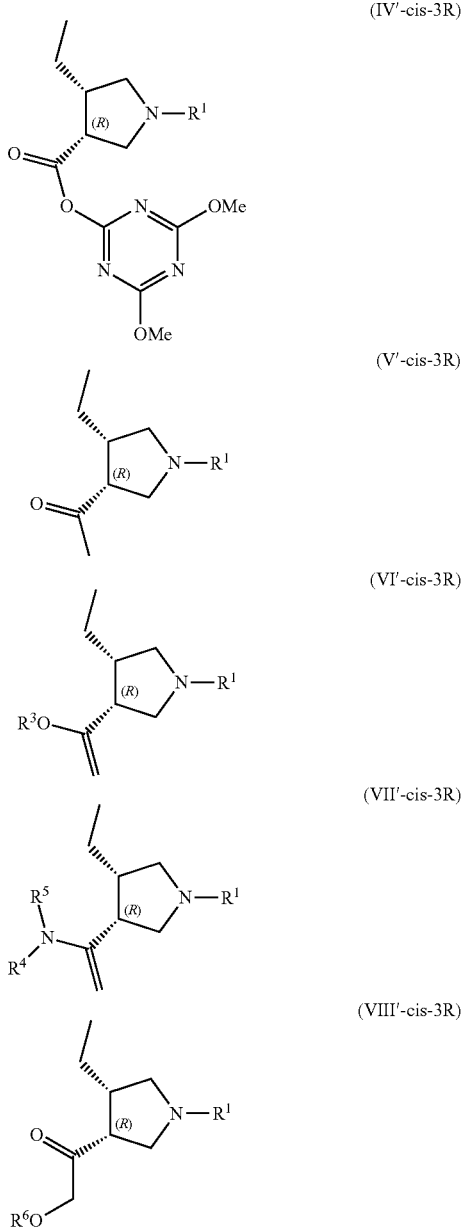

or a salt or solvate thereof, wherein X, Y, $R^1$, $R^3$, $R^4$, $R^5$ and $R^6$ are as defined herein.

As used herein, a wedged bond and a dashed bond ( ⟋ ⟍ ) are used to indicate the absolute configuration of a stereogenic center (R or S), whereas ⟋ and ⟍ are used to indicate the relative configuration of a stereogenic center (cis or trans).

Unless otherwise specified, compounds disclosed herein include their stereoisomers, such as geometric isomers (cis/trans) and optical isomers (i.e. diastereoisomers, racemates, individual enantiomers and mixture of enantiomers in any proportion are covered by the invention).

Preferably, when ⟵⟶ represents a single bond in the compounds of the process of the invention, it includes at least 80% of the cis isomer, preferably at least 90%, more preferably 95%, even more preferably at least 98% of the cis isomer (over the cis+trans mixture). In a more preferred embodiment, it includes only the cis isomer as determined by NMR.

When the compounds of the process of the invention are optically active compounds, preferably they have an enantiomeric excess of at least 80%, at least 90%, at least 95%, at least 98% or at least 99%.

In a preferred embodiment, the process of the invention comprises preparing a compound of formula (I'-cis) from a compound of formula (II'-cis); more preferably, preparing a compound of formula (I'-cis-3R) from a compound of formula (II'-cis-3R), and as defined in the process of the invention (so that all the intermediates in said process are the cis, more preferably the cis-3R, corresponding compounds).

In a particular embodiment, X is a leaving group. Preferred leaving groups are chloro, bromo, iodo, mesylate, triflate, tosylate or nosylate; more preferably, it is selected from Cl, Br and I.

In an embodiment, Y is selected from OH and $OR^2$, wherein $R^2$ is selected from $C_1$-$C_6$ alkyl, $(C_6$-$C_{15})$aryl($C_1$-$C_6$)alkyl and $C_6$-$C_{15}$ aryl. In a particular embodiment, Y is OH.

In an embodiment, $R^1$ is an amino protecting group. As disclosed herein, suitable amino protecting groups include carbamates, amides, amines, sulfonamides and silylamines. In a preferred embodiment, it is a carbamate. Therefore, preferably $R^1$ is a group of formula —COOR, wherein R is selected from $C_1$-$C_6$ alkyl, $C_1$-$C_6$ haloalkyl, $C_2$-$C_6$ alkenyl, $C_3$-$C_{10}$ cycloalkyl, $C_6$-$C_{15}$ aryl, $(C_6$-$C_{15})$aryl($C_1$-$C_6$)alkyl, 3- to 15-membered heterocyclyl, 3- to 15-membered heteroaryl and tri($C_1$-$C_6$ alkyl)silane; such as methyl carbamate (MOC), ethyl carbamate, t-butyl carbamate (Boc), benzyl carbamate (CBz), p-methoxybenzyl carbamate, p-nitrobenzyl carbamate, halobenzyl carbamate, phenylethyl carbamate, allyl carbamate, 9-fluorenylmethyl carbamate (Fmoc), chloroethyl carbamate and trichloroethyl carbamate (Troc).

In an embodiment, $R^3$ is selected from $C_1$-$C_6$ alkyl, $(C_6$-$C_{15})$aryl($C_1$-$C_6$)alkyl, COR' and $SiR'_3$, wherein each R' is independently selected from $C_1$-$C_6$ alkyl, $C_6$-$C_{15}$ aryl and $(C_6$-$C_{15})$aryl($C_1$-$C_6$)alkyl. In a particular embodiment, $R^3$ is a group $SiR'_3$, wherein each R' is independently selected from $C_1$-$C_6$ alkyl, $C_6$-$C_{15}$ aryl and $(C_6$-$C_{15})$aryl($C_1$-$C_6$)alkyl, such as TMS, TES, TBS and TBDPS.

When $R^4$ and $R^5$ form, together with the nitrogen atom to which they are attached, a 5- to 7-membered heterocyclic ring, it is preferably a 5- to 7-membered heterocyclic ring containing one nitrogen atom, or two nitrogen atoms, or one nitrogen and one oxygen atom, such as pyrrolidine, piperidine, morpholine, piperazine and azepane.

In a particular embodiment, $R^4$ and $R^5$ are independently selected from $C_1$-$C_6$ alkyl or they form, together with the nitrogen atom, a 5- to 7-membered heterocyclic ring. More preferably, they form, together with the nitrogen atom to which they are attached, a 5- to 7-membered heterocyclic ring, preferably a 5- to 7-membered heterocyclic ring containing one nitrogen atom, or two nitrogen atoms, or one nitrogen and one oxygen atom, such as pyrrolidine, piperidine, morpholine, piperazine and azepane.

$R^6$ is selected from H, —COR' and —CONR'R", wherein R' and R" are independently selected from $C_1$-$C_6$ alkyl, $C_6$-$C_{15}$ aryl and $(C_6$-$C_{15})$aryl($C_1$-$C_6$)alkyl. In a particular embodiment, $R^6$ is a group of formula —COR' and R' is preferably $C_1$-$C_6$ alkyl. In a preferred embodiment, $R^6$ is a group of formula —COtBu (Piv).

Conversion of a Compound of Formula (II) into a Compound of Formula (III) or (IV)

Compounds of formula (II) can be obtained by methods known by the skilled person or disclosed in the art. For example, by methods as disclosed in WO 2011/068881, WO 2013/043826, WO2017/066775 or WO 2019/016745. In an embodiment, the compound of formula (II), or a salt or solvate thereof, can be obtained by a process comprising:

reaction of a compound of formula (IX) or a salt or solvate thereof

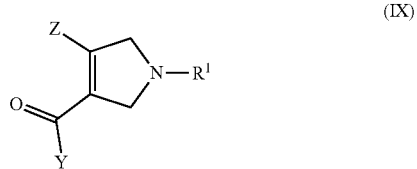

(IX)

wherein
Z is selected from halogen, $C_1$-$C_6$ alkylsulfonates, $C_1$-$C_6$ haloalkylsulfonates, $C_6$-$C_{10}$ arylsulfonates and ($C_1$-$C_6$)alkyl($C_6$-$C_{10}$)arylsulfonates;
$R^1$ is selected from H and amino protecting group; and
Y is selected from OH, Cl, $OR^2$ and $OC(O)R^2$, wherein $R^2$ is selected from $C_1$-$C_6$ alkyl, ($C_6$-$C_{15}$)aryl($C_1$-$C_6$) alkyl and $C_6$-$C_{15}$ aryl;
with $Et_2CuLi$, $Et_2CuMgBr$ or $Et_2CuMgCl$, to provide a compound of formula (II") or a salt or solvate thereof

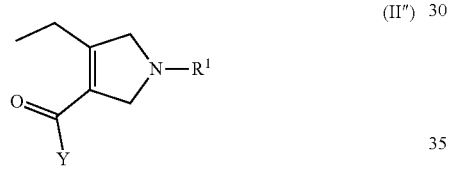

(II")

and
if needed (i.e. if a compound of formula (II') is desired), hydrogenation of the double bond to provide a compound of formula (II'), or a salt or solvate thereof.

Reaction with $Et_2CuLi$, $Et_2CuMgBr$ or $Et_2CuMgCl$ is preferably performed in the presence of an organic solvent. The organic solvent can be an aprotic organic solvent, preferably a cyclic or acyclic ether, more preferably tetrahydrofuran.

Typically, the reaction can be carried out at a temperature between −50° C. and 30° C., preferably between −30° C. and 20° C., more preferably between −10° C. and 10° C.

In an embodiment, the $Et_2CuLi$, $Et_2CuMgBr$ or $Et_2CuMgCl$ is present in an amount of from 1.0 to 5.0 molar equivalents with respect to the compound of formula (IX), preferably from 1.1 to 3.0 molar equivalents.

This process for preparing a compound of formula (II) can further comprise a step of converting Y in the compound of formula (II") or (II') into a different Y group before carrying out the process of the invention for preparing the compound of formula (I).

For example, if a compound of formula (IX), or a salt or solvate thereof, wherein Y is $OR^2$ is used in the above process, a further step can be included after reaction with the cuprate reagent, or after hydrogenation of the double bond (if performed), for example to convert the group $OR^2$ into a group OH. Said conversion can be carried out under acid or basic hydrolysis according to well-stablished procedures of the state of the art. Suitable acids include formic acid, acetic acid, trifluoroacetic acid, methanesulfonic acid, trifluoromethanesulfonic acid, hydrochloric acid, hydrobromic acid, hydrofluoric acid, perchloric acid, sulfuric acid, nitric acid, phosphoric acid, formic acid, propionic acid, butyric acid, malic acid, citric acid, fumaric acid, benzoic acid, TFA, MsOH, pTsOH, oxalic acid and succinic acid, preferably HCl, HBr, $H_3PO_4$, $H_2SO_4$, MsOH, pTsOH, TFA, citric acid and fumaric acid. Suitable bases include alkali metal carbonates, alkali metal phosphates, alkali metal alkoxides, alkali metal thioalkoxide, and alkali metal hydroxides. In an embodiment, the reaction is carried out at a temperature between 10° C. and 120° C., preferably between 30° C. and 70° C., more preferably between 40° C. and 60° C.

In an embodiment, a compound of formula (II), or a salt or solvate thereof, is obtained by a process comprising:

reaction of a compound of formula (IX) or a salt or solvate thereof

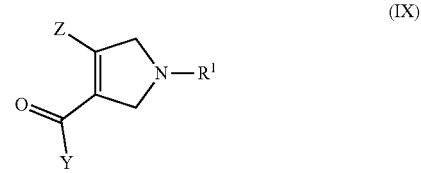

(IX)

wherein
Z is selected from halogen, $C_1$-$C_6$ alkylsulfonates, $C_1$-$C_6$ haloalkylsulfonates, $C_6$-$C_{10}$ arylsulfonates and ($C_1$-$C_6$)alkyl($C_6$-$C_{10}$)arylsulfonates;
$R^1$ is selected from H and amino protecting group; and
Y is $OR^2$, wherein $R^2$ is selected from $C_1$-$C_6$ alkyl, ($C_6$-$C_{15}$)aryl($C_1$-$C_6$)alkyl and $C_6$-$C_{15}$ aryl;
with $Et_2CuLi$ $Et_2CuMgBr$ or $Et_2CuMgCl$, to provide a compound of formula (II") or a salt or solvate thereof

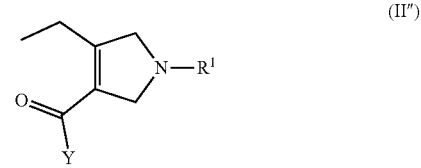

(II")

hydrolysis of a compound of formula (II") wherein Y is $OR^2$, or a salt or solvate thereof, to provide a compound of formula (II") wherein Y is OH;
and
if needed (i.e. if a compound of formula (II') is desired), hydrogenation of the double bond to provide a compound of formula (II'), or a salt or solvate thereof, wherein Y is OH.

Preparation of the compound of formula (II) from a compound of formula (IX) is preferred over the use of the Suzuki reaction disclosed previously in the prior art. It is a less expensive alternative, since it avoids the use of boronic reagents (which are more expensive and cannot be store for a long time) and the use of palladium catalyst.

In a preferred embodiment, $R^1$ is an amino protecting group and Y is OH in the compound of formula (II).

In an embodiment according to the process of the invention, a compound of formula (II), or a salt or solvate thereof, is converted into a compound of formula (III), or a salt or solvate thereof.

Suitable means for this transformation are well-known in the art. In a particular embodiment, this transformation can be carried out by reacting a compound of formula (II) or a salt or solvate thereof, with N,O-dimethylhydroxylamine or a salt thereof, preferably N,O-dimethylhydroxylamine hydrochloride, optionally in the presence of an activating agent and/or a base, and an organic solvent.

Suitable activating or coupling agents are known to those skilled in the art and include, among others, N,N-carbonyldiimidazole (CDI), 1-propanephosphonic acid anhydride (T3P), 1-ethyl-3-(3-dimethylaminopropyl)carbodiimide (EDAC), N,N'-dicyclohexylcarbodiimide (DCC), benzotriazol-1-yl-oxy-tris(dimethylamino) phosphonium hexafluorophosphate (BOP), triphenylphosphine, 1-[bis(dimethylamino)methylene]-1H-1,2,3-triazolo[4,5-b]pyridinium 3-oxide hexafluorophosphate (HATU), O-benzotriazol-1-yl-N,N,N,N-tetramethyluronium hexafluorophosphate (HBTU) and bromo-tripyrrolidino-phosphonium hexafluorophosphates, 2-(1H-Benzotriazole-1-yl)-1,1,3,3-tetramethylaminium tetrafluoroborate (TBTU), 1-cyano-2-ethoxy-2-oxoethylidenaminooxy) dimethylaminomorpholinocarbenium hexafluorophosphate (COMU), $Me_2AlCl$, $Me_3Al$, iPrMgCl; preferably CDI.

Suitable bases include tertiary amines such as trimethylamine, triethylamine, diisopropylethylamine (DIPEA), pyridine (pyr), 4-dimethylaminopyridine (DMAP), N-methylmorpholine (NMM), 2,6-lutidine, and mixtures thereof.

Preferably, the organic solvent is selected from an aprotic organic solvent, such as dichloromethane, tetrahydrofuran and mixtures thereof, preferably dichloromethane.

Typically, the reaction can be carried out at a temperature between −10° C. and 70° C., preferably between 0° C. and 50° C., more preferably between 10° C. and 30° C.

In an embodiment, the N,O-dimethylhydroxylamine or a salt thereof, is present in an amount of from 1.0 to 3.0 molar equivalents with respect to the compound of formula (II), preferably from 1.1 to 2.0 molar equivalents. In a particular embodiment, the activating or coupling agent is present in an amount of from 1.0 to 3.0 molar equivalents with respect to the compound of formula (II), preferably from 1.1 to 2.0 molar equivalents. In an embodiment, the base is present in an amount of from 1.0 to 3.0 molar equivalents with respect to the compound of formula (II), preferably from 1.1 to 2.0 molar equivalents.

In a particular embodiment, when Y in the compound of formula (II) represents Cl or $OC(O)R^2$, reaction with N,O-dimethylhydroxylamine or a salt thereof is performed in the presence of a base and optionally an organic solvent.

In another embodiment, when Y in the compound of formula (II) represents OH, reaction with N,O-dimethylhydroxylamine or a salt thereof is performed in the presence of an activating agent and optionally an organic solvent.

In another embodiment, when Y in the compound of formula (II) represents $OR^2$, reaction with N,O-dimethylhydroxylamine or a salt thereof is performed in the presence of $Me_2AlCl$, $Me_3Al$ or iPrMgCl, and optionally an organic solvent.

In another embodiment according to the process of the invention, a compound of formula (II), or a salt or solvate thereof, is converted into a compound of formula (IV), or a salt or solvate thereof.

Suitable means for this transformation are well-known in the art. In a particular embodiment, this transformation can be carried out by reacting a compound of formula (II) or a salt or solvate thereof, with 6-chloro-2,4-dimethoxy-1,3,5-triazine (CDMT), optionally in the presence of a base and an organic solvent.

Suitable bases include tertiary amines such as trimethylamine, triethylamine, diisopropylethylamine (DIPEA), pyridine (pyr), 4-dimethylaminopyridine (DMAP), N-methylmorpholine (NMM), 2,6-lutidine, and mixtures thereof; preferably NMM.

Preferably, the organic solvent is selected from an aprotic organic solvent.

Typically, the reaction can be carried out at a temperature between −10° C. and 70° C.

Conversion of a Compound of Formula (III) or (IV) into a Compound of Formula (V)

In a preferred embodiment, $R^1$ is an amino protecting group in the compound of formula (III) or (IV).

This transformation can be performed by reacting a compound of formula (III) or (IV), or a salt or solvate thereof, with MeMgCl, MeMgBr or MeLi optionally in the presence of an organic solvent.

The organic solvent can be an aprotic organic solvent, preferably a cyclic or acyclic ether, more preferably tetrahydrofuran.

Typically, the reaction can be carried out at a temperature between −50° C. and 30° C., preferably between −30° C. and 20° C., more preferably between −10° C. and 10° C.

In an embodiment, the MeMgCl, MeMgBr or MeLi is present in an amount of from 1.0 to 5.0 molar equivalents with respect to the compound of formula (III) or (IV), preferably from 1.1 to 3.0 molar equivalents.

It is important to note that, when ⇌ represents a cis single bond in the compound of formula (III) or (IV), no isomerization to the trans isomer is observed after reaction with MeMgCl, MeMgBr or MeLi to provide the compound of formula (V).

Conversion of a Compound of Formula (V) into a Compound of Formula (VI)

In a preferred embodiment, $R^1$ is an amino protecting group in the compound of formula (V).

In an embodiment according to the process of the invention, a compound of formula (V), or a salt or solvate thereof, is converted into a compound of formula (VI), or a salt or solvate thereof.

The inventors have observed that the desired enol ether is obtained in a regioselective manner. Therefore, subsequent treatment of this compound gives rise to the introduction of the X group at the terminal position and without isomerization of the pyrrolidine carbon atom to which the carbonyl group is attached.

This reaction can be carried out by means of well-known processes for the synthesis of enol ethers. In an embodiment, compounds of formula (VI) wherein $R^3$ is $SiR'_3$ can be obtained by reaction of a compound of formula (V), or a salt or solvate thereof, with a compound of formula $R'_3SiZ$, wherein each R' is independently selected from $C_1$-$C_6$ alkyl, $C_6$-$C_{10}$ aryl and $C_1$-$C_6$ alkoxy, and Z is halogen or triflate, in the presence of a base. Suitable bases include tertiary amines, such as $Me_3N$, $Et_3N$, DIPEA, Pyr, DMAP, NMM, 2,6-lutidine and mixtures thereof. The reaction may be carried out in the presence of an organic solvent, preferably an aprotic organic solvent, and may be carried out at a temperature between −30° C. and 70° C., preferably between −30° C. and 20° C., more preferably between −10° C. and 10° C.

In another embodiment, compounds of formula (VI) wherein $R^3$ is $C_1$-$C_6$ alkyl can be obtained by reaction of a compound of formula (V), or a salt or solvate thereof, with a trialkyl orthoformate in the presence of an acid. Suitable acids include include acetic acid, trifluoroacetic acid, chloroacetic acid, methanesulfonic acid, trifluoromethanesulfonic acid, formic acid, propionic acid, butyric acid, malic acid, citric acid, benzoic acid, p-toluenesulfonic acid, oxalic acid, succinic acid, hydrochloric acid, hydrobromic acid, hydrofluoric acid, perchloric acid, chloric acid, sulfuric acid, nitric acid, phosphoric acid, $ZnCl_2$, $AlCl_3$ and $BF_3$. The reaction may be carried out in the presence of an organic solvent, and may be carried out at a temperature between −20° C. and 120° C., preferably between 10° C. and 90° C. In an embodiment, the reaction is carried out in the presence of methyl or ethyl orthoformate, an acid and an organic solvent.

In another embodiment, compounds of formula (VI) wherein $R^3$ is Ac can be obtained by reaction of a compound of formula (V), or a salt or solvate thereof, with isopropenyl acetate, or acetic anhydride or an acetyl halide, in the presence of an acid or a base. Suitable acids include sulfuric acid, perchloric acid, pTsOH and sulfonic acid. Suitable bases include pyridine, DMAP, $Me_3N$, $Et_3N$ and DIPEA. The reaction may be carried out in the presence of an organic solvent and may be carried out at a temperature between 20° C. and 120° C., preferably between 40° C. and 120° C.

In a preferred embodiment, $R^1$ is an amino protecting group and $R^3$ is $SiR'_3$, wherein each R' is independently selected from $C_{1-6}$ alkyl, $C_{6-10}$ aryl and $C_{1-6}$ alkoxy, in the compound of formula (VI). In a more preferred embodiment, $R^3$ is $SiR'_3$, wherein each R' is independently selected from $C_{1-6}$ alkyl, such as TMS, TES, TBDMS, TIPS.

Conversion of a Compound of Formula (V) into a Compound of Formula (VII)

In a preferred embodiment, $R^1$ is an amino protecting group in the compound of formula (V).

In an embodiment according to the process of the invention, a compound of formula (V), or a salt or solvate thereof, is converted into a compound of formula (VII), or a salt or solvate thereof.

This reaction can be carried out by means of well-known processes for preparing enamines from the corresponding ketones. In an embodiment, this conversion may be achieved by reacting the compound of formula (V), or a salt or solvate thereof, with an amine of formula $HN(R^4)R^5$ optionally in the presence of an acid and an organic solvent.

Suitable acids include, for example, p-toluenesulfonic acid, benzenesulfonic acid, phosphoric acid and hydrochloric acid. It may be possible to use the acid in catalytic amounts. In an embodiment, the reaction is performed with 0.01 to 0.5 mol acid per mol of the ketone of formula (V).

In an embodiment, the amine $HN(R^4)R^5$ is used in an amount of from 1.0 to 5.0 molar equivalents with respect to the compound of formula (V), preferably from 1.1 to 3.0 molar equivalents.

This conversion can be typically performed at a temperature between 20° C. and 180° C., preferably from 50° C. to 150° C., more preferably from 60° C. to 130° C.

In a preferred embodiment, $R^1$ is an amino protecting group and $R^4$ and $R^5$ are independently selected from $C_1$-$C_6$ alkyl or they form, together with the nitrogen atom, a 5- to 7-membered heterocyclic ring, in the compound of formula (VII). Preferably, the 5- to 7-membered heterocyclic ring is a 5- to 7-membered heterocyclic ring containing one nitrogen atom or two nitrogen atoms or one nitrogen and one oxygen atom, such as pyrrolidine, piperidine, morpholine, piperazine and azepane.

Conversion of a Compound of Formula (VI) or (VII) into a Compound of Formula (I)

In an embodiment according to the process of the invention, a compound of formula (VI) or (VII), or a salt or solvate thereof, is converted into a compound of formula (I), or a salt or solvate thereof. Suitable means for this transformation are well-known in the art.

In a particular embodiment, this transformation can be carried out by reacting a compound of formula (VI) or (VII), or a salt or solvate thereof, with a halogenating agent optionally in the presence of an organic solvent. According to this process, a compound of formula (I), or a salt or solvate thereof, wherein X is halogen is obtained.

Suitable halogenating agents include, among others, thionyl chloride, oxalyl chloride, NCS, $Br_2$, $CBr_4$, NBS, $I_2$, $Cl_4$, NIS.

The organic solvent can be an aprotic organic solvent, preferably, dichloromethane or a cyclic or acyclic ether, more preferably tetrahydrofuran or dichloromethane.

Typically, the reaction can be carried out at a temperature between −80° C. and 30° C., preferably between −50° C. and 30° C., more preferably between −20° C. and 20° C.

In an embodiment, the halogenating agent is present in an amount of from 1.0 to 5.0 molar equivalents with respect to the compound of formula (VI) or (VII), preferably from 1.1 to 3.0 molar equivalents.

In another embodiment, conversion of a compound of formula (VI) or (VII), or a salt or solvate thereof, into a compound of formula (I), or a salt or solvate thereof, is carried out by epoxidation of the double bond of the enol ether of formula (VI) or the enamine of formula (VII), followed by ring opening to provide a compound of formula (VIII) wherein $R^6$ is H

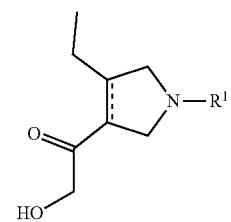

or a salt or solvate thereof, wherein ≡ is a single or double bond and $R^1$ is selected from H and amino protecting group.

In an embodiment, epoxidation reaction is carried out in the presence of a peroxycarboxylic acid, hydrogen peroxide or oxone, preferably a peroxycarboxylic acid such as mCPBA, benzoic acid, monoperphthalic acid or magnesium monoperoxyphthalate (MMPP). The reaction may be carried out in the presence of an organic solvent, and may be carried out at a temperature between −40° C. and 120° C., preferably between −20° C. and 40° C. In an embodiment, the reaction is carried out in the presence of mCPBA and an aprotic polar solvent, such as dichloromethane.

Ring opening of the resulting epoxide may be carried out by treatment with water, and acid or a fluoride source. Suitable acids include, for example, acetic acid, trifluoroacetic acid, methanesulfonic acid, trifluoromethanesulfonic acid, hydrochloric acid, hydrobromic acid, hydrofluoric acid, perchloric acid, sulfuric acid, nitric acid, phosphoric acid, formic acid, propionic acid, butyric acid, malic acid, citric acid, benzoic acid, p-toluenesulfonic acid, oxalic acid and succinic acid. Suitable fluoride sources include HF and fluoride salts, such as CsF, RbF, NaF and TBAF. The reaction may be carried out in the presence of an organic solvent, and may be carried out at a temperature between −40° C. and 120° C., preferably between −20° C. and 40° C.

The compound of formula (VIII) wherein $R^6$ is H, or a salt or solvate thereof, can be converted in to a compound of formula (I), o a salt or solvate thereof, by means of processes well-known in the art. In an embodiment, conversion of the primary hydroxyl group into a leaving group is carried out by treatment with a halogenating agent, such as $I_2$, NaI, $Br_2$, $CBr_4$, $PBr_3$, $Cl_2$, thionyl chloride, oxalyl chloride; or with a sulphonyl chloride, such as TsCl or MsCl. This reaction is preferably carried out in the presence of an organic solvent at a temperature from −78° C. to 80° C., preferably from −40° C. to 40° C.

In a preferred embodiment, $R^1$ is an amino protecting group in the compound of formula (I).

In a preferred embodiment, the conversion of a compound of formula (V), or a salt or solvate thereof, into a compound of formula (I), or a salt or solvate thereof, is performed in a one-pot process. That is, without isolation of the intermediate compound of formula (VI) or (VII), or a salt or solvate thereof.

Conversion of a Compound of Formula (III) or (IV) into a Compound of Formula (I)

In a preferred embodiment, $R^1$ is an amino protecting group in the compound of formula (III) or (IV).

This transformation can be performed by reacting a compound of formula (III) or (IV), or a salt or solvate thereof, with a compound of formula X—$CH_2$—Li, X—$CH_2$—MgCl or X—$CH_2$—MgBr, wherein X is a leaving group, optionally in the presence of an organic solvent.

The organic solvent can be an aprotic organic solvent, preferably a cyclic or acyclic ether, more preferably tetrahydrofuran.

Typically, the reaction can be carried out at a temperature between −80° C. and 30° C., preferably between −80° C. and 0° C., more preferably between −80° C. and −20° C.

In an embodiment, the compound X—$CH_2$—Li, X—$CH_2$—MgCl or X—$CH_2$—MgBr is present in an amount of from 1.0 to 8.0 molar equivalents with respect to the compound of formula (III) or (IV), preferably from 1.1 to 5.0 molar equivalents.

In a preferred embodiment, $R^1$ is an amino protecting group in the compound of formula (I).

Conversion of a Compound of Formula (III) or (IV) into a Compound of Formula (VIII)

In a preferred embodiment, $R^1$ is an amino protecting group in the compound of formula (III) or (IV).

This transformation can be performed by reacting a compound of formula (III) or (IV), or a salt or solvate thereof, with a compound of formula $R^6$O—$CH_2$—Li, $R^6$O—$CH_2$—MgCl or $R^6$O—$CH_2$—MgBr, wherein $R^6$ is selected from —COR' and —CONR'R", wherein R' and R" are independently selected from $C_1$-$C_6$ alkyl, $C_6$-$C_{15}$ aryl and ($C_6$-$C_{15}$)aryl($C_1$-$C_6$)alkyl optionally in the presence of an organic solvent.

In a particular embodiment, $R^6$ is a group of formula —COR, wherein R is selected from $C_1$-$C_6$ alkyl, $C_6$-$C_{15}$ aryl and ($C_6$-$C_{15}$) aryl($C_1$-$C_6$)alkyl. Preferably, $R^6$ is a group of formula —COtBu (Piv).

The organic solvent can be an aprotic organic solvent, preferably a cyclic or acyclic ether, more preferably tetrahydrofuran.

Typically, the reaction can be carried out at a temperature between −80° C. and 30° C., preferably between −80° C. and 0° C., more preferably between −80° C. and −20° C.

In an embodiment, the compound $R^6$O—$CH_2$—Li, $R^6$O—$CH_2$—MgCl or $R^6$O—$CH_2$—MgBr is present in an amount of from 1.0 to 8.0 molar equivalents with respect to the compound of formula (III) or (IV), preferably from 1.1 to 5.0 molar equivalents.

In a preferred embodiment, $R^1$ is an amino protecting group and $R^6$ is selected from —COR' and —CONR'R", preferably —COR', wherein R' and R" are independently selected from $C_1$-$C_6$ alkyl, $C_6$-$C_{15}$ aryl and ($C_6$-$C_{15}$) aryl ($C_1$-$C_6$)alkyl in the compound of formula (VIII) obtained after this reaction.

In an embodiment of the invention, when a compound of formula (VIII), or a salt or solvate thereof, wherein $R^6$ is selected from —COR' and —CONR'R" is obtained, it is transformed into a compound of formula (VIII), or a salt or solvate thereof, wherein $R^6$ is hydrogen before converting it into a compound of formula (I), or a salt or solvate thereof.

This transformation of a compound of formula (VIII), or a salt or solvate thereof, wherein $R^6$ is —COR' or —CONR'R" into a compound of formula (VIII), or a salt or solvate thereof, wherein $R^6$ is hydrogen, can be carried out under acid or basic hydrolysis reaction conditions. Suitable acids include formic acid, acetic acid, trifluoroacetic acid, methanesulfonic acid, trifluoromethanesulfonic acid, hydrochloric acid, hydrobromic acid, hydrofluoric acid, perchloric acid, sulfuric acid, nitric acid, phosphoric acid, formic acid, propionic acid, butyric acid, malic acid, citric acid, fumaric acid, benzoic acid, TFA, MsOH, pTsOH, oxalic acid and succinic acid, preferably HCl, HBr, $H_3PO_4$, $H_2SO_4$, MsOH, pTsOH, TFA, citric acid and fumaric acid. Suitable bases include alkali metal carbonates, alkali metal phosphates, alkali metal alkoxides, alkali metal thioalkoxides and alkali metal hydroxides, such as NaOH, KOH, NaOtBu, NaOMe, NaSMe. In an embodiment, the hydrolysis reaction is carried out in the presence of water and an organic solvent, preferably an alcohol (e.g. methanol, ethanol, n-propanol, i-propanol, n-butanol, t-butanol, 2-butanol, 2-pentanol, 2-hexanol, 2-octanol, ethylene glycol). In an embodiment, the reaction is carried out at a temperature between 10° C. and 120° C., preferably between 30° C. and 70° C., more preferably between 40° C. and 60° C.

Conversion of a Compound of Formula (VIII) into a Compound of Formula (I)

In a preferred embodiment, $R^1$ is an amino protecting group and $R^6$ is H in the compound of formula (VIII).

The compound of formula (VIII) wherein $R^6$ is H, or a salt or solvate thereof, can be converted in to a compound of formula (I), o a salt or solvate thereof, by means of processes well-known in the art. In an embodiment, conversion of the primary hydroxyl group into a leaving group is carried out by treatment with a halogenating agent, such as $I_2$, NaI, $Br_2$, $CBr_4$, $PBr_3$, $Cl_2$, thionyl chloride, oxalyl chloride; or with a sulphonyl chloride, such as TsCl or MsCl. This reaction is preferably carried out in the presence of an organic solvent at a temperature from −78° C. to 80° C., preferably from −40° C. to 40° C.

In a preferred embodiment, $R^1$ is an amino protecting group in the compound of formula (I).

Hydrogenation Reaction

The process of the invention can comprise a step of hydrogenation of the double bond in the pyrrolidine ring into a single bond.

In an embodiment, the process of the invention is a process for preparing a compound of formula (I), or a salt or solvate thereof, wherein ⹀ is a single bond from a compound of formula (II), or a salt or solvate thereof, wherein ⹀ is a double bond. In that case, the process of the invention further comprises a step of hydrogenation of the double bond. Hydrogenation can take place at any stage of the process, for example, after step (a), or after step (bi), or after step (bii), or after step (biii), or after step (bi'), or after step (bi"), or after step (bii").

This reaction can be carried out by means of well-known processes for hydrogenating double bonds. In an embodiment, this reaction is performed by reacting a compound of the process of the invention wherein ⹀ is a double bond with $H_2$ in the presence of a transition metal catalyst and optionally an organic solvent.

Suitable transition metal catalysts or compounds include, for example, supported and unsupported catalysts of a transition metal selected from Pd, Pt, Ni, Rh, Ru, Ir, Mo, Cr, Co, Cu and Fe, such as Pd/C, Pt/C, Pt/C, Pd/$CaCO_3$, Pd/$Al_2O_3$, Pd/$BaCO_3$, $Pd_2(dba)_3$, $PdCl_2(CH_3CN)_2$, $Pd(PPh_3)_4$, $Pd(CF_3CO_2)_2$, $Pd(CH_3CO_2)_2$, Pt/$Al_2O_3$, $PtO_2$, Ra—Ni, Ru/C, Ru/$Al_2O_3$, $Ru(OH)_2$, $Ru(OAc)_2$, $[RuCl_2(p$-cymene$)]_2$, bis(1,5-cyclooctadiene)ruthenium (II) polymer, dichlorobenzeneruthenium(II) dimer, dibromobenzeneruthenium(II) dimer, $RHCl(PPh_3)_3$, bis(1,5-cyclooctadiene) rhodium tetrafluoroborate, Bis(1,5-cyclooctadiene)iridium tetrafluoroborate, bis(1,5-cyclooctadiene)diiridium dichloride, $FeCl_2$, $FeBr_2$, $Fe(CH_3CO_2)_2$, $[Fe(OH_2)_6](BF_4)_2$, CuCl, $[CuH(Ph_3)]_6$.

In a particular embodiment, the reaction is an asymmetric hydrogenation reaction. In that case, an optically active catalyst is used in the reaction. An optically active catalyst is an optically active transition metal compound obtained by mixing a transition metal compound with an optically active chiral ligand. Therefore, in a particular embodiment, this reaction is performed by reacting a compound of the process of the invention wherein ⹀ is a double bond with $H_2$ in the presence of a transition metal compound, an optically active chiral ligand and optionally an organic solvent. When an asymmetric hydrogenation is performed, an optically active compound is obtained, preferably a compound of formula (I'-cis-3R), or (II'-cis-3R), or (III'-cis-3R), or (IV'-cis-3R), or (V'-cis-3R), or (VI'-cis-3R), or (VII'-cis-3R), or (VIII'-cis-3R).

Suitable transition metal compounds or catalysts are as defined above, and are preferably selected from Ru, Pd, Pt, Rh and Ir compounds.

Optically active chiral ligands can be monodentate, bidentate, tridentate or tetradentate. They include cyclic or acyclic heteroatom-containing metal-binding functional groups such as phosphines, phosphites, phosphinates, phosphoramidites, sulfonamide-phosphoramidites, phosphinoxides, N-heterocyclic carbenes, diamines, imidazoles, aminoalcohols, diols, oxazolines, imines and aminoacids.

Preferably, the optically active ligand is a P,P-, or P,N, or P,O, or P,S-bidentate ligand, preferably a P,P-bidentate ligand, more preferably a diphosphine ligand.

Suitable but not limiting examples of optically active chiral ligands are (S)-BINAP, (S)-TolBINAP, (S)-XylBINAP, (S)-Cy-BINAP, (S)-H8-BINAP, (S)-MeOBIPHEP, di-tBu-MeOBIPH EP, (S)-SEGPHOS, (S)-DM-SEGPHOS, (S)-DTBM-SEGPHOS, (S)-QUINAP, (S,S)-BDPP, (S)-BIPHEMP, (S)-Me-BPE, (S,S)-DIOP, (S,S)-DIOP-OH, (S,S)-DIPAMP, (S)-SYN PHOS, (S,S)-CHIRAPHOS, (S,S)-Me-DuPHOS, (R)-(S)-BPPFA, (R)-(S)-BPPFOH, (2S,4S)-BPPM, (R)-(S)-JOSI PHOS, (R)-(S)-XYLIPHOS, (R)-PROPHOS, (R)-MeO-MOP, and enantiomers thereof.

In an embodiment, asymmetric hydrogenation is performed in the presence of a Ru compound, such as $Ru(OAc)_2$, an optically active chiral ligand, preferably a diphosphine ligand, such as (S)-SEGPHOS, and an organic solvent, preferably an alcohol. In an embodiment, the reaction is performed in the presence of $Ru(OAc)_2$ and (S)-SEGPHOS, for example as disclosed in WO 2017/066775.

The transition metal catalyst may be present in an amount between 0.01 and 50 wt %, preferably between 1 and 10 wt %, with respect to the amount of the compound wherein ⹀ is a double bond. If an optically active transition metal catalyst is used, the optically active ligand may be used in an amount between 0.01 and 50 wt %, preferably between 1 and 10 wt %, with respect to the amount of compound wherein ⹀ is a double bond.

The reaction may be carried out in the presence of an organic solvent, such as an ether (e.g. $Et_2O$, $iPr_2O$, $tBu_2O$, MeOtBu, 1,4-dioxane, tetrahydrofuran, methyltetrahydrofuran), hydrocarbon solvents (e.g. pentane, hexane, heptane), halogenated solvents (e.g. dichloromethane, chloroform), aromatic solvents (e.g. toluene, xylene), ketones (e.g. acetone, butanone, pentanone, methyl ethyl ketone, ethyl isopropyl ketone), esters (e.g. EtOAc, iPrOAc), nitriles (e.g. acetonitrile, benzonitrile), amides (e.g. DMF, DMA, HMPA), alcohols (e.g. methanol, ethanol, propanol, isopropanol, sec-butanol, t-butanol), sulfoxides (DMSO), acids (AcOH) and mixtures thereof.

This reaction is carried out in the presence of H2, preferably at a pressure between 1 and 100 atm, preferably 2 and 50 atm. In an embodiment, the reaction is carried out at a temperature between −80° C. and 100° C., preferably −20° C. and 90° C., more preferably between 0° C. and 50° C. Sources of hydrogen include H2, formic acid or a salt thereof, and cyclohexene.

Preferably, the term optically active as used herein, refers to a compound with an enantiomeric excess of at least 50%. More preferably, it refers to an enantiomeric excess of at least 70%, at least 80%, at least 90%, at least 95%, at least 98% or at least 99%.

Preferably, after hydrogenation reaction the cis isomer is selectively obtained. The term "selectively" in relation to the hydrogenated compound means that a ratio of the cis isomer with respect to the trans isomer of at least 80:20, preferably at least 90:10, more preferably at least 95:5, even more preferably at least 98:2, is obtained.

When an asymmetric hydrogenation is performed, preferably the desired isomer (e.g. cis-3R isomer) is obtained with an enantiomeric excess of at least 90%, at least 95%, preferably at least 98% or at least 99%.

Preparation of Upadacitinib

The process of the invention can further comprise conversion of the compound of formula (I), or a salt or solvate thereof, into Upadacitinib.

Therefore, in another aspect the invention is directed to a process for preparing Upadacitinib, or a salt or solvate or stereoisomer thereof, comprising:

preparing a compound of formula (I) or a salt or solvate thereof

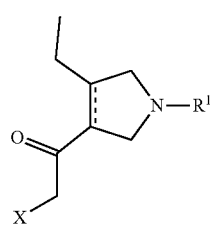

(I)

wherein

--- is a single or double bond;

X is a leaving group, and

R¹ is selected from H, and amino protecting group; by a process as defined herein; and converting a compound of formula (I), or a salt or solvate thereof, into Upadacitinib, or a salt or solvate or stereoisomer thereof.

Conversion of the compound of formula (I), or a salt or solvate thereof, into Upadacitinib, or a salt or solvate or stereoisomer thereof, can be carried out by methods known in the art. For example, as disclosed in WO 2013/043826 or WO2017/066775.

In a particular embodiment, conversion of a compound of formula (I), or a salt or solvate thereof, into Upadacitinib, or a salt or solvate or stereoisomer thereof, can be carried out by a process comprising:

(i) reacting a compound of formula (I), or a salt or solvate thereof, with a compound of formula (IX)

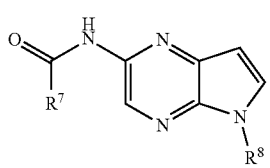

(IX)

wherein $R^7$ is selected from $C_1$-$C_6$ alkyl, $C_1$-$C_6$ alkoxyl, $C_6$-$C_{15}$ aryl and ($C_6$-$C_{15}$) aryl $C_1$-$C_6$)alkyl, preferably it is methyl or ethyl; and $R^8$ is an amino protecting group, preferably Ts;

to provide a compound of formula (X) or a salt or solvate thereof

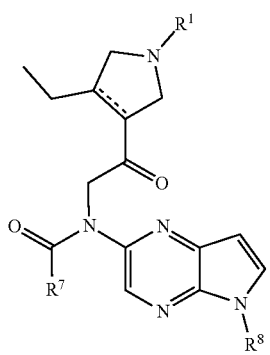

(X)

wherein

--- is a single or double bond; and

R¹ is selected from H, and amino protecting group; preferably an amino protecting group, (ii) reacting a compound of formula (X), or a salt or solvate thereof, with a perfluoro acid anhydride and a base to form a compound of formula (XI) or a salt or solvate thereof

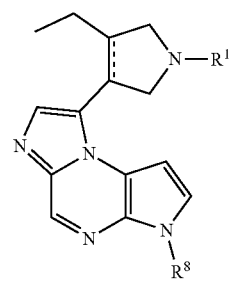

(XI)

(iii) when R¹ is an amino protecting group, deprotecting the R¹ group in the compound of formula (XI), or a salt or solvate thereof, to provide a compound of formula (XII) or a salt or solvate thereof

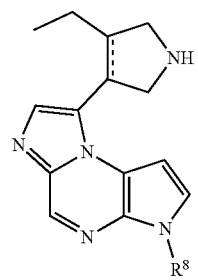

(XII)

wherein

--- is a single or double bond; and $R^8$ is selected from H, and amino protecting group;

(iv) converting a compound of formula (XII), or a salt or solvate thereof, into a compound of formula (XIII) or a salt or solvate thereof

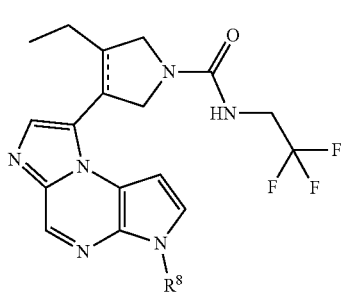
(XIII)

wherein R⁸ is selected from H, and amino protecting group;

(v) if needed, i.e. when R⁸ is an amino protecting group, deprotecting the compound of formula (XIII), or a salt or solvate thereof, to provide a compound of formula (XIII) wherein R⁸ is H, or a salt or solvate thereof.

If needed, i.e. when ⸺ represents a double bond in the compound of formula (I), the process further comprises a hydrogenation step at any stage of the synthesis of Upadacitinib. For example, after step (i), or after step (ii), or after step (iii), or after step (iv), or after step (v).

In an embodiment, the process comprises:
(i) reacting a compound of formula (I), or a salt or solvate thereof, with a compound of formula (IX) as defined above, to provide a compound of formula (X) or a salt or solvate thereof as defined above,
(ii) reacting a compound of formula (X) as defined above, or a salt or solvate thereof, with a perfluoro acid anhydride and a base to form a compound of formula (XI) or a salt or solvate thereof

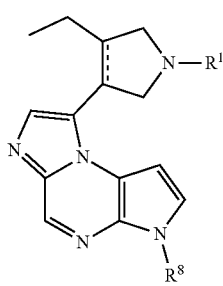
(XI)

(iii) deprotecting the compound of formula (XI), or a salt or solvate thereof, to provide a compound of formula (XII') or a salt or solvate thereof

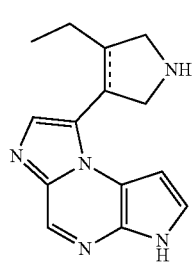
(XII')

(iv) converting a compound of formula (XII), or a salt or solvate thereof, into a compound of formula (XIII') or a salt or solvate thereof

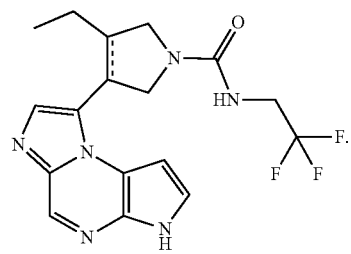
(XIII')

If needed, i.e. when ⸺ represents a double bond in the compound of formula (I), the process further comprises a hydrogenation step at any stage of the synthesis of Upadacitinib. For example, after step (i), or after step (ii), or after step (iii), or after step (iv).

In a preferred embodiment, the compound of formula (I) is compound (I-cis-3R) and so the process for preparing Upadacitinib or a salt or solvate thereof comprises:
(i) reacting a compound of formula (I-cis-3R) wherein R¹ is an amino protecting group, or a salt or solvate thereof, with a compound of formula (IX), to provide a compound of formula (X-cis-3R) or a salt or solvate thereof

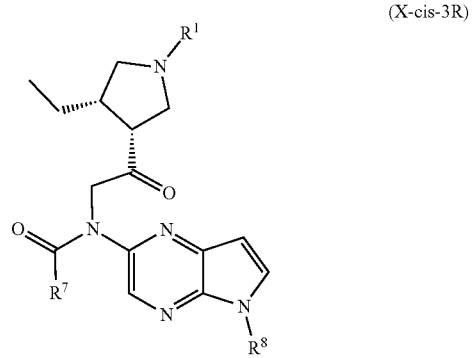
(X-cis-3R)

wherein
R¹ is selected from H, and amino protecting group;
R⁷ is selected from $C_1$-$C_6$ alkyl, $C_1$-$C_6$ halkoxyl, $C_6$-$C_{15}$ aryl and ($C_6$-$C_{15}$)aryl $C_1$-$C_6$)alkyl, preferably it is methyl or ethyl; and
R⁸ is an amino protecting group, preferably Ts;
(ii) reacting a compound of formula (X-cis-3R), or a salt or solvate thereof, with a perfluoro acid anhydride and a base to form a compound of formula (XI-cis-3R) or a salt or solvate thereof

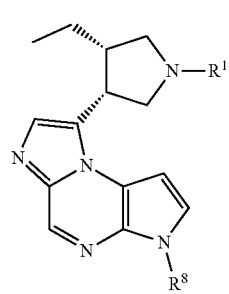
(XI-cis-3R)

(iii) when $R^1$ is an amino protecting group, deprotecting the $R^1$ group in the compound of formula (XI-cis-3R), or a salt or solvate thereof, to provide a compound of formula (XII-cis-3R) or a salt or solvate thereof

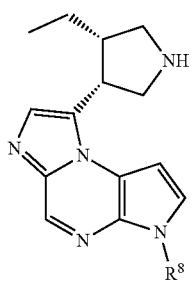

(XII-cis-3R)

wherein
$R^8$ is selected from H, and amino protecting group;
(iv) converting a compound of formula (XII-cis-3R), or a salt or solvate thereof, into a compound of formula (XIII-cis-3R), or a salt or solvate thereof

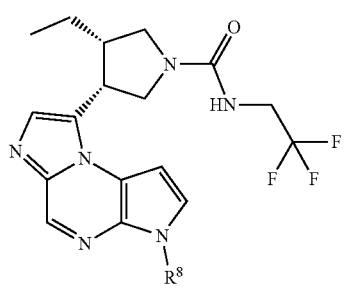

(XIII-cis-3R)

wherein $R^8$ is selected from H, and amino protecting group;
(v) if needed, i.e. when $R^8$ is an amino protecting group, deprotecting the compound of formula (XIII-cis-3R), or a salt or solvate thereof, to provide Upadacitinib, or a salt or solvate thereof.

In a particular embodiment, this process comprises:
(i) reacting a compound of formula (I-cis-3R) wherein $R^1$ is an amino protecting group, or a salt or solvate thereof, with a compound of formula (IX), to provide a compound of formula (X-cis-3R) as defined above, or a salt or solvate thereof,
(ii) reacting a compound of formula (X-cis-3R) as defined above, or a salt or solvate thereof, with a perfluoro acid anhydride and a base to form a compound of formula (XI-cis-3R) or a salt or solvate thereof

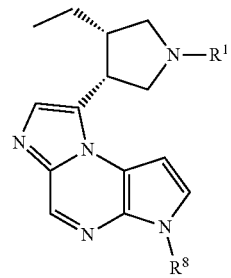

(XI-cis-3R)

(iii) deprotecting the compound of formula (XI-cis-3R), or a salt or solvate thereof, to provide a compound of formula (XII'-cis-3R) or a salt or solvate thereof (XII'-cis-3R)

(iv) converting a compound of formula (XII'-cis-3R), or a salt or solvate thereof, into Upadacitinib, or a salt or solvate thereof.

In a preferred embodiment, the compound of formula (I) is compound (I-cis-3R) such as compound 10

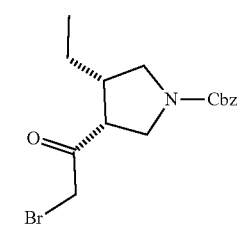

10 and the process for preparing Upadacitinib or a salt or solvate thereof comprises:
(i) reacting a compound of formula (I-cis-3R) such as compound 10, or a salt or solvate thereof, with a compound of formula (IX) such as compound 20,

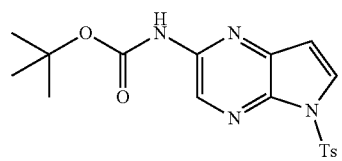

20 to provide a compound of formula (X-cis-3R) or a salt or solvate thereof such as compound 21

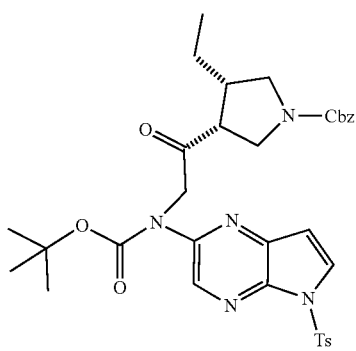

21

(ii) reacting a compound of formula (X-cis-3R) such as compound 21, or a salt or solvate thereof, with a perfluoro acid anhydride and a base to form a compound of formula (XI-cis-3R) such as compound 22 or a salt or solvate thereof

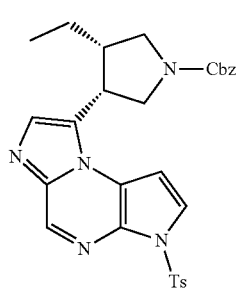

22

(iii) deprotecting the compound of formula (XI-cis-3R) such as compound 22, or a salt or solvate thereof, to provide a compound of formula (XII-cis-3R) such as compound 23 or a salt or solvate thereof

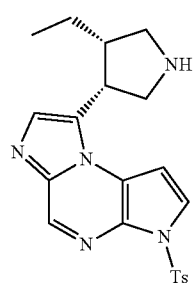

23

(iv) converting a compound of formula (XII) such as compound 23, or a salt or solvate thereof, into Upadacitinib, or a salt or solvate thereof.

Suitable conditions for transformations (i)-(v) are disclosed in the prior art (e.g. WO 2017/066775) or known by the skilled person.

In an embodiment, step (i) can be performed in the presence of a base, such as NaH, tBuOLi, tBuONa or tBuOK, optionally in the presence of an organic solvent, preferably an aprotic organic solvent.

Step (ii) may be carried out in the presence of a perfluoro acid anhydride, optionally in the presence of perfluorocarboxylic acid, and optionally in the presence of an organic solvent. Suitable perfluorocarboxylic acids include, for example, trifluoroacetic acid, pentafluoropropionic acid, heptafluorobutyric acid.

Suitable perfluoro acid anhydrides include, for example, trifluoroacetic acid anhydride, pentafluoropropionic acid anhydride, heptafluorobutyric acid anhydride.

Steps (iii) and (v) can be carried out by any conventional means known in the art for the cleavage of amino protecting groups (e.g. T. H. Greene and P. G. M. Wuts, Protective Groups in Organic Synthesis, 4th edition, John Wiley & Sons, 2007) and as disclosed herein.

Step (iv) can be performed by reaction with 2,2,2-trifluoroethylamine in the presence of CDI and optionally an organic solvent.

Intermediate Compounds

Compounds of formula (III), (IV), (V), (VI) and (VII), and salts or solvates thereof, are useful intermediates in the preparation of compounds of formula (I) and, therefore, in the synthesis of Upadacitinob and structurally related compounds.

In another aspect, the invention is directed to a compound of formula:

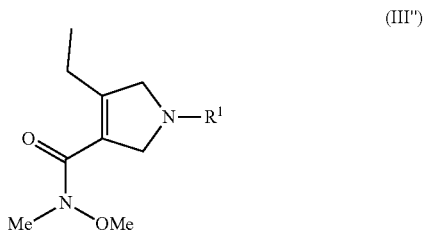

(III'')

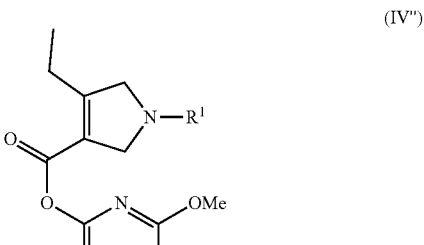

(IV'')

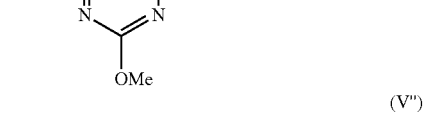

(V'')

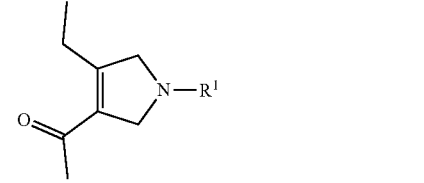

(VI'')

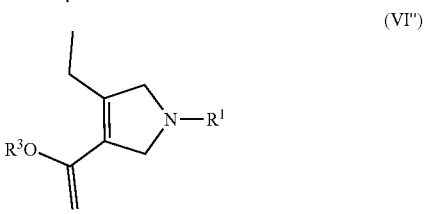

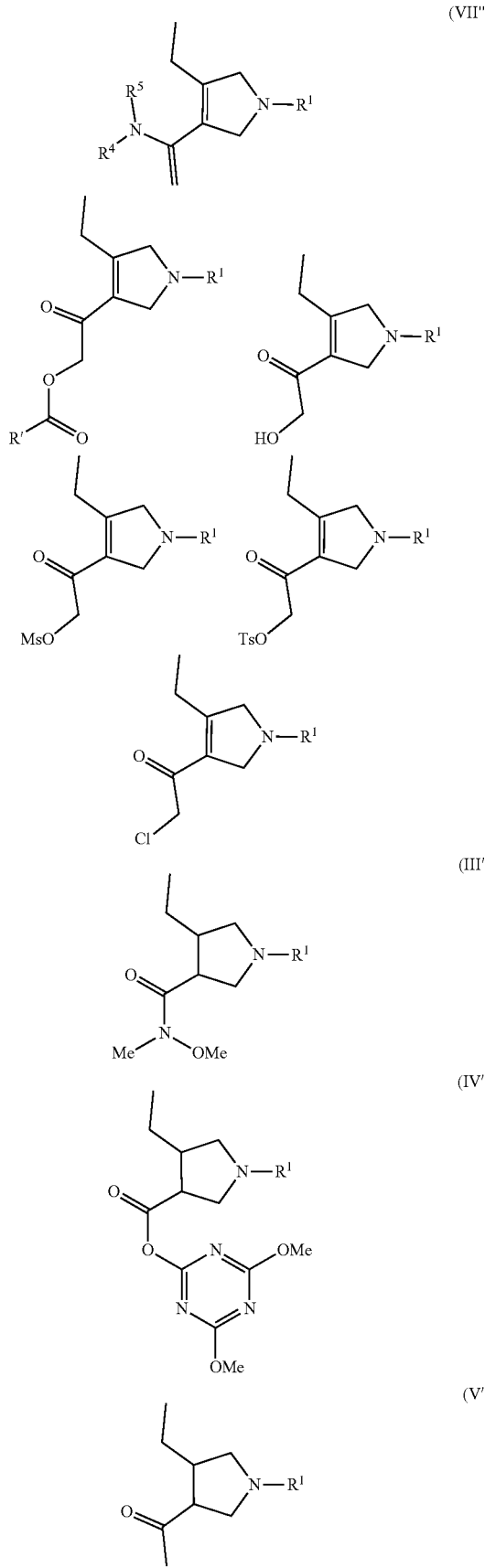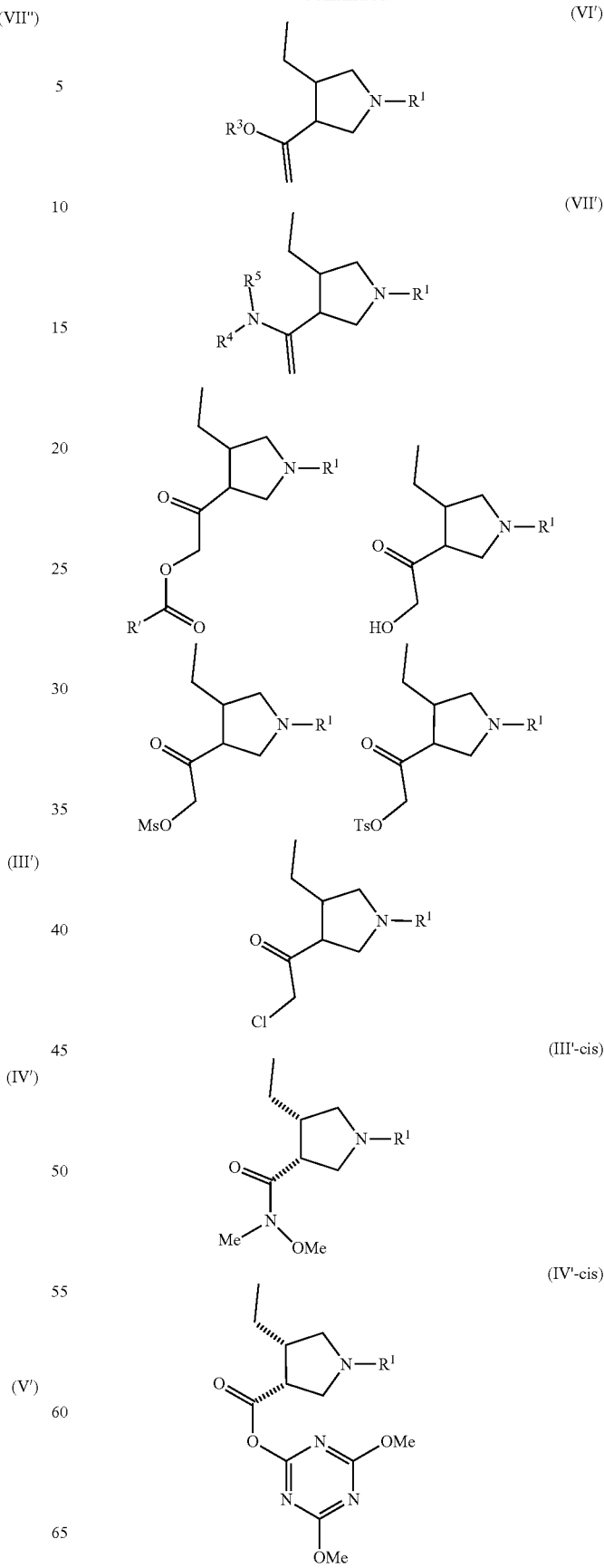

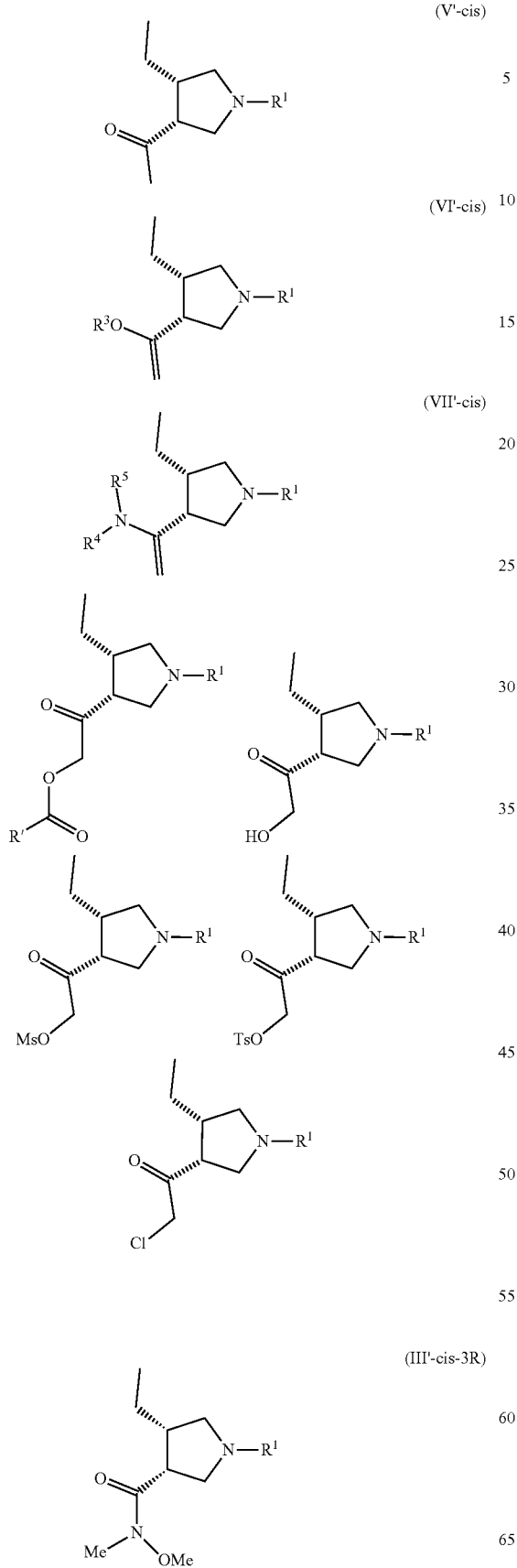
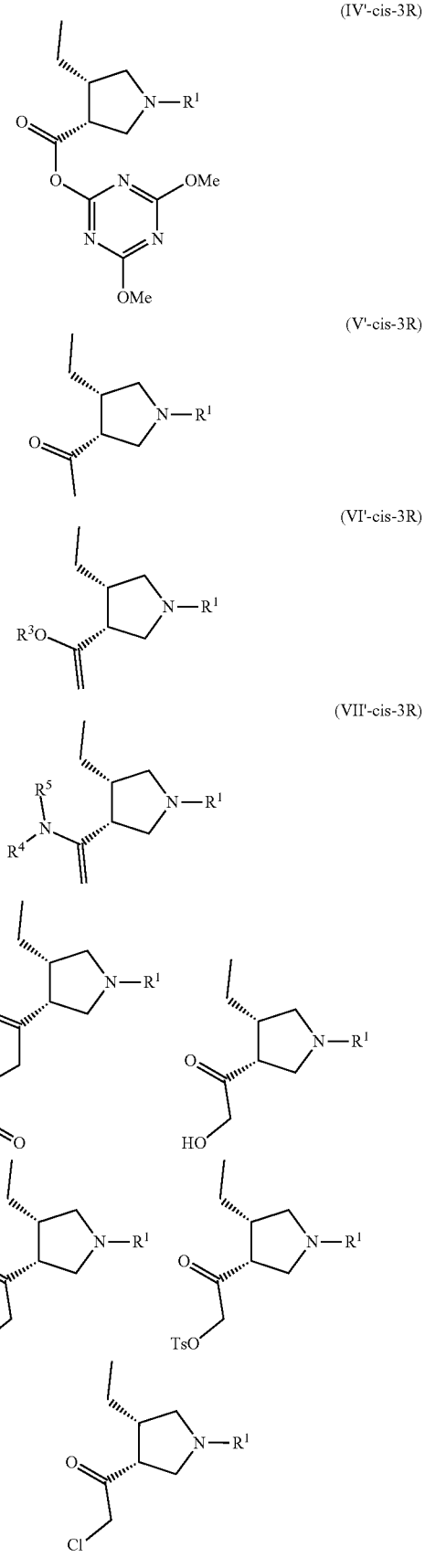

or a salt or solvate thereof, wherein:

$R^1$ is selected from H and amino protecting group;

$R^3$ is selected from $C_1$-$C_6$ alkyl, $(C_6$-$C_{15})$aryl$(C_1$-$C_6)$ alkyl, $C_6$-$C_{15}$ aryl, COR' and SiR'$_3$, wherein each R' is independently selected from $C_1$-$C_6$ alkyl, $C_3$-$C_{10}$ cycloalkyl, $C_6$-$C_{15}$ aryl and $(C_6$-$C_{15})$aryl$(C_1$-$C_6)$alkyl;

$R^4$ and $R^5$ are independently selected from $C_1$-$C_6$ alkyl, $(C_6$-$C_{15})$aryl$(C_1$-$C_6)$alkyl and $C_6$-$C_{15}$ aryl or they form, together with the nitrogen atom, a $C_5$-$C_7$-membered heterocyclic ring; and R' is selected from $C_1$-$C_6$ alkyl, $(C_6$-$C_{15})$aryl$(C_1$-$C_6)$alkyl and $C_6$-$C_{15}$ aryl.

Suitable and preferred embodiments for R', $R^1$, $R^3$, $R^4$ and $R^5$ are as defined herein in relation to the process of the invention.

In an embodiment, $R^1$ is selected from:

COOR$^a$, wherein R$^a$ is selected from $C_1$-$C_6$ alkyl, $C_1$-$C_6$ haloalkyl, $C_2$-$C_6$ alkenyl, $C_3$-$C_{10}$ cycloalkyl, $C_6$-$C_{15}$ aryl, $(C_6$-$C_{15})$aryl$(C_1$-$C_6)$alkyl, 3- to 15-membered heterocyclyl, 3- to 15-membered heteroaryl and tri$(C_1$-$C_6$ alkyl)silane;

COR$^b$, wherein R$^b$ is selected from $C_1$-$C_6$ alkyl, $C_2$-$C_6$ alkenyl, $C_3$-$C_{10}$ cycloalkyl, $C_6$-$C_{15}$ aryl, $(C_6$-$C_{15})$aryl$(C_1$-$C_6)$alkyl, 3- to 15-membered heterocyclyl and 3- to 15-membered heteroaryl;

R$^c$, wherein R$^c$ is selected from $C_1$-$C_6$ alkyl, $C_6$-$C_{15}$ aryl and $(C_6$-$C_{15})$aryl$(C_1$-$C_6)$alkyl;

SO$_2$R$^d$, wherein R$^d$ is selected from $C_1$-$C_6$ alkyl, $C_1$-$C_6$ haloalkyl, $C_6$-$C_{15}$ aryl, $(C_6$-$C_{15})$aryl$(C_1$-$C_6)$alkyl, 3- to 15-membered heterocyclyl, 3- to 15-membered heteroaryl; and Si(R$^e$)(R$^f$)(R$^g$), wherein R$^e$, R$^f$ and R$^g$ are independently selected from $C_1$-$C_6$ alkyl, $C_3$-$C_{10}$ cycloalkyl, $C_6$-$C_{15}$ aryl and $(C_6$-$C_{15})$aryl$(C_1$-$C_6)$alkyl.

Preferably, R' is selected from $C_1$-$C_6$ alkyl; more preferably tBu.

Preferably, $R^1$ is a group of formula COOR, wherein R is selected from $C_1$-$C_6$ alkyl, $C_1$-$C_6$ haloalkyl, $C_2$-$C_6$ alkenyl, $C_3$-$C_{10}$ cycloalkyl, $C_6$-$C_{15}$ aryl, $(C_6$-$C_{15})$aryl$(C_1$-$C_6)$alkyl, 3- to 15-membered heterocyclyl, 3- to 15-membered heteroaryl and tri$(C_1$-$C_6$ alkyl)silane; such as methyl carbamate (MOC), ethyl carbamate, t-butyl carbamate (Boc), benzyl carbamate (Cbz), p-methoxybenzyl carbamate, p-nitrobenzyl carbamate, halobenzyl carbamate, phenylethyl carbamate, allyl carbamate, 9-fluorenylmethyl carbamate (Fmoc), chloroethyl carbamate and trichloroethyl carbamate (Troc). In an embodiment, it is selected from Cbz and Boc.

Preferably, $R^3$ is selected from $C_1$-$C_6$ alkyl, $(C_6$-$C_{15})$aryl$(C_1$-$C_6)$alkyl, COR' and SiR'$_3$, wherein each R' is independently selected from $C_1$-$C_6$ alkyl, $C_{6-15}$ aryl and $(C_6$-$C_{15})$aryl$(C_1$-$C_6)$alkyl. More preferably, $R^3$ is a group SiR'$_3$, wherein each R' is independently selected from $C_1$-$C_6$ alkyl, $C_6$-$C_{15}$ aryl and $(C_6$-$C_{15})$aryl$(C_1$-$C_6)$alkyl, such as TMS, TES, TBS and TBDPS.

In a particular embodiment, $R^4$ and $R^5$ are independently selected from $C_1$-$C_6$ alkyl or they form, together with the nitrogen atom, a 5- to 7-membered heterocyclic ring. More preferably, they form, together with the nitrogen atom to which they are attached, a 5- to 7-membered heterocyclic ring, preferably a 5- to 7-membered heterocyclic ring containing one nitrogen atom or two nitrogen atoms or one nitrogen and one oxygen atom, such as pyrrolidine, piperidine, morpholine, piperazine and azepane.

In a particular embodiment, the invention is directed to a compound of formula

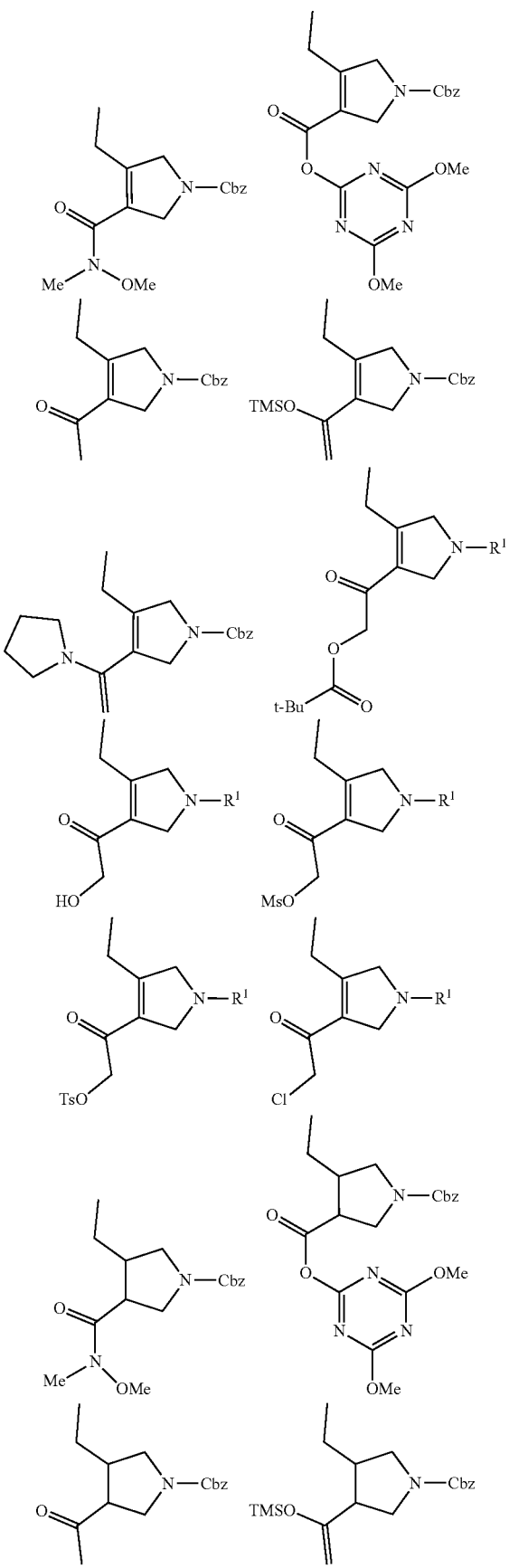

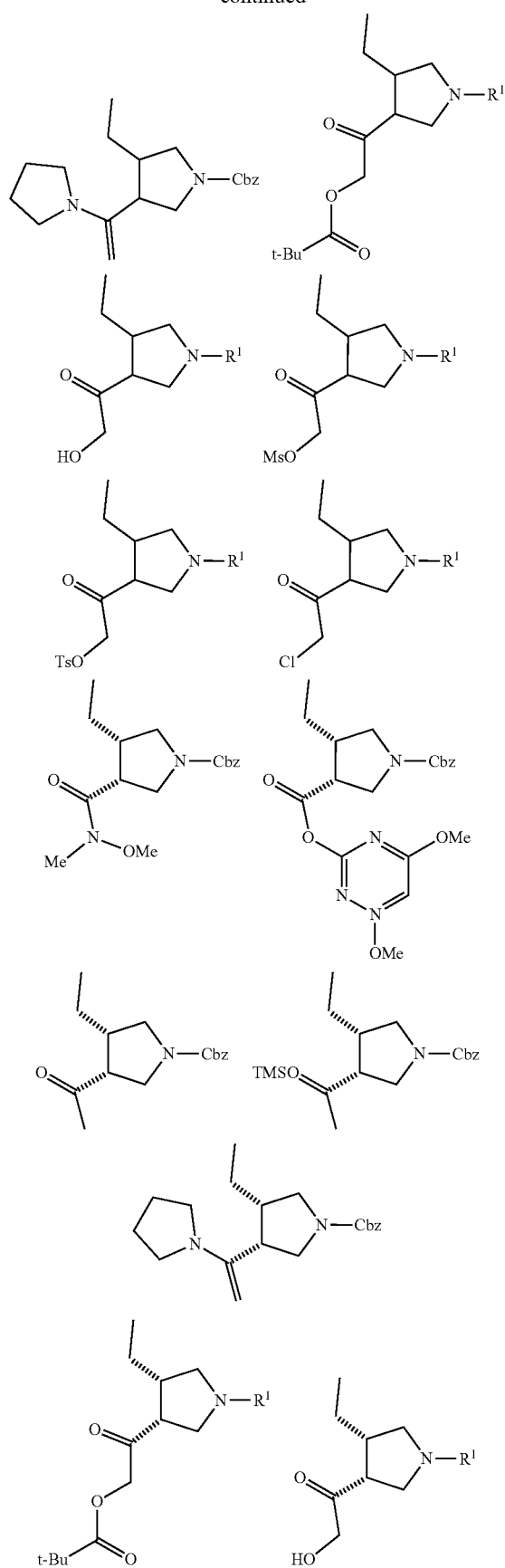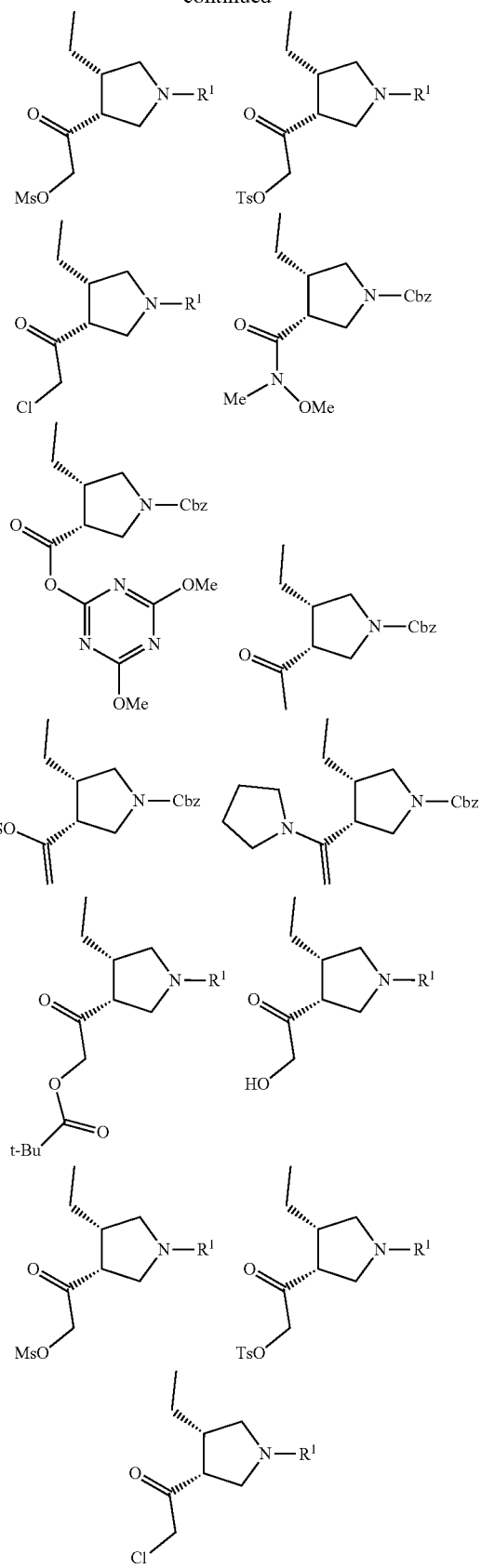
or a salt or solvate thereof.

It should be understood that the scope of the present disclosure includes all the possible combinations of embodiments disclosed herein.

EXAMPLES

Example 1: Synthesis of Cis-Weinreb Amide (2) from Cis-Carboxylic Acid (1)

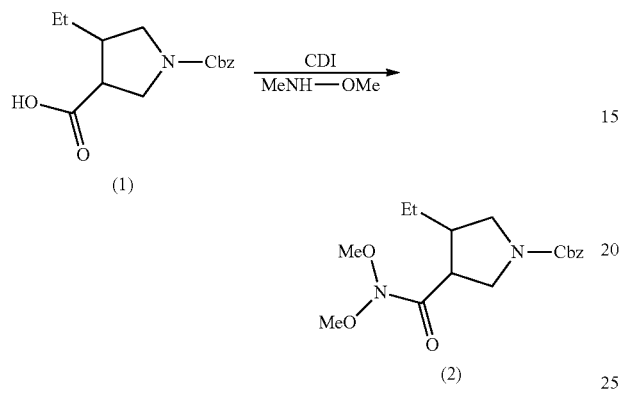

Under an argon atmosphere, 6 g of cis-compound (1) (21.63 mmol) were dissolved in 40 ml of dichloromethane, and the resulting solution was cooled to 0-5° C. with an ice bath. 4.56 g of CDI (1.3 eq.) were slowly added in portions to said solution. The reaction mixture was stirred for 20 min and then allowed to warm to room temperature. Then, 2.74 g of N,O-Dimethylhydroxylamine (1.3 eq) were added. When the reaction was found to be completed by TLC, it was quenched with an aqueous solution of HCl 1M until pH 4-6 and 100 ml of AcOEt. The organic layer was washed with water (60 ml) and the solvent evaporated under reduced pressure to yield 6.86 g of cis-compound (2) as an oil. The obtained compound was sufficient pure for its direct use in the subsequent reaction step. $^1$H NMR (500 MHz, CDCl$_3$) δ 7.26 (s, 5H), 5.23-5.05 (m, 2H), 3.79-3.71 (m, 1H), 3.71-3.66 (m, 3H), 3.63-3.54 (m, 2H), 3.50 (dd, J=14.7, 9.2 Hz, 1H), 3.45-3.33 (m, 1H), 3.24-3.13 (m, 3H), 2.41-2.30 (m, 1H), 1.56-1.36 (m, 1H), 1.36-1.20 (m, 1H), 0.91 (dd, J=14.0, 7.3 Hz, 3H).

Example 2: Synthesis of Cis-Ketone (3) from Cis-Weinreb Amide (2)

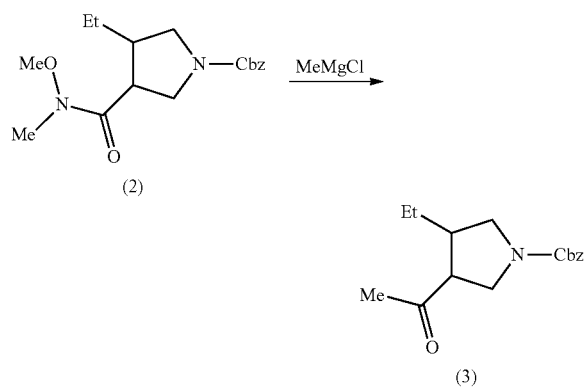

Under argón atmosphere, 5.96 g of cis-compound (2) (18.6 mmol) were dissolved in 60 ml of dry THF, and the resulting solution was cooled to 0-5° C. with an ice bath. 12.4 ml of a 3M solution of MeMgCl in THF (2 eq) were added slowly so than the temperature did not exceed 5° C. The reaction mixture was stirred for 15-30 min and followed by TLC. Then, it was quenched with sat. aq. NH$_4$Cl and extracted with 100 ml of EtOAc. The organic layer was washed with water (20-30 ml) and the solvent evaporated under reduced pressure to yield 4.8 g of a brown oil. The resulting oil was extracted by addition of 40-100 ml of hot heptane, yielding an undissolved colorless residue. Heptane extracts were evaporated under reduced pressure to yield 4.7 g of pure cis-compound (3) (91% yield). $^1$H NMR (500 MHz, CDCl$_3$) δ 7.26 (s, 5H), 5.13 (qd, J=12.5, 3.8 Hz, 2H), 3.88-3.17 (m, 5H), 2.42-2.29 (m, 1H), 2.18 (s, 3H), 1.66 (s, 1H), 1.44-1.17 (m, 2H), 0.94 (dd, J=15.9, 7.4 Hz, 3H).

Example 3: Synthesis of Cis-Silyl Enol Ether (4) from Cis-Ketone (3)

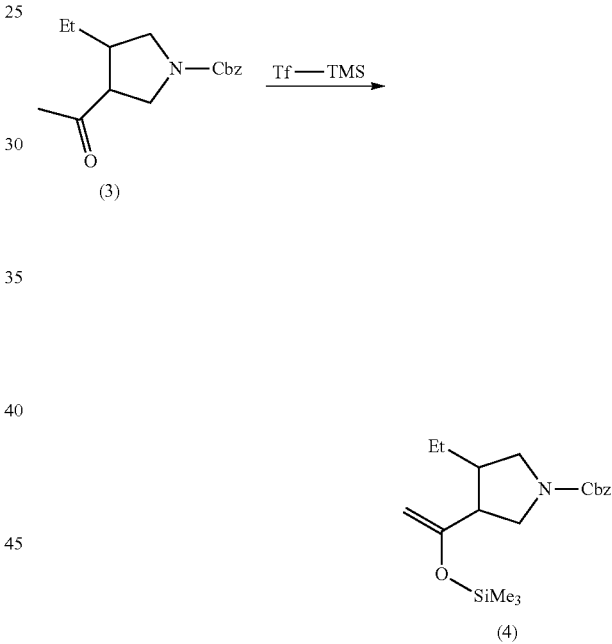

5.55 g of cis-compound (3) (20.6 ml) were dissolved in 100 ml of anhydrous dichloromethane under argon atmosphere, and the resulting solution was cooled to 0-5° C. with an ice bath. 6.7 ml of trimethylsilyl triflate (1.8 eq) were added followed by the addition of 5.62 ml of anhydrous trimethylamine (2 eq). The reaction mixture was stirred until completion by TLC (15-60 min). The reaction was quenched by addition of 100 ml of a 7% aqueous solution of NaHCO$_3$ and extracted with 100 ml of dichloromethane. The solvent was evaporated under reduced pressure to yield an oil (6.9 g) that was directly used in the subsequent reaction. $^1$H NMR (500 MHz, CDCl$_3$) δ 7.43-7.28 (m, 5H), 5.24-5.04 (m, 2H), 4.00 (dd, J=26.5, 7.0 Hz, 2H), 3.58-3.42 (m, 3H), 3.28-3.08 (m, 1H), 2.83-2.65 (m, 1H), 2.30-2.00 (m, 1H), 1.52-1.37 (m, 1H), 1.43-1.16 (m, 1H), 1.02-0.77 (m, 3H), 0.31-0.04 (m, 9H).

Example 4: Synthesis of Cis-Compound (5) from Cis-Silyl Enol Ether (4)

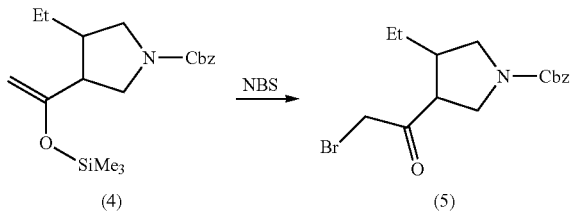

The oil obtained in the previous example (4) was dissolved in 50 ml of dry THF under argon atmosphere and 2 g of NaHCO$_3$ (1.21 eq) were added. The resulting suspension was cooled to 0-5° C. with an ice bath and 4.3 g of NBS (1.21 eq) were then added in portions controlling the temperature. The reaction proceeded quickly and was followed by TLC. The reaction was quenched by addition of 100 ml of 7% aqueous solution of NaHCO$_3$ and extracted with 100 ml of AcOEt. The solvent was evaporated under reduced pressure to yield 8.5 of an oil that could be purified by column chromatography to provide 5.5 g of a white solid (77% yield from ketone (3)). $^1$H NMR (400 MHz, CDCl$_3$) δ 7.45-7.28 (m, 5H), 5.25-4.99 (m, 2H), 3.99-3.82 (m, 2H), 3.81-3.66 (m, 1H), 3.63-3.48 (m, 3H), 3.38 (ddd, J=24.8, 10.7, 7.0 Hz, 1H), 2.53-2.27 (m, 1H), 1.46-1.17 (m, 2H), 1.05-0.85 (m, 3H).

Example 5: Synthesis of Cis-Hydroxy Ketone (6) from Cis-Weinreb Amide (2)

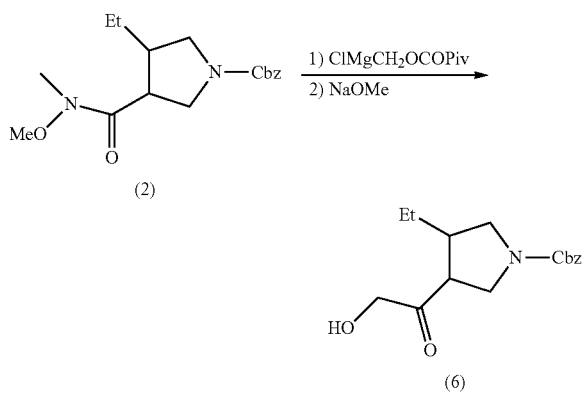

Preparation of ((pivaloyloxy)methyl)magnesium chloride (0.4 M): Under argon atmosphere, to a solution of iodomethyl pivalate (14.5 g, 60 mmol, 1.0 equiv.) in dry THF (67 mL) pre-cooled to −65 to −75° C., was added a solution of iPrMgCl (2.0 M in THF, 66.0 mL, 132 mmol, 2.2 equiv.). The reaction mixture was stirred keeping the temperature below −65° C. until complete formation of the desired reagent.

Under argon atmosphere, to a solution of weinreb amide (2) (0.3 g, 0.93 mmol, 1.0 equiv.) in dry THF (5 mL) was added a recently preformed solution of ((pivaloyloxy)methyl)magnesium chloride (0.4 M, 4.68 mL, 1.87 mmol, 2 equiv.) at 0° C. After 30 min., the reaction was quenched with sat. aq. NH$_4$Cl and extracted with EtOAc (3×10 mL).

The dried (MgSO$_4$) extract was filtered and concentrated in vacuo, and the oil residue obtained was purified by flash column chromatography to yield the desired product (0.10 g, 32%) as a yellow oil. A better yield could be achieved with the addition of MeONa before quenching the reaction mixture. $^1$H NMR (400 MHz, Chloroform-d) δ 7.44-7.29 (m, 5H), 5.24-5.02 (m, 2H), 4.40-4.11 (m, 2H), 3.77-3.65 (m, 1H), 3.65-3.48 (m, 2H), 3.45-3.27 (m, 1H), 3.25-3.03 (m, 1H), 2.36 (d, J=5.9 Hz, 1H), 1.46-1.20 (m, 2H), 0.93 (dd, J=13.1, 7.0 Hz, 3H).

Example 6: Synthesis of Cis-3R Weinreb Amide (8) from Cis-3R Carboxylic Acid (7)

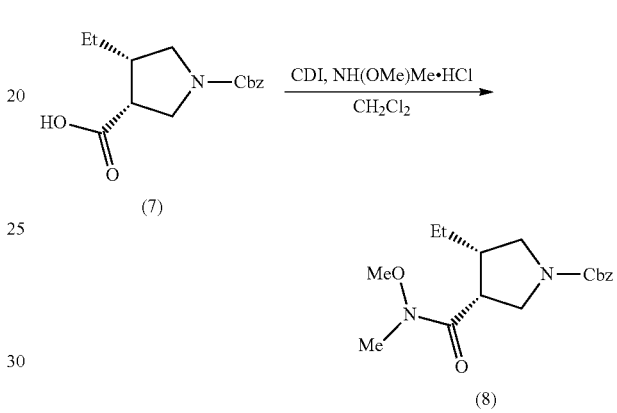

Under an argon atmosphere were mixed compound (7) (6.00 g, 21.63 mmol, 1.0 equiv.) and CDI (4.56 g, 28.13 mmol, 1.3 equiv.). Dry CH$_2$Cl$_2$ ((40 mL) was added, and the suspension was stirred for 10 minutes at 0° C. Then, N,O-Dimethylhydroxylamine hydrochloride (0.99 g, 10.20 mmol, 1.5 equiv.) was added, and the resulting mixture was further stirred for 12 h at room temperature until completion of the reaction. The suspension was quenched with an aqueous solution of HCl (0.5 M, 20 mL) and the organic layer was extracted and washed twice with an aqueous solution of brine (2×20 mL). The organic layer was collected, dried over anhydrous MgSO$_4$, filtered, and evaporated under reduced pressure to yield the title pure product as a brown oil (6.86 g, 21.41 mmol, 99%). $^1$H NMR (500 MHz, Chloroform-d) δ 7.26 (s, 5H), 5.23-5.05 (m, 2H), 3.79-3.71 (m, 1H), 3.71-3.66 (m, 3H), 3.63-3.54 (m, 2H), 3.50 (dd, J=14.7, 9.2 Hz, 1H), 3.45-3.33 (m, 1H), 3.24-3.13 (m, 3H), 2.41-2.30 (m, 1H), 1.56-1.36 (m, 1H), 1.36-1.20 (m, 1H), 0.91 (dd, J=14.0, 7.3 Hz, 3H).

Example 7: Synthesis of Cis-3R Ketone (9) from Cis-3R Weinreb Amide (8)

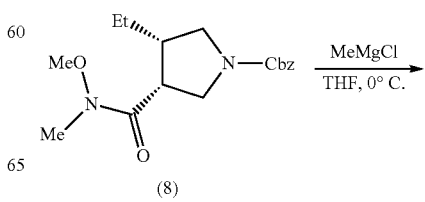

-continued

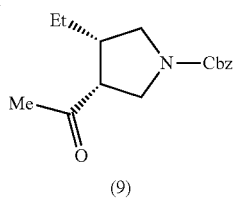

(9)

Under argon atmosphere, to a solution of compound (8) (5.96 g, 17.74 mmol, 1.0 equiv.) in dry THF (60 mL) was added MeMgCl (3 M, 11.80 mL, 35.47 mmol, 2 equiv.) at 0° C. After 15 min., the reaction was quenched with sat. aq. NH$_4$Cl and extracted with EtOAc (3×10 mL). The dried (MgSO$_4$) extract was filtered and concentrated in vacuo and extracted with hot heptane to yield the desired product (4.37 g, 89%) as a brown oil. $^1$H NMR (500 MHz, Chloroform-d) δ 7.26 (s, 5H), 5.13 (qd, J=12.5, 3.8 Hz, 2H), 3.73-3.64 (m, 1H), 3.59-3.52 (m, 1H), 3.48 (td, J=11.5, 5.9 Hz, 1H), 3.42 (dd, J=10.9, 5.1 Hz, 1H), 3.22 (ddd, J=16.0, 13.3, 6.9 Hz, 1H), 2.42-2.29 (m, 1H), 2.18 (s, 3H), 1.44-1.17 (m, 2H), 0.94 (dd, J=15.9, 7.4 Hz, 3H).

Example 8: Synthesis of Cis-3R Compound (10) from Cis-3R Ketone (9)

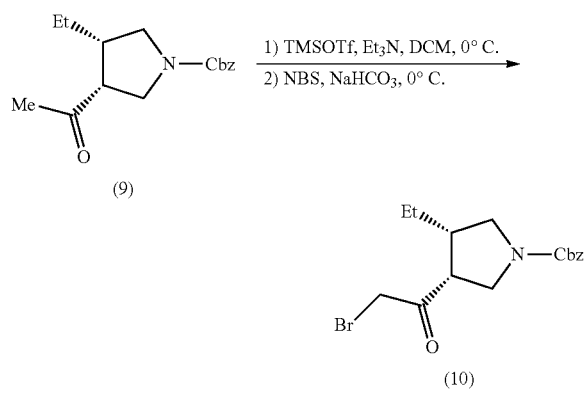

Under argon atmosphere a solution of compound (9) (1.0 g, 3.63 mmol, 1.0 equiv.) in dry CH$_2$Cl$_2$ (15 mL) was cooled to 0° C. To this solution was added TMSOTf (1.18 mL, 6.54 mmol, 1.8 equiv.), Et$_3$N (1.01 mL, 7.27 mmol, 2.0 equiv.), and stirring was continued for 10 min. until complete formation of the intermediate silyl enol ether. Then, NaHCO$_3$ (0.37 g, 4.40 mmol, 1.2 equiv.) and NBS (0.84 mg, 2.07 mmol, 1.3 equiv.) were added at 0° C. After 1 h, the reaction was quenched with sat. aq. NaHCO$_3$, and extracted with CH$_2$Cl$_2$ (2×10 mL). The organic layer was then washed with an 5% aq Na$_2$S$_2$O$_3$. The dried (MgSO$_4$) organic layer was filtered, and concentrated in vacuo and purified by chromatography over silica gel, to give the title product (0.96 g, 77%) as a yellow oil. $^1$H NMR (400 MHz, Chloroform-d) δ 7.45-7.28 (m, 5H), 5.25-4.99 (m, 2H), 3.99-3.82 (m, 2H), 3.81-3.66 (m, 1H), 3.63-3.48 (m, 3H), 3.38 (ddd, J=24.8, 10.7, 7.0 Hz, 1H), 2.53-2.27 (m, 1H), 1.46-1.17 (m, 2H), 1.05-0.85 (m, 3H).

Example 9: Synthesis of Cis-3R Compound (11) from Cis-3R Weinreb Amide (8)

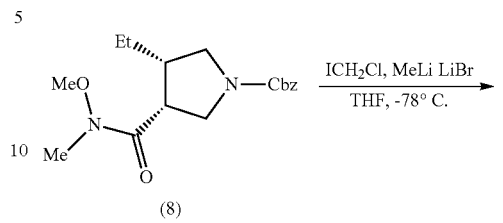

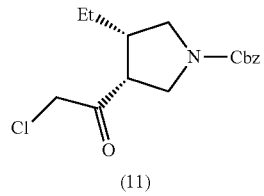

To a solution of compound (8) (0.3 g, 0.94 mmol, 1.0 equiv.) in dry THF (5 mL) cooled at −78° C. was added ICH$_2$Cl (0.27 mL, 3.70 mmol, 4.0 equiv.), and subsequently, MeLi—LiBr complex (1.5 M solution in Et$_2$O, 1.88 mL, 2.82 mmol, 3.0 equiv.) was added dropwise during 5 min. The resulting solution was stirred at that temperature for 2 h, and then NH$_4$Cl saturated aqueous solution was added at −78° C. The mixture was allowed to reach room temperature and washed with Et$_2$O (10 mL) and brine (10 mL). The two resulting phases were separated, and the organic phase was dried over anhydrous MgSO$_4$, filtered, and concentrated in vacuo. The crude product was purified by chromatography over silica gel, to give the desired pure product (0.18 g, 63%) as a yellow oil. $^1$H NMR (500 MHz, Chloroform-d) δ 7.44-7.23 (m, 5H), 5.25-4.94 (m, 2H), 4.17-4.00 (m, 2H), 3.97-3.14 (m, 5H), 2.52-2.28 (m, 1H), 1.47-1.16 (m, 2H), 0.93 (qd, J=7.43, 1.90 Hz, 3H).

Example 10: Synthesis of Cis-3R Hydroxyl Ketone (12) from Cis-3R Ketone (9)

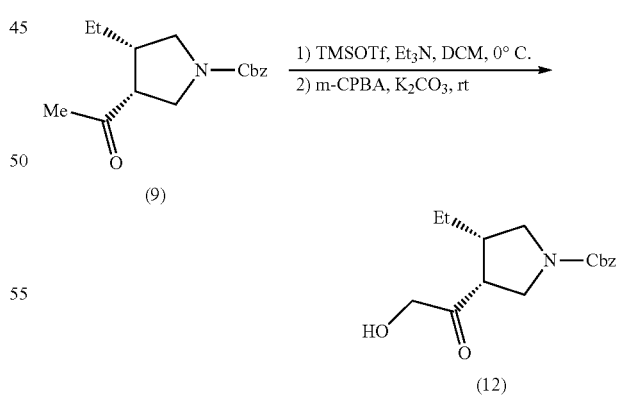

Step 1: Under argon atmosphere a solution of methyl ketone (12) (1.0 g, 3.63 mmol, 1.0 equiv.) in dry CH$_2$Cl$_2$ ((10 mL) was cooled to 0° C. To this solution was added TMSOTf (1.18 mL, 6.54 mmol, 1.8 equiv.) and Et$_3$N (1.0 mL, 7.26 mmol, 2.0 equiv.), and stirring was continued for 1 h until complete formation of the silyl enol ether. The reaction was quenched with sat. aq. NaHCO$_3$ and extracted with ether (3×10 mL). The dried (MgSO₄) extract was concentrated in vacuo to provide the intermediate silyl enol ether which was used in the next step without further purification (1.3 g, 99%) as a brown oil.

Step 2: Crude silyl enol ether (1.0 g, 2.87 mmol, 1.0 equiv.) was dissolved with DCM (10 mL), and m-CPBA (0.75 g, 4.3 mmol, 1.5 equiv.) was added in one portion at room temperature. After 1 h, the reaction was quenched with 5% aq Na₂S₂O₃. The solution was extracted with DCM (3×10 mL). The organic phase was then washed with a saturated aq. K₂CO₃ solution, dried (NaSO₄), filtered and concentrated in vacuo to give the pure product (0.66 g, 80%) as a yellow oil. ¹H NMR (400 MHz, Chloroform-d) δ 7.44-7.29 (m, 5H), 5.24-5.02 (m, 2H), 4.40-4.11 (m, 2H), 3.77-3.65 (m, 1H), 3.65-3.48 (m, 2H), 3.45-3.27 (m, 1H), 3.25-3.03 (m, 1H), 2.36 (d, J=5.9 Hz, 1H), 1.46-1.20 (m, 2H), 0.93 (dd, J=13.1, 7.0 Hz, 3H).

Example 11: Synthesis of Weinreb Amide (14) from Carboxylic Acid (13)

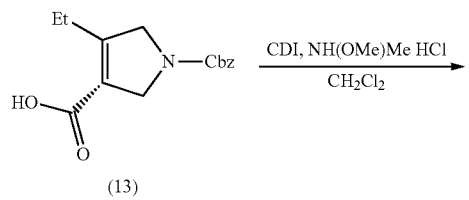

(13)

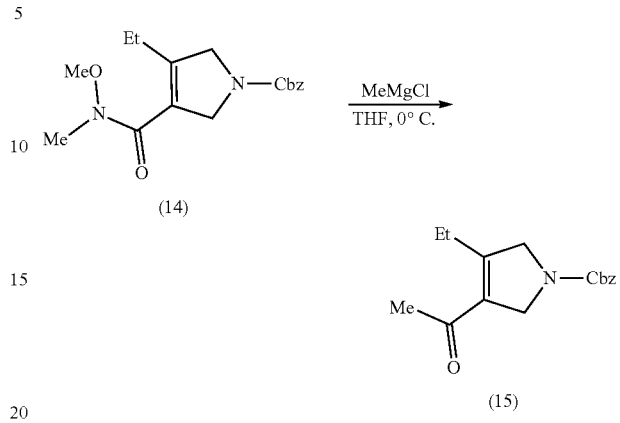

Under an argon atmosphere were mixed compound (13) (1.80 g, 6.80 mmol, 1.0 equiv.) and CDI (1.66 g, 10.20 mmol, 1.5 equiv.). Dry CH₂Cl₂ (20 mL) was added, and the suspension was stirred for 5 minutes at 0° C. Then, N,O-Dimethylhydroxylamine hydrochloride (0.99 g, 10.20 mmol, 1.5 equiv.) was added, and the resulting mixture was further stirred for 5 h at room temperature until completion of the reaction. The suspension was quenched with an aqueous solution of HCl (0.5 M, 10 mL) and the organic layer was extracted and washed twice with an aqueous solution of brine (2×10 mL). The organic layer was collected, dried over anhydrous MgSO₄, filtered, and evaporated under reduced pressure to yield the title pure product (2.12 g, 14.11 mmol, 98%) as a yellow oil. ¹H NMR (400 MHz, Chloroform-d) δ 7.44-7.29 (m, 5H), 5.16 (s, 2H), 4.45 (dt, J=15.91, 4.11 Hz, 2H), 4.26 (dt, J=15.91, 4.11 Hz, 2H), 3.65 (d, J=4.09 Hz, 3H), 3.24 (d, J=1.06 Hz, 3H), 2.34 (q, J=7.62 Hz, 2H), 1.07 (td, J=7.64, 5.07 Hz, 3H).

Example 12: Synthesis of Ketone (15) from Weinreb Amide (14)

Under argon atmosphere, to a solution of compound (14) (0.50 g, 1.57 mmol, 1.0 equiv.) in dry THF (10 mL) was added MeMgCl (3 M, 0.90 mL, 2.67 mmol, 1.7 equiv.) at 0° C., the reaction was allowed to reach room temperature and was stirred for 12 h. The reaction was quenched with sat. aq. NH₄Cl and extracted with EtOAc (3×10 mL). The dried (MgSO₄) extract was filtered and concentrated in vacuo to give the title product (0.42 g, 98%) as a brown oil. ¹H NMR (500 MHz, Chloroform-d) δ 7.43-7.30 (m, 5H), 5.16 (s, 2H), 4.55-4.25 (m, 4H), 2.69-2.51 (m, 2H), 2.25 (d, J=9.19 Hz, 3H), 1.10 (dt, J=16.34, 7.62 Hz, 3H).

Example 13: Synthesis of Compound (16) from Ketone (15)

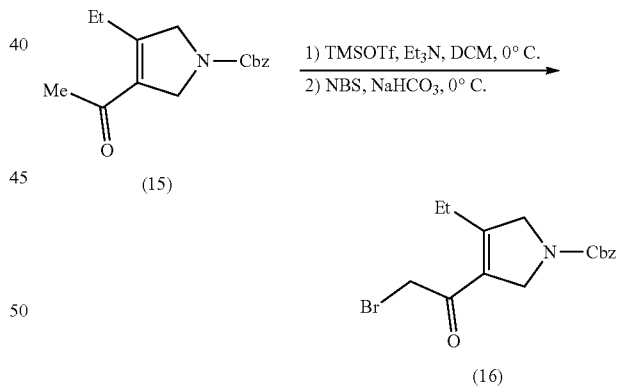

Under argon atmosphere a solution of compound (15) (0.1 g, 0.36 mmol, 1.0 equiv.) in dry CH₂Cl₂ (2 mL) was cooled to 0° C. To this solution was added TMSOTf (0.12 mL, 0.65 mmol, 1.8 equiv.), Et₃N (0.1 mL, 0.72 mmol, 2.0 equiv.), and stirring was continued for 1 h until complete formation of the intermediate silyl enol ether. Then, NaHCO₃ (0.03 g, 0.43 mmol, 1.2 equiv.) and NBS (0.04 mg, 0.43 mmol, 1.2 equiv.) were added at 0° C. After 1 h, the reaction was quenched with sat. aq. NaHCO₃, and extracted with EtOAc (2×10 mL). The organic layer was then washed with a 5% aq Na₂S₂O₃. The dried (Mg₂SO₄) organic layer was filtered, and concentrated in vacuo and purified by chromatography over silica gel, to give the title product (0.09 g, 73%) as a yellow oil. $^1$H NMR (500 MHz, Chloroform-d) δ 7.41-7.30 (m, 5H), 5.18 (d, J=1.17 Hz, 2H), 4.64-4.44 (m, 2H), 4.43-4.32 (m, 2H), 3.93 (d, J=5.63 Hz, 2H), 2.77-2.48 (m, 2H), 1.12 (dt, J=15.12, 7.63 Hz, 3H).

Example 14: Synthesis of Compound (17) from Weinreb Amide (14)

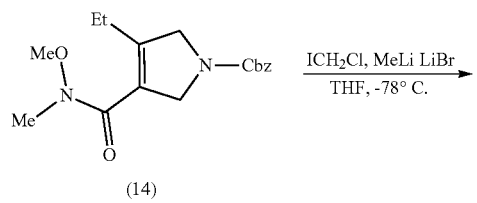

(14)

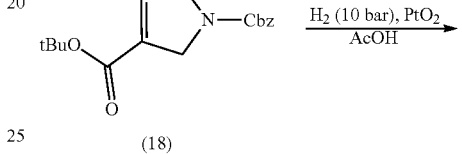

(17)

To a solution of compound (14) (0.3 g, 0.94 mmol, 1.0 equiv.) in dry THF (5 mL) cooled at −78° C. was added ICH$_2$Cl (0.28 mL, 3.80 mmol, 4.0 equiv.), and subsequently, MeLi·LiBr complex (1.5 M solution in Et$_2$O, 1.5 mL, 2.82 mmol, 3.0 equiv.) was added dropwise during 5 min. The resulting solution was stirred at that temperature for 2 h, and then NH$_4$Cl saturated aqueous solution was added at −78° C. The mixture was allowed to reach room temperature and washed with Et$_2$O (10 mL) and brine (10 mL). The two resulting phases were separated, and the organic phase was dried over anhydrous MgSO$_4$, filtered, and concentrated in vacuo. The crude product was purified by chromatography over silica gel, to give the desired pure product (0.13 g, 48%) as a yellow oil. $^1$H NMR (500 MHz, Chloroform-d) δ 7.54-7.28 (m, 5H), 5.17 (s, 2H), 4.63-4.45 (m, 2H), 4.38 (dt, J=24.39, 4.20 Hz, 2H), 4.17 (d, J=2.84 Hz, 2H), 2.77-2.57 (m, 2H), 1.12 (dt, J=13.57, 7.62 Hz, 3H).

Example 15: Hydrogenation of Weinreb Amide (14) to Cis-Compound (2)

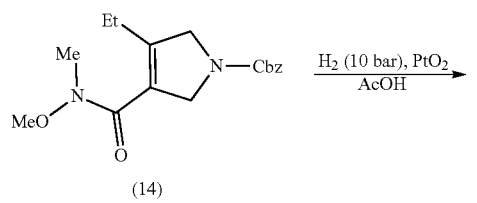

(14)

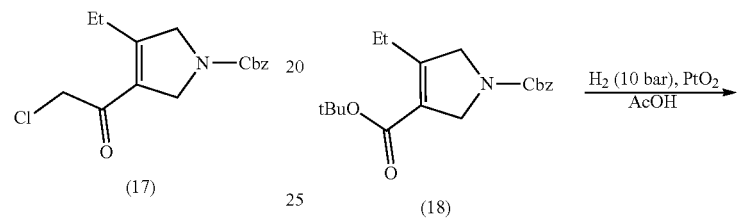

(2)

PtO$_2$ (0.08 g, 0.35 mmol) was added to a solution of compound (14) (0.3 g, 0.94 mmol, 1.0 equiv.) in glacial AcOH (2 mL). The reaction mixture was stirred at room temperature under an atmosphere of H$_2$ (10 bar) for 12 h. The solution was filtered through a pad of celite, and evaporated in vacuo to afford a brown oil. The crude oil was purified by column chromatography to yield the desired reduced product. $^1$H NMR (500 MHz, Chloroform-d) δ 7.26 (s, 5H), 5.23-5.05 (m, 2H), 3.79-3.71 (m, 1H), 3.71-3.66 (m, 3H), 3.63-3.54 (m, 2H), 3.50 (dd, J=14.7, 9.2 Hz, 1H), 3.45-3.33 (m, 1H), 3.24-3.13 (m, 3H), 2.41-2.30 (m, 1H), 1.56-1.36 (m, 1H), 1.36-1.20 (m, 1H), 0.91 (dd, J=14.0, 7.3 Hz, 3H).

Example 16: Hydrogenation of Ester (18) to Cis-Compound (19)

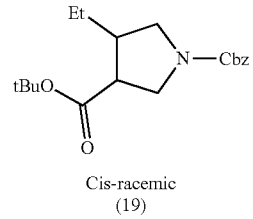

(18)

Cis-racemic
(19)

PtO$_2$ (0.08 g, 0.35 mmol) was added to a solution of compound (18) (0.5 g, 1.50 mmol, 1.0 equiv.) in glacial AcOH (2 mL). The reaction mixture was stirred at room temperature under an atmosphere of H$_2$ (10 bar) for 12 h. The solution was filtered through a pad of celite, and evaporated in vacuo to afford a brown oil. The crude oil was purified by column chromatography to yield the desired reduced product. $^1$H NMR (500 MHz, Chloroform-d) δ 7.39-7.27 (m, 5H), 5.24-5.00 (m, 2H), 3.78-3.64 (m, 1H), 3.57 (ddd, J=16.1, 10.4, 7.3 Hz, 1H), 3.48 (ddd, J=11.6, 7.1, 5.1 Hz, 1H), 3.24 (ddd, J=19.8, 10.4, 8.7 Hz, 1H), 2.95 (dtd, J=13.8, 7.0, 3.5 Hz, 1H), 2.27 (dddd, J=15.1, 8.4, 6.7, 1.6 Hz, 1H), 1.52-1.44 (m, 2H), 1.43 (s, 9H), 0.97 (td, J=7.4, 4.8 Hz, 3H).

Example 17: Synthesis of the Ester (18) from the Enoltriflate (20)

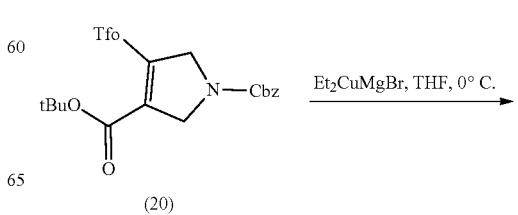

(20)

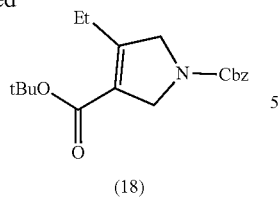

(18)

To a suspension of CuI (0.84 g, 4.4 mmol, 2 equiv.) in dry THF (20 mL) cooled at 0° C. was added EtMgBr (3.0 M, 3.0 mL, 8.85 mmol, 4 equiv.) dropwise. The reaction mixture turned out dark violet colored and it was stirred at 0° C. for 30 minutes. Then, a solution of methyl ketone (1.0 g, 2.2 mmol, 1.0 equiv.) in THF (20 mL) was added dropwise at that temperature. The reaction mixture was allowed to reach room temperature and it was stirred for 4 h. The reaction was then quenched with sat. aq. NH$_4$Cl and extracted with EtOAc (2×50 mL). The organic phase was washed with sat. aq. NaCl, dried (MgSO$_4$), filtered through a pad of Celite and concentrated in vacuo to give the title product (0.73 g, 98%) as a brown oil. 1H NMR (500 MHz, Chloroform-d) δ 7.45-7.27 (m, 5H), 5.16 (d, J=4.46 Hz, 2H), 4.47-4.19 (m, 4H), 2.66-2.54 (m, 2H), 1.49 (d, J=2.14 Hz, 9H), 1.08 (q, J=7.50 Hz, 3H).

Example 18: Synthesis of Carboxylic Acid (13) from Ester (18)

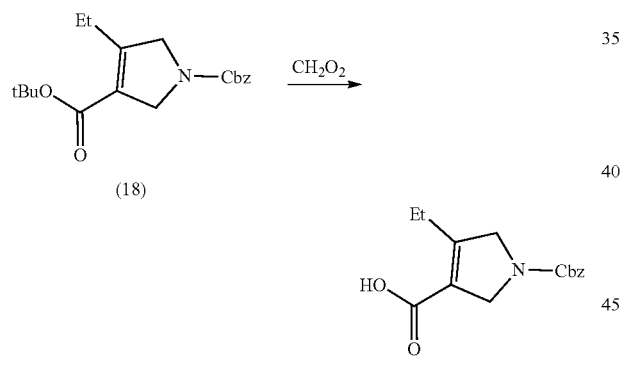

In a round bottom flask, formic acid (8 ml) was added to a crude sample of t-butyl ester (18) (2 g, 0.6 mmol), the reaction mixture was stirred at 45° C. until completion (TLC control, 3-4 h). The remaining formic acid was removed by vacuum destilation and until obtaining a residue that was redissolved in 20 ml of EtOAc, and washed with 12 ml of NaCl. The resulting organic phase was submitted to a new extraction with 20 ml of a sat. aq. solution of Na$_2$CO$_3$, in this operation the product moved to the aqueous phase as the sodium salt and the organic phase was discharged. The basic and colored aqueous phase was then acidified with HCl cc. The desired product precipitated as a beige solid that was filtered, washed with water and dried to give the title product (1.4 g, 85%).

Example 19: Synthesis of of benzyl (3R,4S)-3-(N-(tert-butoxycarbonyl)-N-(5-tosyl-5H-pyrrolo[2,3-b]pyrazin-2-yl)glycyl)-4-ethylpyrrolidine-1-carboxylate (21)

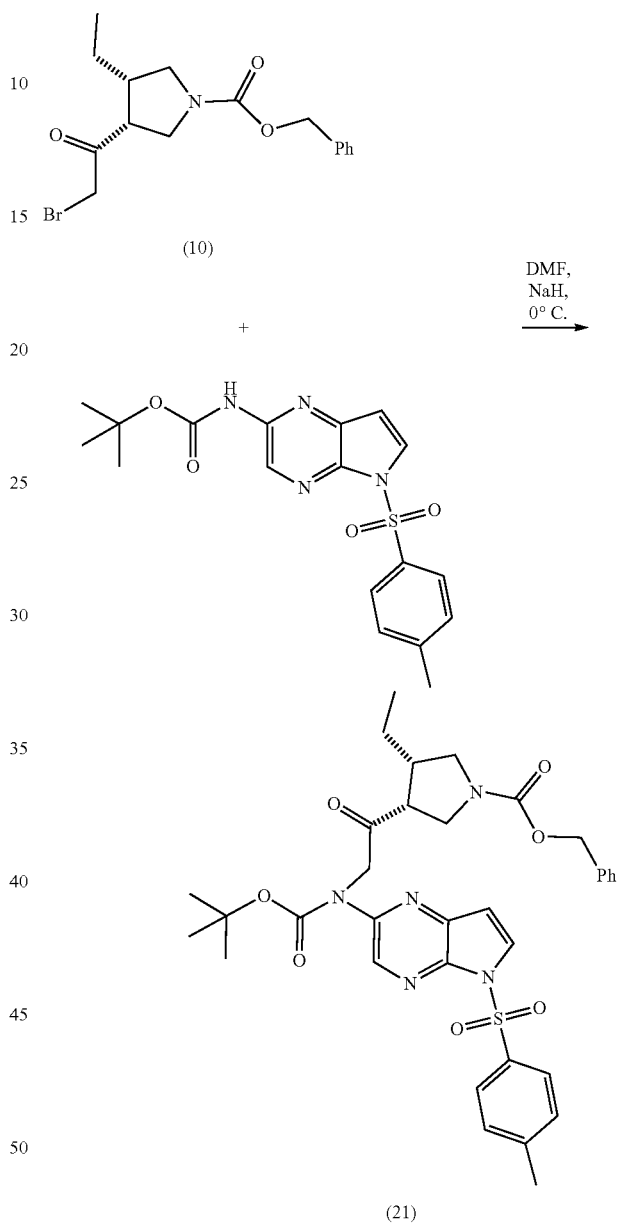

A mixture of Sodium hydride (1.1 g) (60% dispersion in oil) and dimethyl formamide (100 mL) were cooled to 0° C. A solution of tert-butyl (5-tosyl-5H-pyrrolo[2,3-b]pyrazin-2-yl)carbamate (11 g) in dimethylformamide (30 ml) was added to the above mixture at 0° C. and stirred for 120 minutes at the same temperature. A mixture of Benzyl (3R,4S)-3-(2-bromoacetyl)-4-ethylpyrrolidine-1-carboxylate (10 g) in tetrahydrofurane (10 mL) at 0° C. was added to above reaction mixture and stirred at the same temperature for 1 hour. After the completion of the reaction, acetic acid (0.8 ml) was added to the reaction mixture. The corresponding solution was added over cold water (750 ml) and the solid was filtrated and dried to give a crude product.

Yield: 75%; 1H NMR (400 MHz,d-DMSO): δ 8.74 (s, 1H), 8.21-8.17 (m, 1H), 8.00-7.97 (m, 2H), 7.44-7.42 (m, 2H), 7.34-7.27 (m, 5H), 6.79-6.66 (m, 1H), 5.06-5.05 (m, 2H), 4.74 (s, 2H), 3.65-3.58 (m, 1H), 3.52-3.43 (m, 3H), 3.21-3.16 (m, 1H), 2.40-2.38 (m, 1H), 2.34 (s, 3H), 1.29-1.46 (m, 10H), 1.29-1.23 (m, 1H), 0.91-0.86 (m, 3H).

Example 20: Synthesis of benzyl (3S,4R)-3-ethyl-4-(3-tosyl-3H-imidazo[1,2-a]pyrrolo[2,3-e]pyrazin-8-yl)pyrrolidine-1-carboxylate (22)

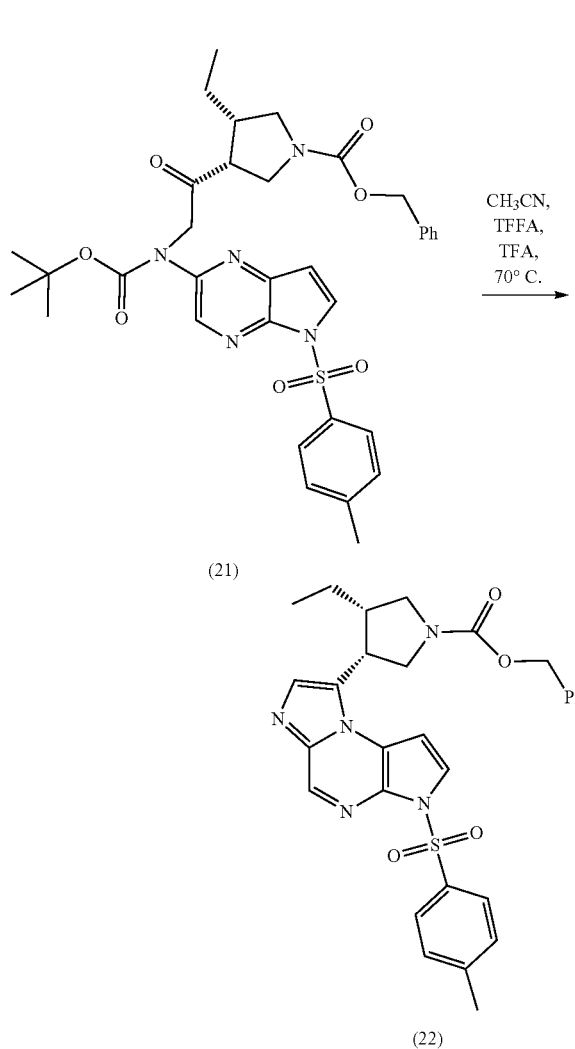

Over a mixture of crude Benzyl (3R,4S)-3-(N-(tert-butoxycarbonyl)-N-(5-tosyl-5H-pyrrolo [2,3-b]pyrazin-2-yl)glycyl)-4-ethylpyrrolidine-1-carboxylate (10 g) and acetonitrile (100 mL) was added trifluoroacetic anhydride (6.3 ml) and trifluoro acetic acid (1.6 mL) at 20/25° C. The reaction mixture was warmed to 70° C. and stirred for 4 hours at this temperature. The reaction mixture was distilled and added to cold saturated sodium bicarbonate solution (100 ml) and dichlorometane (100 mL) and the organic layer was separated. Organic layer was washed again with water (100 mL) and separated. The corresponding organic layer was concentrated under vacuum to give a crude solid which was purified by crystallization with methanol (50 ml). Yield: 40%; 1H NMR (400 MHz,d-DMSO) δ 8.77 (s, 1H), 8.04-8.02 (m, 2H), 7.98-7.97 (m, 1H), 7.70 (s, 1H), 7.44-7.29 (m, 1H), 5.16-5.08 (m, 2H), 4.35-4.30 (m, 1H), 3.87-3.70 (m, 3H), 3.34-3.27 (m, 1H), 2.47-2.46 (m, 1H), 2.33 (s, 3H), 0.99-0.75 (m, 2H), 0.60-0.45 (m, 3H).

Example 21: Synthesis of 8-((3S,4R)-4-ethylpyrrolidin-3-yl)-3-tosyl-3H-imidazo [1,2-a]pyrrolo[2,3-e]pyrazine (23)

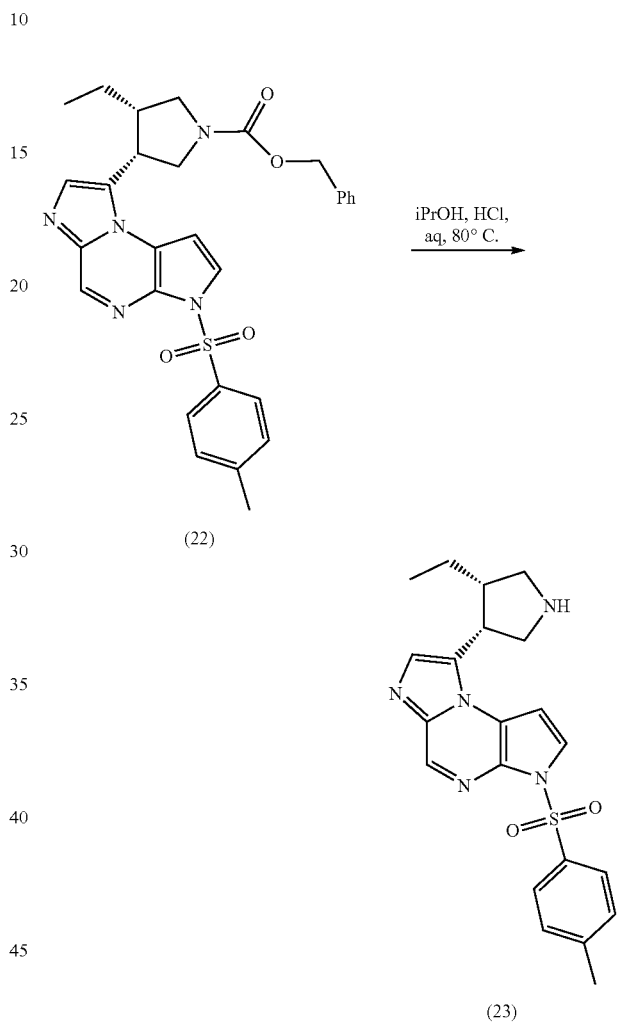

To a solution of benzyl (3S,4R)-3-ethyl-4-(3-tosyl-3H-imidazo[1,2-a]pyrrolo[2,3-e]pyrazin-8-yl)pyrrolidine-1-carboxylate (10 g) in isopropanol (20 mL), concentrated HCl aqueous (20 mL) was added slowly at 20/25° C. and heated to 80° C. The reaction mixture was stirred at the same temperature for 5 hours and cooled to 20/25° C. Water (100 ml) and dichloromethane (100 mL) were added to the reaction mixture and separated the organic layer and discarded. The aqueous layer was washed with dichlorometane (2×100 mL). The pH of the aqueous layers was adjusted to 7.5 using sodium bicarbonate and then extracted with dichloromethane (2×100 mL). The organic layers were concentrated under reduced pressure at 20/25° C. until achieving a suspension which was filtered to obtain a wet pale yellow solid. Yield: 100%. 1H NMR (400 MHz, MeOD) δ 9.06 (s, 1H), 8.49 (s, 1H), 8.30-8.29 (m, 1H), 8.10 (d, 2H), 7.58-7.57 (m, 1H), 7.42 (d, 2H), 4.67-4.65 (m, 1H), 3.99-3.94 (m, 1H), 3.84-3.78 (m, 2H), 3.43-3.38 (m, 1H), 2.84-2.82 (m, 1H), 2.38 (s, 3H), 1.15-1.08 (m, 2H), 0.82-0.76 (m, 3H).

Example 22: Synthesis of (3S,4R)-3-ethyl-4-(3-tosyl-3H-imidazo[1,2-a]pyrrolo[2,3-e]pyrazin-8-yl)-N-(2,2,2-trifluoroethyl)pyrrolidine-I-carboxamide (24)

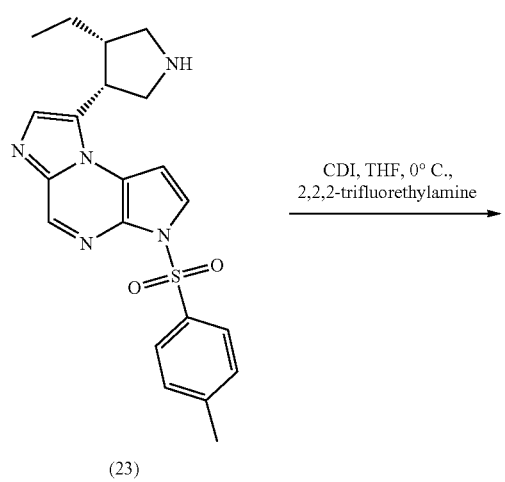

To a mixture of 1,1-carbonyl diimidazole (CDI) (4.1 g) and tetrahydrofuran (50 mL) at 0/5° C., 2,2,2-trifluoro ethylamine (2.2 ml) was added and stirred for 2 hours. The reaction mixture was added to a mixture of 8-((3S,4R)-4-ethylpyrrolidin-3-yl)-3-tosyl-3H-imidazo[I,2-a]pyrrolo[2,3-e]pyrazine (7.5 g) and dichloromethane (100 mL) and heated to 30/35° C. The reaction mixture was stirred until the completion of reaction. A solution of 10% HCl in water (100 ml) was added and the aqueous phase was discarded, the resultant organic phase was washed with water (100 mL) and the final organic phase was concentrated by distillation until 30 ml and added over heptane (300 ml) to give a suspension which was filtered and dried to give a pale brown solid. Yield: 80%. 1HNMR (400 MHz,d-DMSO) δ 8.77 (s, 1H), 8.05 (d, 2H), 7.98 (d, 1H), 7.59 (s, 1H), 7.46-7.43 (m, 3H), 6.94 (t, 1H), 4.34-4.29 (m, 1H), 3.88-3.65 (m, 5H), 3.27-3.23 (m, 1H), 2.46-2.54 (m, 1H), 2.35 (s, 3H), 1.04-0.99 (m, 1H), 0.82-0.77 (m, 1H), 0.63-0.60 (m, 3H).

Example 23: Preparation of Upadacitinib

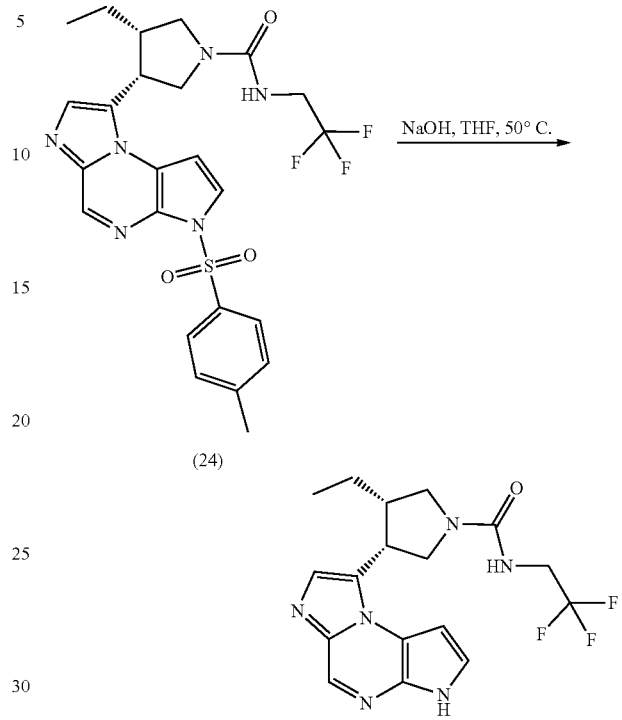

To a solution of (3S,4R)-3-ethyl-4-(3-tosyl-3H-imidazo[I,2-a]pyrrolo[2,3-e]pyrazin-8-yl)-N-(2,2,2-trifluoroethyl) pyrrolidine-I-carboxamide (10 g) in tetrahydrofurane (50 mL), a 10% solution of sodium hydroxide in water (15 ml) was added and heated to 50° C. The reaction mixture was stirred for 5 hours and cooled to 25° C. A saturated solution of sodium chloride (100 mL) was added to the reaction mixture and extracted with dichloromethane (100 ml). The organic phase was separated and washed with water (100 mL). An 2.5% aqueous solution of HCl (100 ml) was added and stirred for 30 minutes. The organic phase was removed and the resultant acid aqueous phase was extracted with dichloromethane (100 ml). The final aqueous phase was cooled down to 0/5° C. and a 10% solution of NaOH was charged until pH 10/12. The resultant suspension was filtered and washed with water (2×50 mL). The cake was drained and dried at 30/40° C. under vacuum to give an almost white amorphous solid. Yield: 80%. 1H NMR (400 MHz,d-DMSO) δ 12.27 (s, 1H), 8.58 (s, 1H), 7.47-7.43 (m, 2H), 7.00-6.94 (m, 2H), 4.38-4.33 (m, 1H), 3.92-3.67 (m, 5H), 3.33-3.25 (m, 1H), 2.59-2.54 (m, 1H), 1.14-1.08 (m, 1H), 0.86-0.78 (m, 1H), 0.65-0.62 (m, 3H).

Example 24: Preparation of Upadacitinib

Upadacitinib (0.25 g) was dissolved in ethanol (1 mL). This solution was added to an aqueous solution (25 mL) containing 0.5% of ethanol previously cooled down to 0/5° C. A solid is immediately observed. The suspension was stirred at 0-5° C. during 20 minutes followed by subsequent filtration. The wet cake was dried overnight at 50° C. under forced air to give an almost white amorphous solid.

Example 25: Preparation of Upadacitinib Tartrate

To a solution of (3S,4R)-3-ethyl-4-(3-tosyl-3H-imidazo[I,2-a]pyrrolo[2,3-e]pyrazin-8-yl)-N-(2,2,2-trifluoroethyl)

pyrrolidine-I-carboxamide (10 g) in tetrahydrofurane (50 mL), a 10% solution of sodium hydroxide in water (15 ml) was added and heated to 50° C. The reaction mixture was stirred for 5 hours and cooled to 25° C. A saturated solution of sodium chloride (100 mL) was added to the reaction mixture and extracted with dichloromethane (100 ml). The organic phase was separated and washed with water (100 mL). The organic phase was concentrated to obtain a crude which is dissolved in isopropanol (30 mL). L-(+) tartaric acid (1,2 mol/mol) was added and heated to 30/40° C. The solution was cooled down to 20/25° C. and added slowly over isopropylacetate (300 ml). The suspension was stirred overnight and water is added (2 mol/mol). The resultant suspension was evaporated until 100 ml and the resultant suspension was filtered and dried to give a pale brown solid. Yield; 80%.

Comparative Experiments

To further compare the process of the invention with that disclosed in WO 2017/066975, the synthetic approach disclosed in e conditions disclosed in examples 3A and 3B of said document were reproduced as follows.

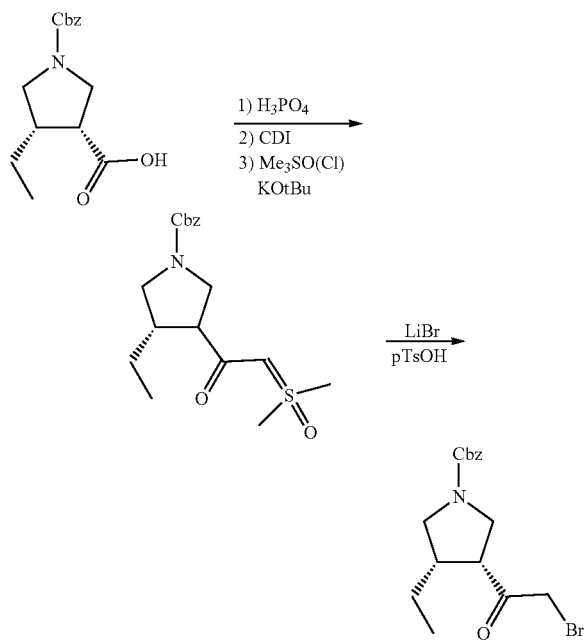

Comparative Example 26: Synthesis of Dimethylsulfoxonium (25) from Cis-Compound (1)

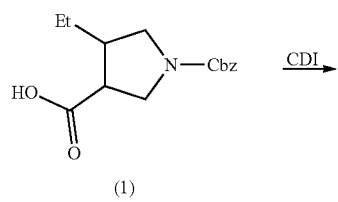

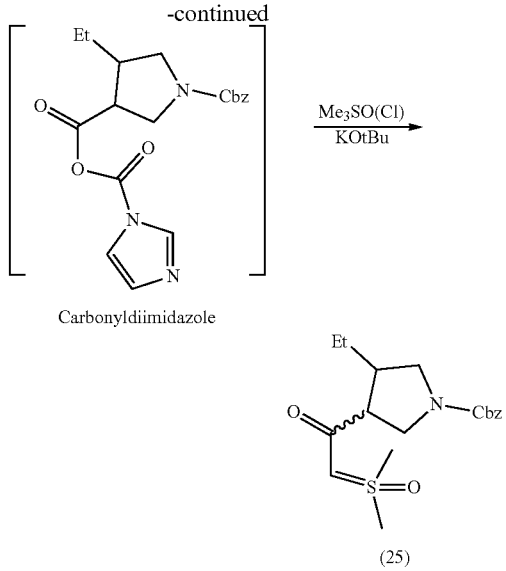

Preparation of the Trimethylsulfoxonium Anion (Slurry 1)

A slurry of trimethylsulfoxonium chloride (1.84 g, 2 eq.) and KOtBu (0.96 g, 2 eq.) in anhydrous THF (13.8 ml) was heated to reflux for 2 h and then cooled below 0° C.

Preparation of the Carbonyldiimidazole (Solution 2)

To a solution of CDI (1.02 g, 1.5 eq) in anhydrous THF (3.5 ml) was slowly added (over 30 minutes) a solution of cis-compound (1) (1.15 g, 4.18 mmol) in anhydrous THF (3.5 ml), and the resulting mixture was stirred for 1 h.

To the slurry 1 was slowly added (over 15 min) and maintaining the temperature below −1° C., the freshly prepared solution 2. The resulting mixture was stirred at room temperature for 20 min until the reaction was complete. The solvent was partially evaporated under reduced pressure and AcOEt (11 ml) and a 5% aqueous solution of NaCl (11 ml) were added. The two layers were separated and the aqueous layer was extracted again with AcOEt (11 ml). The combined organic layers were washed with a 12% aqueous solution of NaCl. The organic layer was evaporated under reduced pressure to yield 1.46 g. This oil was analyzed by HPLC and found to be a 68/32 mixture of cis/trans isomers. Therefore, under the reaction conditions necessary for the process disclosed in WO 2017/066775, isomerization occurs. The resulting oil was purified by chromatography to separate the two isomers.

Cis isomer (0.75 g): $^1$H NMR (500 MHz, DMSO) δ: 7.41-7.25 (m, 5H), 5.11-4.93 (m, 2H), 4.76 (s, 1H), 3.54-3.23 (m, 9H), 3.15 (dd, 1H), 2.91-2.72 (m, 1H), 2.26-2.02 (m, 1H), 1.57-1.39 (m, 1H), 1.20 (tq, 1H), 0.88 (td, 3H).

Trans isomer (0.3 g): $^1$H NMR (500 MHz, CDCl$_3$) δ: 7.4 (m, 5H), 5.1 (d, 2H), 4.42 (d, 1H), 3.60-3.77 (m, 2H), 3.47 (m, 1H), 3.39 (m, 6H), 2.99 (m, 1H), 2.53 (q, 1H), 2.33 (m, 1H), 1.56 (m, 1H), 1.29 (m, 1H), 0.9 (qd, 3H).

Comparative Example 27: Synthesis of Compound (5) from Cis-Compound (25)

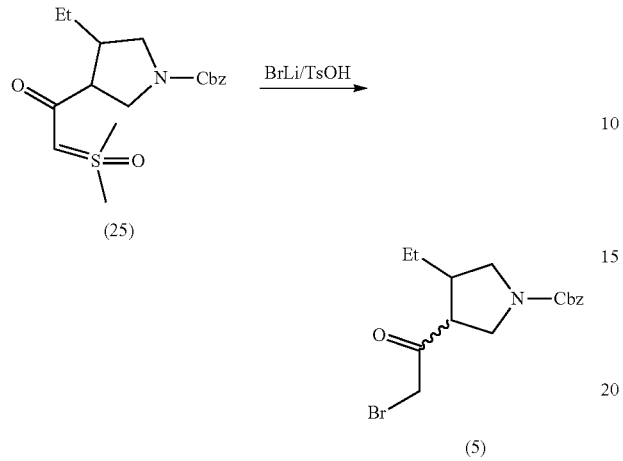

To a THF (7.5 ml) solution of cis-dimethylsulfoxonium (25) (0.75 g, 2.13 mmol) and lithium bromide (0.222 g, 1.2 eq) was added p-toluene sulfonic acid monohydrate (0.447 g, 1.1 eq). The resulting mixture was warmed to 40° C. and stirred overnight. A white solid precipitate was formed. The slurry was cooled to room temperature and the solvent partially evaporated under reduced pressure. AcOEt (30 ml) and a 7% aqueous solution of NaHCO$_3$ (13 ml) were added. The two layers were separated and the organic layer was washed with water (5 ml). Finally the organic layer was evaporated under reduced pressure to yield 0.71 g of an oil formed by a 38/62 mixture of cis/trans isomers. The resulting oil was purified by chromatography to separate the two isomers.

Cis isomer (0.063 g): $^1$H NMR (400 MHz, CDCl$_3$) δ 7.45-7.28 (m, 5H), 5.25-4.99 (m, 2H), 3.99-3.82 (m, 2H), 3.81-3.66 (m, 1H), 3.63-3.48 (m, 3H), 3.38 (ddd, J=24.8, 10.7, 7.0 Hz, 1H), 2.53-2.27 (m, 1H), 1.46-1.17 (m, 2H), 1.05-0.85 (m, 3H).

Trans isomer (0.373 g): $^1$H NMR (500 MHz, CDCl$_3$) δ 7.42-7.28 (m, 5H), 5.13 (s, 2H), 3.98-3.87 (m, 2H), 3.88-3.64 (m, 2H), 3.48 (dd, J=10.9, 8.0 Hz, 1H), 3.25 (dd, J=14.6, 7.8 Hz, 1H), 3.18-3.04 (m, 1H), 2.55-2.34 (m, 1H), 1.54 (td, J=13.5, 6.8 Hz, 1H), 1.44-1.19 (m, 1H), 1.00-0.87 (m, 3H).

The invention claimed is:

1. A process for preparing a compound of formula (I'-cis) or a salt or solvate thereof

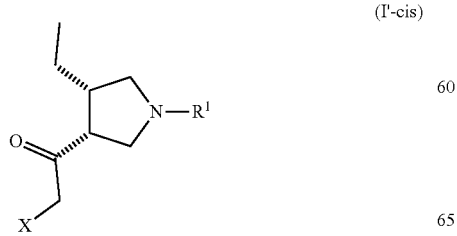

wherein

X is a leaving group, and

R$^1$ is selected from H and amino protecting group;

which comprises:

(a) converting a compound of formula (II) or a salt or solvate thereof

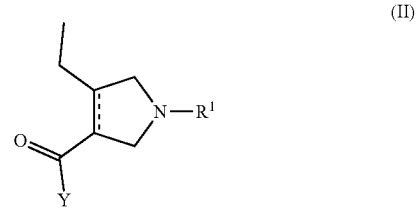

wherein

--- is a cis single bond or a double bond;

Y is selected from OH, Cl, OR$^2$ and OC(O)R$^2$, wherein R$^2$ is selected from C$_1$-C$_6$ alkyl, (C$_6$-C$_{15}$)aryl(C$_1$-C$_6$) alkyl and C$_6$-C$_{15}$ aryl; and R$^1$ is selected from H and amino protecting group;

into a compound of formula (III) or (IV), or a salt or solvate thereof

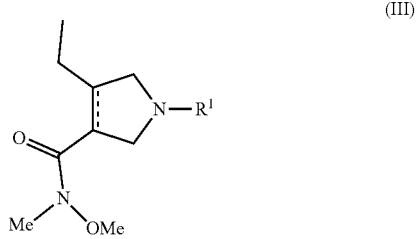

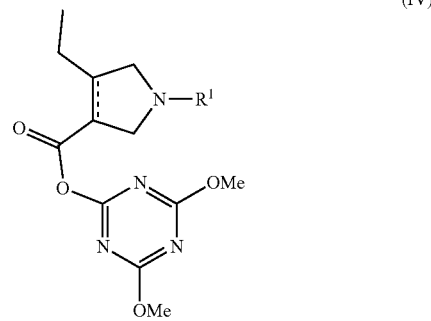

wherein

--- is a cis single bond or a double bond; and

R$^1$ is selected from H and amino protecting group; and (b) converting a compound of formula (III) or (IV), or a salt or solvate thereof, into a compound of formula (I'-cis), or a salt or solvate thereof, by a process comprising:

(bi) reacting the compound of formula (III) or (IV), or a salt or solvate thereof, with MeMgCl, MeMgBr or MeLi to provide a ketone of formula (V) or a salt or solvate thereof

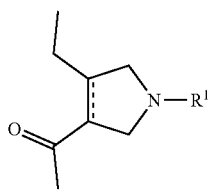

(V)

wherein

--- is a cis single bond or a double bond; and $R^1$ is selected from H and amino protecting group;

(bii) converting a ketone of formula (V), or a salt or solvate thereof, into an enol ether of formula (VI) or an enamine of formula (VII) or a salt or solvate thereof

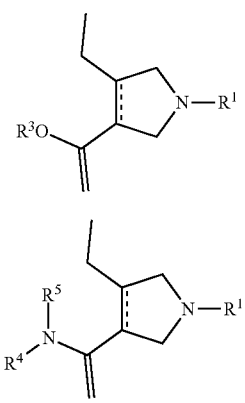

(VI)

(VII)

wherein

--- is a cis single bond or a double bond; and $R^1$ is selected from H and amino protecting group;

$R^3$ is selected from $C_1$-$C_6$ alkyl, $(C_6$-$C_{15})$aryl$(C_1$-$C_6)$ alkyl, $C_6$-$C_{15}$ aryl, COR' and SiR'$_3$, wherein each R' is independently selected from $C_{1-6}$ alkyl, $C_3$-$C_{10}$ cycloalkyl, $C_{6-15}$ aryl and $(C_6$-$C_{15})$aryl$(C_1$-$C_6)$alkyl; and $R^4$ and $R^5$ are independently selected from $C_1$-$C_6$ alkyl, $(C_6$-$C_{15})$aryl$(C_1$-$C_6)$alkyl and $C_6$-$C_{15}$ aryl or they form, together with the nitrogen atom to which they are attached, a 5- to 7-membered heterocyclic ring; and (biii) converting an enol ether of formula (VI) or an enamine of formula (VII), or a salt or solvate thereof, into a compound of formula (I'-cis) or a salt or solvate thereof; or (bi') reacting the compound of formula (III) or (IV), or a salt or solvate thereof, with X—$CH_2$—Li, X—$CH_2$—MgCl or X—$CH_2$—MgBr, to provide a compound of formula (I'-cis) or a salt or solvate thereof; or (bi'') reacting the compound of formula (III) or (IV), or a salt or solvate thereof, with $R^6$O—$CH_2$—Li, $R^6$O—$CH_2$—MgCl or $R^6$O—$CH_2$—MgBr, to provide a compound of formula (VIII) or a salt or solvate thereof

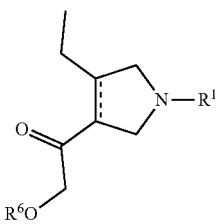

(VIII)

wherein

--- is a cis single bond or a double bond;

$R^1$ is selected from H and amino protecting group; and $R^6$ is a selected from H, —COR' and —CONR'R'', wherein R' and R'' are independently selected from $C_1$-$C_6$ alkyl, $C_6$-$C_{15}$ aryl and $(C_6$-$C_{15})$aryl$(C_1$-$C_6)$ alkyl; and (bii'') converting a compound of formula (VIII), or a salt or solvate thereof, into a compound of formula (I'-cis) or a salt or solvate thereof.

2. The process according to claim 1, wherein --- in the compound of formula (II), or a salt or solvate thereof, is a double bond and the process further comprises a hydrogenation step after step (a), or (bi), or (bii), or (biii), or (bi'), or (bi''), or (bii'').

3. The process according to claim 1, wherein --- is a cis single bond in the compounds of formula (II), (III), (IV), (V), (VI), (VII) and (VIII).

4. The process according to claim 3, wherein the compound of formula (II) wherein --- is a cis single bond, or a salt or solvate thereof, is obtained by hydrogenating a compound of formula (II'') or a salt or solvate thereof

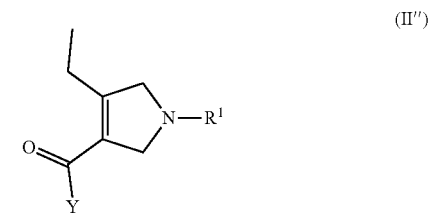

(II'')

wherein

Y is selected from OH, Cl, $OR^2$ and $OC(O)R^2$, wherein $R^2$ is selected from $C_1$-$C_6$ alkyl, $(C_6$-$C_{15})$aryl$(C_1$-$C_6)$ alkyl and $C_6$-$C_{15}$ aryl; and $R^1$ is selected from H and amino protecting group.

5. The process according to claim 1, comprising:

(a) converting a compound of formula (II'') or a salt or solvate thereof

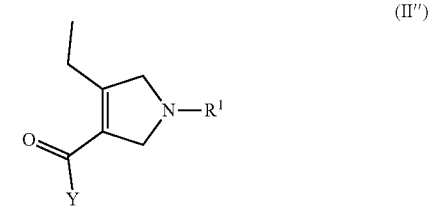

(II'')

wherein

Y is selected from OH, Cl, OR² and OC(O)R², wherein R² is selected from $C_1$-$C_6$ alkyl, $(C_6$-$C_{15})$aryl$(C_1$-$C_6)$alkyl and $C_6$-$C_{15}$ aryl; and R¹ is selected from H and amino protecting group;

into a compound of formula (III″) or (IV″) or a salt or solvate thereof

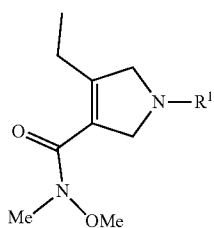

(III″)

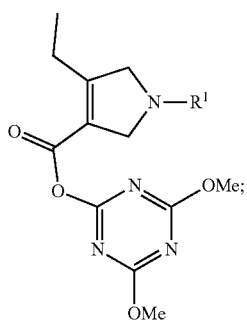

(IV″)

(b1) hydrogenating a compound of formula (III″) or (IV″), or a salt or solvate thereof, to provide a compound of formula (III'-cis) or (IV'-cis) or a salt or solvate thereof

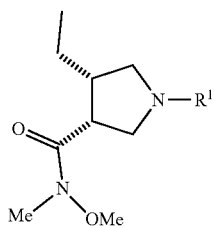

(III'-cis)

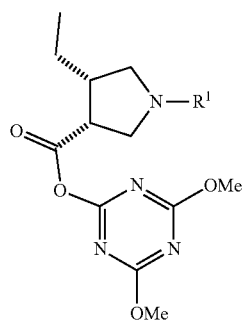

(IV'-cis)

and (b2) converting a compound of formula (III'-cis) or (IV'-cis), or a salt or solvate thereof, into a compound of formula (I'-cis), or a salt or solvate thereof, by a process comprising:

(bi) reacting the compound of formula (III'-cis) or (IV'-cis), or a salt or solvate thereof, with MeMgCl, MeMgBr or MeLi to provide a ketone of formula (V'-cis) or a salt or solvate thereof

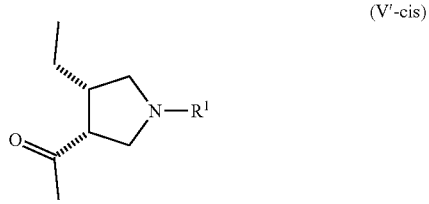

(V'-cis)

(bii) converting a ketone of formula (V'-cis), or a salt or solvate thereof, into an enol ether of formula (VI'-cis) or an enamine of formula (VII'-cis) or a salt or solvate thereof

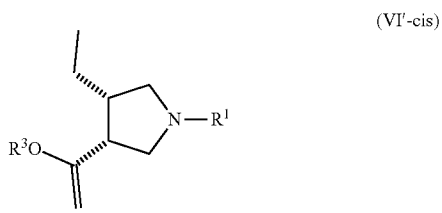

(VI'-cis)

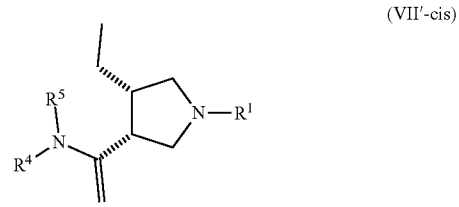

(VII'-cis)

wherein

R³ is selected from $C_1$-$C_6$ alkyl, $(C_6$-$C_{15})$aryl$(C_1$-$C_6)$alkyl, $C_6$-$C_{15}$ aryl, COR' and SiR'₃, wherein each R' is independently selected from $C_{1-6}$ alkyl, $C_3$-$C_{10}$ cycloalkyl, $C_{6-15}$ aryl and $(C_6$-$C_{15})$aryl$(C_1$-$C_6)$alkyl; and R⁴ and R⁵ are independently selected from $C_1$-$C_6$ alkyl, $(C_6$-$C_{15})$aryl$(C_1$-$C_6)$alkyl and $C_6$-$C_{15}$ aryl or they form, together with the nitrogen atom, a 5- to 7-membered heterocyclic ring; and (biii) converting an enol ether of formula (VI'-cis) or an enamine of formula (VII'-cis), or a salt or solvate thereof, into a compound of formula (I'-cis) or a salt or solvate thereof; or (bi') reacting the compound of formula (III'-cis) or (IV'-cis), or a salt or solvate thereof, with X—CH₂—Li, X—CH₂—MgCl or X—CH₂—MgBr, to provide a compound of formula (I'-cis) or a salt or solvate thereof; or (bi″) reacting the compound of formula (III'-cis) or (IV'-cis), or a salt or solvate thereof, with R⁶⁰—CH₂—Li, R⁶⁰—CH₂—MgCl or R⁶⁰—CH₂—MgBr, to provide a compound of formula (VIII'-cis) or a salt or solvate thereof (VIII'-cis)

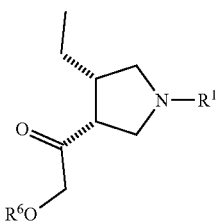

wherein
R$^1$ is selected from H, and amino protecting group; and
R$^6$ is selected from H, —COR' and —CONR'R", wherein R' and R" are independently selected from C$_1$-C$_6$ alkyl, C$_6$-C$_{15}$ aryl and (C$_6$-C$_{15}$)aryl(C$_1$-C$_6$)alkyl; and
(bii") converting a compound of formula (VIII'-cis), or a salt or solvate thereof, into a compound of formula (I'-cis) or a salt or solvate thereof.

6. The process according to claim 1, comprising:
(a) converting a compound of formula (II") or a salt or solvate thereof (II")

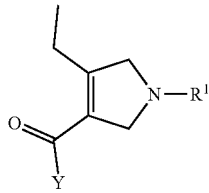

wherein
Y is selected from OH, Cl, OR$^2$ and OC(O)R$^2$, wherein R$^2$ is selected from C$_1$-C$_6$ alkyl, (C$_6$-C$_{15}$)aryl(C$_1$-C$_6$)alkyl and C$_6$-C$_{15}$ aryl; and
R$^1$ is selected from H and amino protecting group;
into a compound of formula (III") or (IV") or a salt or solvate thereof (III")

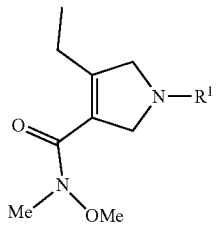

(IV")

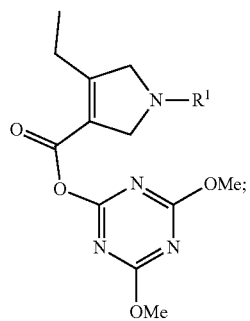

and
(b) converting a compound of formula (III") or (IV"), or a salt or solvate thereof, into a compound of formula (I'-cis), or a salt or solvate thereof, by a process comprising:
(bi1) reacting the compound of formula (III") or (IV"), or a salt or solvate thereof, with MeMgCl, MeMgBr or MeLi to provide a ketone of formula (V") or a salt or solvate thereof (V")

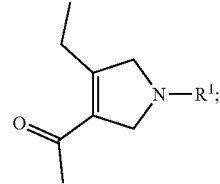

(bi2) hydrogenating a compound of formula (V"), or a salt or solvate thereof, to provide a compound of formula (V'-cis) or a salt or solvate thereof (V'-cis)

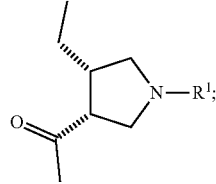

(bii) converting a ketone of formula (V'-cis), or a salt or solvate thereof, into an enol ether of formula (VI'-cis) or an enamine of formula (VII'-cis) or a salt or solvate thereof (VI'-cis)

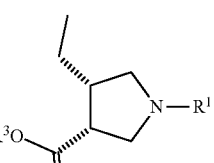

(VII'-cis)

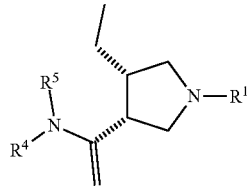

wherein
R$^3$ is selected from C$_1$-C$_6$ alkyl, (C$_6$-C$_{15}$)aryl(C$_1$-C$_6$) alkyl, C$_6$-C$_{15}$ aryl, COR' and SiR'$_3$, wherein each R' is independently selected from C$_{1-6}$ alkyl, C$_3$-C$_{10}$ cycloalkyl, C$_{6-15}$ aryl and (C$_6$-C$_{15}$)aryl(C$_1$-C$_6$)alkyl and
R$^4$ and R$^5$ are independently selected from C$_1$-C$_6$ alkyl, (C$_6$-C$_{15}$)aryl(C$_1$-C$_6$)alkyl and C$_6$-C$_{15}$ aryl or they form, together with the nitrogen atom, a 5- to 7-membered heterocyclic ring; and (biii) converting an enol ether of formula (VI'-cis) or an enamine of formula (VII'-cis), or a salt or solvate thereof, into a compound of formula (I'-cis) or a salt or solvate thereof.

7. The process according to claim 1, comprising:

(a) converting a compound of formula (II") or a salt or solvate thereof

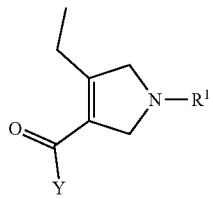

(II")

wherein
Y is selected from OH, Cl, OR² and OC(O)R², wherein R² is selected from $C_1$-$C_6$ alkyl, $(C_6$-$C_{15})$aryl$(C_1$-$C_6)$alkyl and $C_6$-$C_{15}$ aryl; and
R¹ is selected from H and amino protecting group;

into a compound of formula (III") or (IV") or a salt or solvate thereof

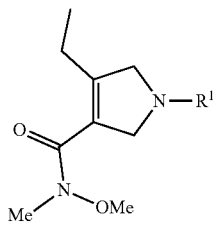

(III")

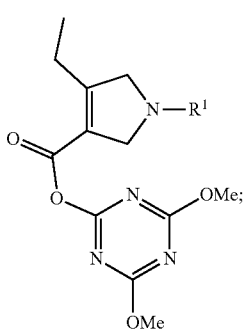

(IV")

(b) converting a compound of formula (III") or (IV"), or a salt or solvate thereof, into a compound of formula (I'), or a salt or solvate thereof, by a process comprising:

(bi) reacting the compound of formula (III") or (IV"), or a salt or solvate thereof, with MeMgCl, MeMgBr or MeLi to provide a ketone of formula (V") or a salt or solvate thereof

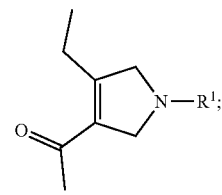

(V")

(bii) converting a ketone of formula (V"), or a salt or solvate thereof, into an enol ether of formula (VI") or an enamine of formula (VII") or a salt or solvate thereof

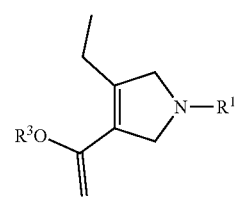

(VI")

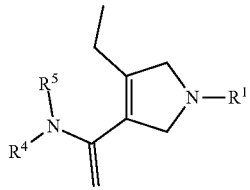

(VII")

wherein
R³ is selected from $C_1$-$C_6$ alkyl, $(C_6$-$C_{15})$aryl$(C_1$-$C_6)$ alkyl, $C_6$-$C_{15}$ aryl, COR' and SiR'₃, wherein each R' is independently selected from $C_{1-6}$ alkyl, $C_3$-$C_{10}$ cycloalkyl, $C_{6-15}$ aryl and $(C_6$-$C_{15})$aryl$(C_1$-$C_6)$alkyl; and
R⁴ and R⁵ are independently selected from $C_1$-$C_6$ alkyl, $(C_6$-$C_{15})$ aryl$(C_1$-$C_6)$alkyl and $C_6$-$C_{15}$ aryl or they form, together with the nitrogen atom, a 5- to 7-membered heterocyclic ring; and (biii) converting an enol ether of formula (VI") or an enamine of formula (VII"), or a salt or solvate thereof, into a compound of formula (I") or a salt or solvate thereof

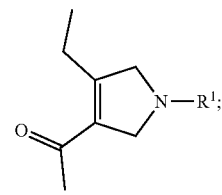

(I")

wherein
X is a leaving group, and
R¹ is selected from H, and amino protecting group; and
(biv) hydrogenating a compound of formula (I"), or a salt or solvate thereof, to provide a compound of formula (I'-cis) or a salt or solvate thereof; or
(bi') reacting the compound of formula (III") or (IV"), or a salt or solvate thereof, with X—CH₂—Li, X—CH₂—

MgCl or X—CH₂—MgBr, wherein X is a leaving group, to provide a compound of formula (I″) or a salt or solvate thereof

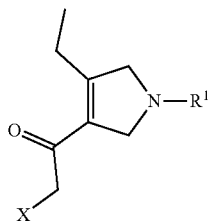
(I″)

and
(bii′) hydrogenating a compound of formula (I″), or a salt or solvate thereof, to provide a compound of formula (I′-cis) or a salt or solvate thereof; or
(bi″) reacting the compound of formula (III″) or (IV″), or a salt or solvate thereof, with R⁶O—CH₂—Li, R⁶O—CH₂—MgCl or R⁶O—CH₂—MgBr, to provide a compound of formula (VIII′) or a salt or solvate thereof

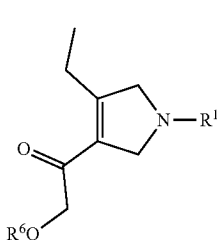
(VIII″)

wherein
R¹ is selected from H, and amino protecting group; and
R⁶ is selected from H, —COR′ and —CONR′R″, wherein R′ and R″ are independently selected from $C_1$-$C_6$ alkyl, $C_6$-$C_{15}$ aryl and ($C_6$-$C_{15}$)aryl($C_1$-$C_6$)alkyl;
(bii″) converting a compound of formula (VIII″), or a salt or solvate thereof, into a compound of formula (I″) or a salt or solvate thereof

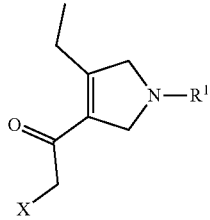
(I″)

and
(biii″) hydrogenating a compound of formula (I″), or a salt or solvate thereof, to provide a compound of formula (I′-cis) or a salt or solvate thereof.
8. The process according to claim 1, wherein:
X is selected from Cl, Br and I; and/or
R¹ is an amino protecting group; and/or
Y is selected from OH and OR², wherein R² is selected from $C_1$-$C_6$ alkyl, ($C_6$-$C_{15}$)aryl($C_1$-$C_6$)alkyl and $C_6$-$C_{15}$ aryl; and/or R⁶ is selected from H, —COR′ and —CONR′R″, wherein R′ and R″ are independently selected from $C_1$-$C_6$ alkyl, $C_6$-$C_{15}$ aryl and ($C_6$-$C_{15}$)aryl($C_1$-$C_6$)alkyl.
9. The process according to claim 1, wherein when --- is a cis single bond in the compound of formula (I′-cis), or (II), or (III), or (IV), or (V), or (VI), or (VII), or (VIII), said compound is a compound of formula (I′-cis-3R), or (II′-cis-3R), or (III′-cis-3R), or (IV′-cis-3R), or (V′-cis-3R), or (VI′-cis-3R), or (VII′-cis-3R), or (VIII′-cis-3R), respectively

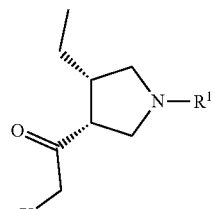
(I′-cis-3R)

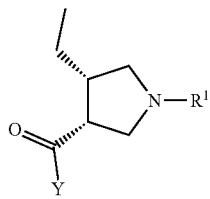
(II′-cis-3R)

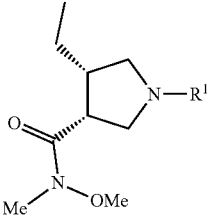
(III′-cis-3R)

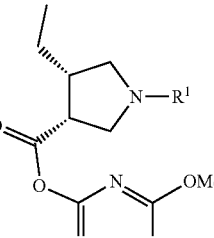
(IV′-cis-3R)

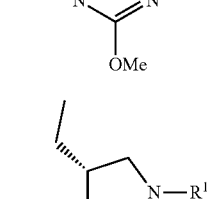
(V′-cis-3R)

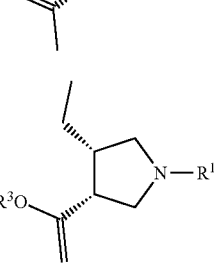
(VI′-cis-3R)

-continued

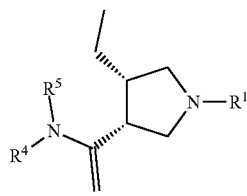
(VII'-cis-3R)

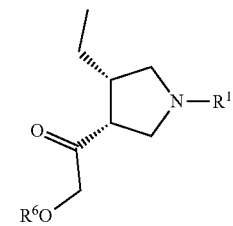
(VIII'-cis-3R)

or a salt or solvate thereof, wherein
X is a leaving group;
Y is selected from OH, Cl, $OR^2$ and $OC(O)R^2$, wherein $R^2$ is selected from $C_1$-$C_6$ alkyl, $(C_6$-$C_{15})$aryl$(C_1$-$C_6)$ alkyl and $C_6$-$C_{15}$ aryl;
$R^1$ is selected from H and amino protecting group;
$R^3$ is selected from $C_1$-$C_6$ alkyl, $(C_6$-$C_{15})$aryl$(C_1$-$C_6)$ alkyl, $C_6$-$C_{15}$ aryl, COR' and $SiR'_3$, wherein each R' is independently selected from $C_{1-6}$ alkyl, $C_3$-$C_{10}$ cycloalkyl, $C_{6-15}$ aryl and $(C_6$-$C_{15})$aryl$(C_1$-$C_6)$alkyl;
$R^4$ and $R^5$ are independently selected from $C_1$-$C_6$ alkyl, $(C_6$-$C_{15})$aryl$(C_1$-$C_6)$alkyl and $C_6$-$C_{15}$ aryl or they form, together with the nitrogen atom, a 5- to 7-membered heterocyclic ring; and
$R^6$ is selected from H, —COR' and —CONR'R", wherein R' and R" are independently selected from $C_1$-$C_6$ alkyl, $C_6$-$C_{15}$ aryl and $(C_6$-$C_{15})$aryl$(C_1$-$C_6)$ alkyl.

10. The process according to claim 1, wherein the compound of formula (II), or a salt or solvate thereof, is obtained by a process comprising:
reacting a compound of formula (IX) or a salt or solvate thereof

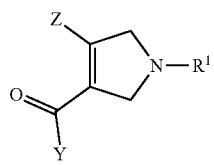
(IX)

wherein
Z is selected from halogen, $C_1$-$C_6$ alkylsulfonates, $C_1$-$C_6$ haloalkylsulfonates, $C_6$-$C_{10}$ arylsulfonates and $(C_1$-$C_6)$alkyl$(C_6$-$C_{10})$arylsulfonates;
$R^1$ is selected from H and amino protecting group; and
Y is selected from OH, Cl, $OR^2$ and $OC(O)R^2$, wherein $R^2$ is selected from $C_1$-$C_6$ alkyl, $(C_6$-$C_{15})$aryl$(C_1$-$C_6)$alkyl and $C_6$-$C_{15}$ aryl;
with $Et_2CuLi$, $Et_2CuMgBr$ or $Et_2CuMgCl$, to provide a compound of formula (II), or a salt or solvate thereof, wherein --- is a double bond; and
if a compound of formula (II) wherein --- is a cis single bond is desired, hydrogenating the double bond to provide a compound of formula (II), or a salt or solvate thereof, wherein --- is a cis single bond.

11. The process according to claim 1, wherein the compound of formula (I'-cis), or a salt or solvate thereof, is converted into Upadacitinib, or a salt or solvate or stereoisomer thereof.

12. The process according to claim 1, wherein the compound of formula (I'-cis) or a salt or solvate thereof is a compound of formula (I'-cis-3R) or a salt or solvate thereof

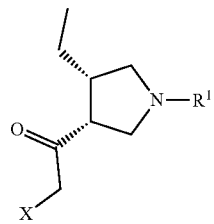
(I-cis-3R)

wherein
X is a leaving group, and
$R^1$ is selected from H, and amino protecting group; and
wherein the compound of formula (II), (III), (IV), (V), (VI), (VII) and (VIII) are, respectively, a compound of formula (II'-cis-3R), (III'-cis-3R), (IV'-cis-3R), (V'-cis-3R), (VI'-cis-3R), (VII'-cis-3R), or (VIII'-cis-3R)

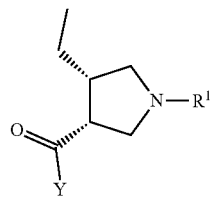
(II'-cis-3R)

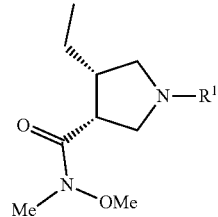
(III'-cis-3R)

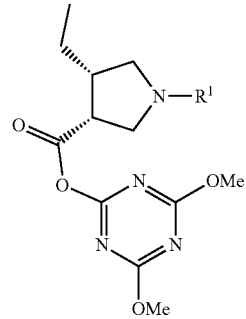
(IV'-cis-3R)

(V'-cis-3R)

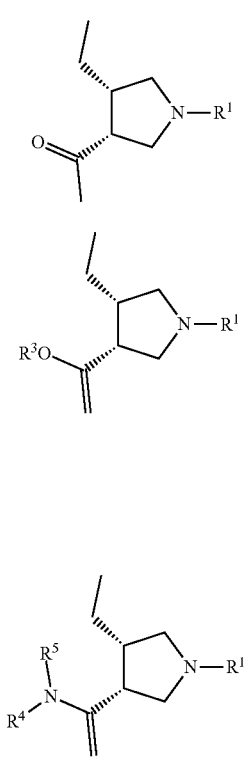

(VI'-cis-3R)

(VII'-cis-3R)

(VIII'-cis-3R)

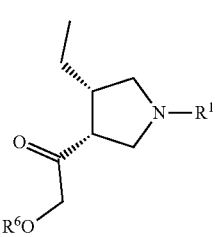

or a salt or solvate thereof, wherein
  X is a leaving group;
  Y is selected from OH, Cl, $OR^2$ and $OC(O)R^2$, wherein $R^2$ is selected from $C_1$-$C_6$ alkyl, $(C_6$-$C_{15})$aryl$(C_1$-$C_6)$ alkyl and $C_6$-$C_{15}$ aryl;
  $R^1$ is selected from H and amino protecting group;
  $R^3$ is selected from $C_1$-$C_6$ alkyl, $(C_6$-$C_{15})$aryl$(C_1$-$C_6)$ alkyl, $C_6$-$C_{15}$ aryl, COR' and $SiR'_3$, wherein each R' is independently selected from $C_{1-6}$ alkyl, $C_3$-$C_{10}$ cycloalkyl, $C_{6-15}$ aryl and $(C_6$-$C_{15})$aryl$(C_1$-$C_6)$alkyl;
  $R^4$ and $R^5$ are independently selected from $C_1$-$C_6$ alkyl, $(C_6$-$C_{15})$aryl$(C_1$-$C_6)$alkyl and $C_6$-$C_{15}$ aryl or they form, together with the nitrogen atom, a 5- to 7-membered heterocyclic ring; and
  $R^6$ is selected from H, —COR' and —CONR'R", wherein R' and R" are independently selected from $C_1$-$C_6$ alkyl, $C_6$-$C_{15}$ aryl and $(C_6$-$C_{15})$aryl$(C_1$-$C_6)$ alkyl.

* * * * *